US012627403B2

(12) United States Patent
Dai et al.

(10) Patent No.: US 12,627,403 B2
(45) Date of Patent: May 12, 2026

(54) POLAR ENCODING AND DECODING METHOD AND APPARATUS FOR SATELLITE COMMUNICATION

(71) Applicant: HUAWEI TECHNOLOGIES CO., LTD., Shenzhen (CN)

(72) Inventors: Shengchen Dai, Hangzhou (CN); Huazi Zhang, Hangzhou (CN); Jiajie Tong, Hangzhou (CN); Xianbin Wang, Hangzhou (CN); Rong Li, Hangzhou (CN); Jun Wang, Hangzhou (CN); Wei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 583 days.

(21) Appl. No.: 18/063,569

(22) Filed: Dec. 8, 2022

(65) Prior Publication Data

US 2023/0123058 A1     Apr. 20, 2023

Related U.S. Application Data

(63) Continuation of application No. PCT/CN2021/099589, filed on Jun. 11, 2021.

(30) Foreign Application Priority Data

Jun. 12, 2020   (CN) .......................... 202010535335.9

(51) Int. Cl.
 *H04L 1/00*          (2006.01)

(52) U.S. Cl.
 CPC .......... *H04L 1/0067* (2013.01); *H04L 1/0068* (2013.01); *H04L 1/0069* (2013.01); *H04L 1/0057* (2013.01); *H04L 1/0061* (2013.01)

(58) Field of Classification Search
 CPC .... H04L 1/0067; H04L 1/0068; H04L 1/0069
 See application file for complete search history.

(56) References Cited

U.S. PATENT DOCUMENTS

| | | | |
|---|---|---|---|
| 2019/0081735 A1* | 3/2019 | Chen ..................... | H03M 13/13 |
| 2019/0123853 A1* | 4/2019 | Zhang ................... | H04L 1/0057 |
| 2019/0356342 A1 | 11/2019 | Zhang et al. | |

(Continued)

FOREIGN PATENT DOCUMENTS

| | | |
|---|---|---|
| CN | 107592181 A | 1/2018 |
| CN | 109391345 A | 2/2019 |

(Continued)

*Primary Examiner* — Joseph D Torres
(74) *Attorney, Agent, or Firm* — WOMBLE BOND DICKINSON (US) LLP

(57)          ABSTRACT

A polar encoding and decoding method and apparatus are provided. The method includes: obtaining K to-be-encoded bits; selecting K sequence numbers from a first sequence, where the to-be-encoded bits are placed on polar channels corresponding to the K sequence numbers; and performing polar code encoding on the K to-be-encoded bits to obtain encoded bits, where the first sequence includes sequence numbers of N polar channels, and the first sequence is one or a sub-sequence of a related sequence. This technical solution is applicable to a short message communication system of a BeiDou satellite. The method can effectively improve performance of the communication system and reduce complexity.

20 Claims, 8 Drawing Sheets

(56) References Cited

U.S. PATENT DOCUMENTS

| 2020/0092042 | A1* | 3/2020 | Huang | ................ | H03M 13/635 |
| 2020/0119842 | A1* | 4/2020 | Xu | ........................ | H04L 1/0041 |

FOREIGN PATENT DOCUMENTS

| CN | 110519012 | A | 11/2019 |
| CN | 111200476 | A | 5/2020 |
| CN | 107276720 | B | 9/2020 |
| EP | 3605902 | A1 | 2/2020 |

* cited by examiner

K1, information bit set 1

K2, information bit set 2

K3, information bit set 3

K4, information bit set 4

Obtain K to-be-encoded bits

401

Select K sequence numbers from a first sequence, where the to-be-encoded bits are placed on polar channels corresponding to the K sequence numbers

402

Perform polar code encoding on the K to-be-encoded bits to obtain encoded bits

403

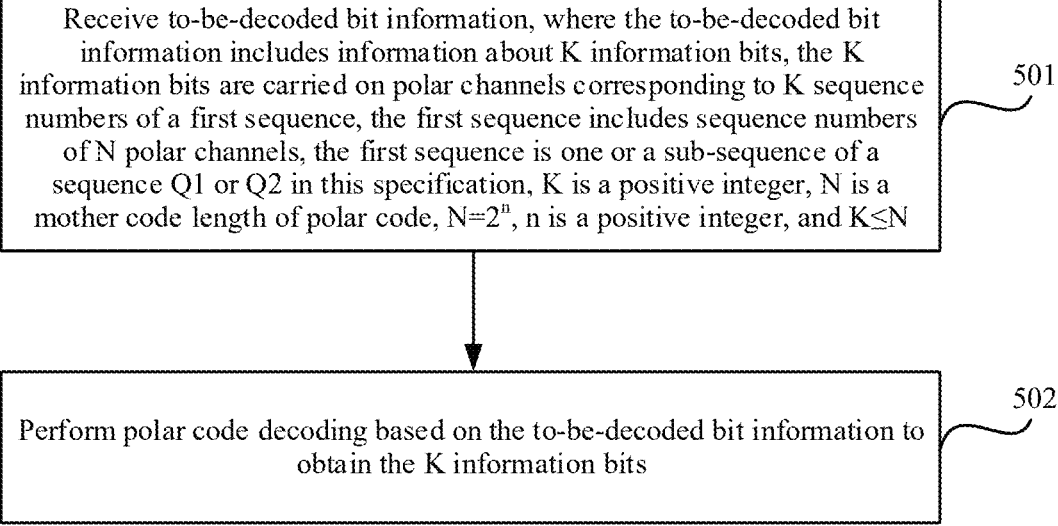

Receive to-be-decoded bit information, where the to-be-decoded bit information includes information about K information bits, the K information bits are carried on polar channels corresponding to K sequence numbers of a first sequence, the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$

501

Perform polar code decoding based on the to-be-decoded bit information to obtain the K information bits

POLAR ENCODING AND DECODING METHOD AND APPARATUS FOR SATELLITE COMMUNICATION

CROSS-REFERENCE TO RELATED APPLICATIONS

This application is a continuation of International Application No. PCT/CN2021/099589, filed on Jun. 11, 2021, which claims priority to Chinese Patent Application No. 202010535335.9, filed on Jun. 12, 2020. The disclosures of the aforementioned applications are hereby incorporated by reference in their entireties.

TECHNICAL FIELD

Embodiments of this application relate to the field of satellite communication technologies, and in particular, to a polar code encoding method and apparatus.

BACKGROUND

A communication system of a Beidou satellite has a short message communication function which is a feature of the Beidou satellite and can be considered as "messaging" usually used by people on mobile phones. "Messaging" can be used for positioning and displaying a location of a publisher. Bidirectional information transmission can be directly performed between a satellite positioning terminal and the Beidou satellite or a Beidou ground service station by using a satellite signal. However, a GPS can perform only unidirectional transmission (a terminal receives a location signal from a satellite). During the Wenchuan earthquake in 2008, an only communication manner in an earthquake area is the Beidou satellite, and the short message function of the Beidou satellite plays a great role in search and rescue. Currently, a short message system of the second-generation Beidou uses turbo code to perform channel encoding. However, performance and complexity of the turbo code need to be further improved.

SUMMARY

Embodiments of this application provide a polar encoding method and apparatus for a satellite system, to improve performance and reduce complexity for a short message communication system.

Specific technical solutions provided in embodiments of this application are as follows:

According to a first aspect, a polar code encoding method is provided. The method includes: obtaining K to-be-encoded bits; selecting K sequence numbers from a first sequence, where the to-be-encoded bits are placed on polar channels corresponding to the K sequence numbers; and performing polar code encoding on the K to-be-encoded bits to obtain encoded bits, where the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$.

The solution provided in this embodiment of this application may be applied to short message communication of a Beidou satellite, and in particular, is applicable to a channel encoding design of an outbound short message. A specially designed information bit is used to determine a sequence, thereby improving performance and reducing complexity to a maximum extent. In addition, the sequence may be applicable to a plurality of different to-be-encoded bit lengths. In the sequence, there is a nested relationship between channel location sets corresponding to the different to-be-encoded bit lengths. An objective of reducing system storage overheads can be implemented based on this feature. Particularly, when there is an excessively large mother code length, a significant reduction effect is implemented.

In an embodiment, reliability of the polar channels corresponding to the selected K sequence numbers is higher than reliability of polar channels corresponding to remaining $(N-K)$ sequence numbers in the first sequence.

In an embodiment, the first sequence is pre-stored.

In an embodiment, when the mother code length N is 4096, a quantity K of to-be-encoded bits is 452, 536, 904, 1048, 1808, 2072, 2712, or 3096; or when the mother code length N is 8192, a quantity K of to-be-encoded bits is 235, 470, 940, 1880, 2820, or 3760.

In an embodiment, when the mother code length is 4096, the first sequence is the sequence Q1 in this specification; or when the mother code length is 8192, the first sequence is the sequence Q2 in this specification.

In an embodiment, the method further includes: performing rate matching on the bits obtained through polar code encoding, to obtain bits after rate matching.

In an embodiment, the sequence numbers of the N polar channels are 0 to $(N-1)$ or 1 to N.

In an embodiment, the to-be-encoded bits include a cyclic redundancy check (CRC) bit.

In an embodiment, the to-be-encoded bits include a parity check (PC) bit.

According to a second aspect, a polar code decoding method is provided. The method includes: receiving to-be-decoded bit information, where the to-be-decoded bit information includes information about K information bits, the K information bits are carried on polar channels corresponding to K sequence numbers of a first sequence, the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$; and performing polar code decoding based on the to-be-decoded bit information to obtain the K information bits.

In an embodiment, reliability of the polar channels corresponding to the selected K sequence numbers is higher than reliability of polar channels corresponding to remaining $(N-K)$ sequence numbers in the first sequence.

In an embodiment, the first sequence is pre-stored.

In an embodiment, when the mother code length N is 4096, a quantity K of information bits is 452, 536, 904, 1048, 1808, 2072, 2712, or 3096; or when the mother code length N is 8192, a quantity K of information bits is 235, 470, 940, 1880, 2820, or 3760.

In an embodiment, when the mother code length is 4096, the first sequence is the sequence Q1 in this specification; or when the mother code length is 8192, the first sequence is the sequence Q2 in this specification.

In an embodiment, the sequence numbers of the N polar channels are 0 to $(N-1)$ or 1 to N.

In an embodiment, the to-be-encoded bits include a CRC bit.

In an embodiment, the to-be-encoded bits include a parity check (PC) bit.

According to a third aspect, a polar code encoding apparatus is provided, including: an obtaining unit, configured to obtain K to-be-encoded bits; a selection unit, configured to select K sequence numbers from a first sequence, where the to-be-encoded bits are placed on polar channels corresponding to the K sequence numbers; and an encoding unit, configured to perform polar code encoding on the K to-be-encoded bits to obtain encoded bits, where the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$.

In an embodiment, reliability of the polar channels corresponding to the selected K sequence numbers is higher than reliability of polar channels corresponding to remaining (N–K) sequence numbers in the first sequence.

In an embodiment, the first sequence is pre-stored.

In an embodiment, when the mother code length N is 4096, a quantity K of to-be-encoded bits is 452, 536, 904, 1048, 1808, 2072, 2712, or 3096; or when the mother code length N is 8192, a quantity K of to-be-encoded bits is 235, 470, 940, 1880, 2820, or 3760.

In an embodiment, when the mother code length is 4096, the first sequence is the sequence Q1 in this specification; or when the mother code length is 8192, the first sequence is the sequence Q2 in this specification.

In an embodiment, the apparatus further includes: a rate matching unit, configured to perform rate matching on the bits obtained through polar code encoding, to obtain bits after rate matching.

In an embodiment, the sequence numbers of the N polar channels are 0 to (N–1) or 1 to N.

In an embodiment, the to-be-encoded bits include a CRC bit.

In an embodiment, the to-be-encoded bits include a PC bit.

According to a fourth aspect, a polar code decoding apparatus is provided, including: a receiving unit, configured to receive to-be-decoded bit information, where the to-be-decoded bit information includes information about K information bits, the K information bits are carried on polar channels corresponding to K sequence numbers of a first sequence, the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$; and a decoding unit, configured to perform polar code decoding based on the to-be-decoded bit information to obtain the K information bits.

In an embodiment, reliability of the polar channels corresponding to the selected K sequence numbers is higher than reliability of polar channels corresponding to remaining (N–K) sequence numbers in the first sequence.

In an embodiment, the first sequence is pre-stored.

In an embodiment, when the mother code length N is 4096, a quantity K of information bits is 452, 536, 904, 1048, 1808, 2072, 2712, or 3096; or when the mother code length N is 8192, a quantity K of information bits is 235, 470, 940, 1880, 2820, or 3760.

In an embodiment, when the mother code length is 4096, the first sequence is the sequence Q1 in this specification; or when the mother code length is 8192, the first sequence is the sequence Q2 in this specification.

In an embodiment, the sequence numbers of the N polar channels are 0 to (N–1) or 1 to N.

In an embodiment, the to-be-encoded bits include a CRC bit.

In an embodiment, the to-be-encoded bits include a PC bit.

According to a fifth aspect, a polar code processing apparatus is provided, including: a memory, configured to store a program; and a processor, configured to execute the program stored in the memory, where when the program is executed, the processor is configured to perform the method according to any one of the first aspect or the possible embodiments of the first aspect, or perform the method according to any one of the second aspect or the possible embodiments of the second aspect.

In an embodiment, the polar code encoding apparatus is a chip or an integrated circuit.

According to a sixth aspect, a polar code processing apparatus is provided, including: an input interface circuit, configured to obtain to-be-encoded bits; a logic circuit, configured to perform, based on the obtained to-be-encoded bits, the method according to any one of the first aspect or the possible embodiments of the first aspect to obtain a bit sequence after polar code encoding, or the method according to any one of the second aspect or the possible embodiments of the second aspect to obtain a bit sequence after polar code decoding; and an output interface circuit, configured to output the bit sequence.

According to a seventh aspect, a wireless device is provided, including the processing apparatus according to the fifth aspect, a modem, and a transceiver, where the modem is configured to modulate an encoded bit sequence to obtain a modulated sequence, or demodulate encoded bit information; and the transceiver is configured to send the modulated sequence or receive the encoded bit information.

In an embodiment, the wireless device is a terminal or a network device.

BRIEF DESCRIPTION OF DRAWINGS

FIG. 5 is a schematic diagram of a polar code decoding method according to an embodiment of this application;

DESCRIPTION OF EMBODIMENTS

Figures 1, 2:
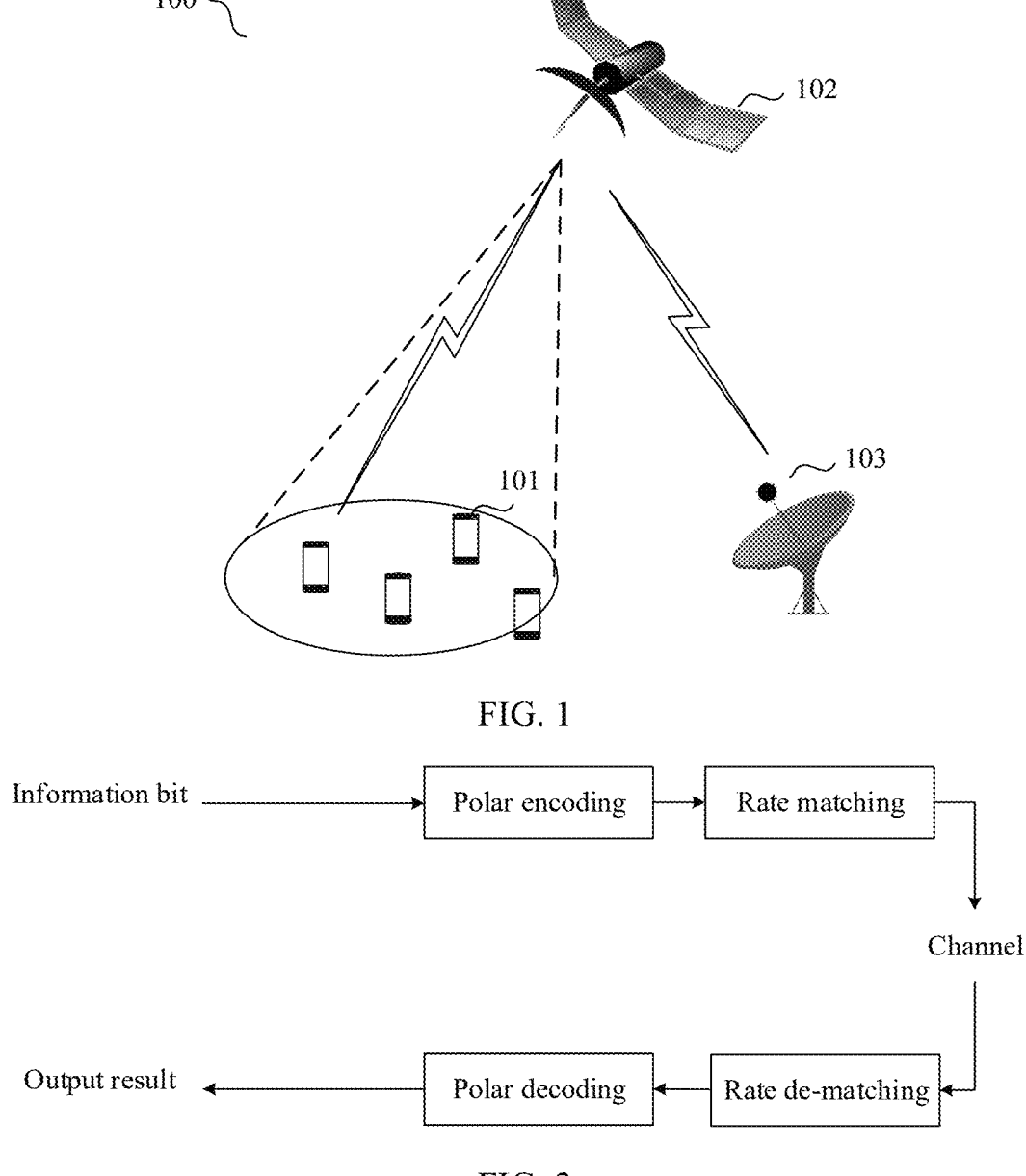
FIG. 1 is a schematic diagram of a wireless communication network scenario to which a solution provided in an embodiment of this application is applicable.
FIG. 2 is a schematic diagram of a system framework that is applicable to a wireless communication network according to an embodiment of this application.

In the specification, claims, and accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" refers to one or more. "A plurality of" refers to two or more. "At least two (items)" refers to two or three or more. "And/or" is used to describe an association relationship between associated objects, and indicates that three relationships may exist. For example, "A and/or B" may indicate three cases: Only A exists, only B exists, and A and B exist at the same time, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The following describes in detail embodiments of this application with reference to accompanying drawings.

Embodiments of this application provide a polar encoding and decoding method and apparatus, and are applicable to satellite communication. In this application, a short message communication function of a Beidou satellite is used as an example for description, and another similar communication system may also use the method and apparatus provided in this application. A short message working process is as follows: 1. A short message sender first encrypts a communication application signal including an identifier (ID) of a receiver and communication content, and then forwards an encrypted communication application signal by using a satellite for inbound. 2. After receiving the communication application signal, a ground central station decrypts and encrypts the communication application signal, and adds an obtained communication application signal to an outbound broadcast message that is continuously broadcast, so that the communication application signal is broadcast to a user by using the satellite. 3. A client of the receiver receives an outbound signal, and demodulates and decrypts an outbound message, to complete communication for one time. For a specific outbound (including sending from the ground central station to the satellite, and forwarding from the satellite to a terminal) information bit quantity and code length of the Beidou satellite, specially designed fixed rate matching and a nested polar code information bit determining method may be used, to improve performance and reduce complexity to a maximum extent.

For ease of understanding of embodiments of this application, the following briefly describes polar code.

An encoding strategy for polar (Polar) code is that useful information of a user is transmitted through a noiseless channel, and agreed information or no information is transmitted through a noisy channel. In this way, reliability of data transmission is improved, and communication quality is ensured. The polar code is also linear block code with low encoding and decoding complexity. An encoding matrix of the polar code is $G_N$, and an encoding process is $$x_1^N = u_1^N G_N,$$

where $$u_1^N = (u_1, u_2, \ldots, u_N)$$

is a binary row vector, and a length is N (namely, a code length); and $G_N$ is an N×N matrix, and $$G_N = F_2^{\otimes (log2(N))} \cdot F_2^{\otimes (log2(N))}$$

is defined as a Kronecker (Kronecker) product of $log_2$ N matrices $F_2$. The matrix $$F_2 = \begin{bmatrix} 1 & 0 \\ 1 & 1 \end{bmatrix}.$$

In the encoding process of the polar code, some bits in $$u_1^N$$

are used to carry information, and are referred to as an information bit set. A set of indexes of these bits is denoted as A. Some other bits are set to a fixed value specified in advance by a receive end and a transmit end, and are referred to as a fixed bit set or a frozen bit set (frozen bits). A set of indexes of these bits is represented by a complementary set $A^c$ of A. The encoding process of the polar code is equivalent to $$x_1^N = u_A G_N(A) \oplus_{U_{A^C}} G_N(A^C).$$

Herein, $G_N(A)$ is a sub-matrix that is obtained based on rows corresponding to the indexes in the set A and that is in $G_N$, and $G_N(A^C)$ is a sub-matrix that is obtained based on rows corresponding to the indexes in the set $A^c$ and that is in $G_N$. $u_A$ is the information bit set in $$u_1^N,$$

and a quantity of bits is K. Usually, various check bits including but not limited to a cyclic redundancy check (CRC for short) bit and a parity check (PC for short) bit are also included in the information bit set. $u_{A^c}$ is the fixed bit set in $$u_1^N,$$

a quantity of bits is (N−K), and the bits are known bits. These fixed bits are usually set to 0. However, the fixed bits may be arbitrarily set provided that the receive end and the transmit end performs pre-agreement. Therefore, an encoding output of the polar code may be simplified as $$x_1^N = U_A G_N(A).$$

Herein, $u_A$ is the information bit set in $$u_1^N.$$

$u_A$ is a row vector of a length K, that is, |A|=K. |·| represents a quantity of elements in a set. K is a size of an information block. $G_N(A)$ is a sub-matrix that is obtained based on rows corresponding to the indexes in the set A and that is in the matrix $G_N$. $G_N(A)$ is a K×N matrix.

A construction process of the polar code is a process of selecting the set A, which determines performance of the polar code. Usually, the construction process of the polar code is that it is determined, based on a mother code length N, that there are totally N polar channels, the N polar channels respectively correspond to N rows of the encoding matrix, reliability of the polar channels is calculated, indexes of first K polar channels with higher reliability are used as elements of the set A, and indexes corresponding to remaining (N−K) polar channels are used as elements of the index set $A^c$ of the fixed bits. The set A determines locations of the information bits, and the set $A^c$ determines locations of the fixed bits. Sequence numbers of the polar channels are location indexes of the information bits or fixed bits, namely, location indexes in $$u_1^N.$$

A construction method of the polar code may use an online construction manner. In this case, a parameter of online construction is related to a signal-to-noise ratio, the transmit end and the receive end cannot simultaneously obtain an accurate signal-to-noise ratio parameter (or need to obtain the accurate signal-to-noise ratio parameter by consuming additional overheads), and online construction requires additional complexity. In addition, the locations of the information bits need to be separately stored for different encoding lengths and information bit lengths. Alternatively, a construction method that is not related to a signal-to-noise ratio may be used, for example, a PW (polarization weight) value may be used. A sorting sequence of PW values is a reliability sorting sequence of the polar code, and is used for information bit selection. When an information bit length is selected based on a PW, performance may be further improved.

It can be learned from the encoding matrix that a code length of original polar code (also referred to as mother code) is an integer power of 2. In an actual application, polar code of any code length needs to be implemented through rate matching. Rate matching is implemented by using a puncture (puncture) or shorten solution. During encoding, mother code whose code length exceeds a target code length is punctured or shortened to reach the target code length. During decoding, the code length of the mother code is restored through padding. For a specific outbound information bit quantity and code length of Beidou outbound (including sending from a ground central station to a satellite and forwarding from the satellite to a terminal), a fixed rate matching manner and an information bit location may be used as a code design solution.

Before a specific solution is described, a scenario and a system architecture to which the solutions provided in embodiments of this application are applicable are briefly described first.

FIG. 1 is a schematic diagram of a wireless communication network scenario to which a solution provided in an embodiment of this application is applicable. The solution provided in this application may be applied to an NTN communication system. As shown in FIG. 1, the communication system 100 may include a terminal device 101, a satellite (or referred to as a satellite base station) 102, and a ground station (or referred to as a gateway station or a gateway) 103.

The terminal device 101 may also be referred to as user equipment (UE), a terminal, a terminal apparatus, or the like. The terminal device is a device, a chip, or a communication system that has a wireless transceiver function, and may be deployed on the land, including deployed indoors or outdoors, or deployed as handheld, wearable, or vehicle-mounted. Alternatively, the terminal device may be deployed on the water surface, for example, on a steamship. Alternatively, the terminal device may be deployed in the air, for example, on an airplane, a balloon, or a satellite. The terminal device may be a mobile phone, a pad, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, or the like. It may be understood that the terminal device may alternatively be a terminal device in a future 5G network, a terminal device in a future evolved public land mobile network (PLMN), or the like. For ease of description, the following uses an example in which the terminal device is UE to describe a method in embodiments of this application.

In an embodiment, in the communication system shown in FIG. 1, a communication technology, for example, device to device (D2D), vehicle-to-everything (V2X), or machine to machine (M2M), may be used for communication between the terminal devices. A communication method between the terminal devices is not limited in this embodiment of this application.

The satellite 102 may provide a wireless access service for the terminal device, schedule a radio resource to the accessed terminal device, provide a reliable wireless transmission protocol and a reliable data encryption protocol, and the like. An artificial earth satellite, a high-altitude aircraft, and the like may be used as base stations for wireless communication, for example, as an evolved NodeB (eNB) and a 5G gNodeB (gNB). Alternatively, the satellite may be used as a relay of these base stations to transparently transmit wireless signals of these base stations to the terminal device. In this case, the ground station may be considered as a base station for wireless communication. Therefore, in some embodiments, for example, in a regeneration scenario of the satellite, a network device may be the satellite base station shown in FIG. 1. In some other embodiments, for example, in a transparent transmission scenario of the satellite, a network device may be the ground station shown in FIG. 1. For ease of description, the following uses an example in which the network device is a base station to describe a method in this application.

In embodiments provided in this application, the network device may include but is not limited to the foregoing satellite base station. For example, the network device may alternatively be a base station in a future communication system, for example, a sixth-generation (6G) communication system. In an embodiment, the network device may alternatively be an access node, a wireless relay node, a wireless backhaul node, or the like in a wireless fidelity (Wi-Fi) system. In an embodiment, the network device may alternatively be a wireless controller in a cloud radio access network (CRAN) scenario. In an embodiment, the network device may alternatively be a wearable device, a vehicle-mounted device, or the like. In an embodiment, the network device may alternatively be a small cell, a transmission node (also referred to as a transmission reception point or TRP), or the like. It may be understood that the network device may alternatively be a base station in a future evolved PLMN or the like.

In an embodiment, the satellite 102 may be a geostationary earth orbit (geostationary earth orbit, GEO) satellite, a medium earth orbit (MEO) satellite or a low earth orbit (LEO) satellite on a non-geostationary earth orbit (NGEO), a high altitude platform station (HAPS), or the like.

The ground station 103 may be configured to connect the satellite to a core network. For example, when the satellite serves as a base station for wireless communication, the ground station may transparently transmit signaling between the satellite and the core network. Alternatively, the ground station may be used as a base station for wireless communication, and the satellite may transparently transmit signaling between the terminal device and the ground station. For example, when communication is performed, the ground station may send signaling from the core network to the satellite through a feeder link. The satellite sends the signaling to the terminal device through a service link between the satellite and the terminal device. Correspondingly, the terminal device may also send signaling to the satellite through the service link, and the satellite sends the signaling to the core network by using the ground station.

It may be understood that FIG. 1 shows only one satellite and one ground station. In actual use, an architecture including a plurality of satellites and/or a plurality of ground stations may be used as required. Each satellite may provide a service for one or more terminal devices, each satellite may correspond to one or more ground stations, and each ground station may correspond to one or more satellites. This is not specifically limited in this application. Based on the communication scenario shown in FIG. 1, in this embodiment of this application, a polar code encoding and decoding method may be performed by the ground station or the terminal. When the network device or the terminal is used as a transmit end to send data or information, a polar code encoding method may be used. Correspondingly, when the network device or the terminal is used as a receive end to receive data or information, a polar code decoding method may be used.

FIG. 2 is a schematic diagram of a system framework of a wireless communication network to which a solution provided in an embodiment of this application is applicable. As shown in FIG. 2, a transmit end determines to-beencoded information bits, performs polar encoding on the to-be-encoded information bits, performs rate matching on encoded information bits, and sends obtained information bits out; encoded information is transmitted through a channel; and a receive end receives the information from the channel, performs rate de-matching on the information for decoding, and outputs decoded information bits obtained through decoding. The solution provided in this application may be applied to an existing communication system, and particularly, to a satellite communication scenario, to replace original encoding and decoding or be used as an enhanced solution of existing encoding and decoding.

The following describes in detail the polar code encoding and decoding method provided in embodiments of this application.

Figures 3, 4:
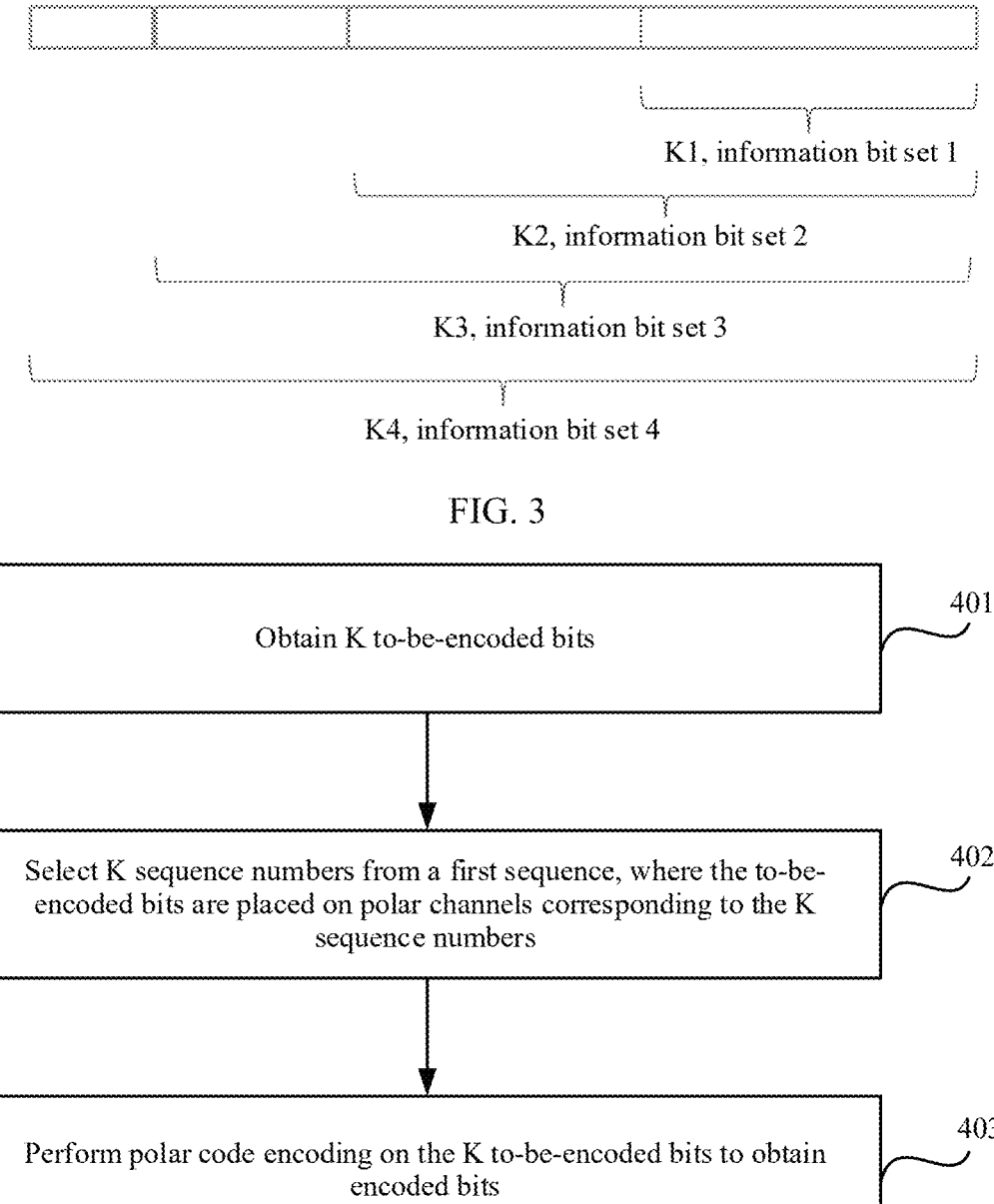
FIG. 3 is a schematic diagram of an information bit location set determining method according to an embodiment of this application.
FIG. 4 is a schematic diagram of a polar code encoding method according to an embodiment of this application.

FIG. 3 is a schematic diagram of an information bit location set determining method according to an embodiment of this application. When a maximum mother code length of polar code is $N_{max}$, and an information bit length is K, a bit length obtained through encoding (after rate matching or outputting) is M, and a mother code length of polar code corresponding to current information bits is $N=2^{ceil(\log 2(M))}$. The solution provided in this embodiment of this application relates to how to improve performance and reduce complexity for code when an information bit quantity and a code length (e.g., a mother code length, a code length obtained through rate matching, or another specified output code length) are given. The solution provided in this embodiment of this application may be applied to short message communication of a Beidou satellite, and in particular, is applicable to a channel encoding design of an outbound short message. Specially designed fixed rate matching and an information bit determining method are used, to improve performance and reduce complexity to a maximum extent. In this case, a quantity of bits that require rate matching (puncture or shorten) is (N–M), a rate matching location set is fixed, sequence numbers (optionally, the sequence numbers start from 0, and a maximum sequence number is $N_{max-1}$) of locations for rate matching are recorded in the rate matching location set, and an information bit location set is determined based on the rate matching location set. When the quantity M of bits obtained through outbound encoding is fixed, there may be a plurality of different information bit lengths, and there is a nested relationship between channel location sets corresponding to the different information bit lengths. This can reduce system storage overheads. Particularly, when there is an excessively large mother code length, a significant reduction effect is implemented. In the figure, information bit sequence number sets of different lengths, K1, K2, and K3 are subsets of an information bit sequence number set of a length K4. A subsetting manner may be backward subsetting or forward subsetting. The subsetting manner shown in the figure is merely an example.

Based on the wireless communication network scenario shown in FIG. 1 and the communication system framework shown in FIG. 2, FIG. 4 shows a polar code encoding method according to an embodiment of this application. A specific process is as follows:

Operation 401: Obtain K to-be-encoded bits.

Operation 402: Select K sequence numbers from a first sequence, where the to-be-encoded bits are placed on polar channels corresponding to the K sequence numbers.

Operation 403: Perform polar code encoding on the K to-be-encoded bits to obtain encoded bits.

The first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$. For the first sequences Q1 and Q2, refer to a related part of a later segment of this specification. Details are not described in the following.

The first sequence or the sub-sequence described herein is arranged based on reliability, and has a sorting relationship. For a calculation manner of reliability of the polar channels, refer to the foregoing method. Sorting in the sequence may be an arrangement based on reliability in ascending order or descending order. Alternatively, the polar channels may be grouped into two or more groups, and polar channels in each group are arranged based on reliability in ascending order or descending order. A specific grouping manner may be grouping based on sizes of the sequence numbers of the polar channels or grouping the sequence numbers based on congruence (for example, there are three groups, and sequence numbers that are congruent to 3 are grouped into a group). This is not specifically limited. The same terms are also applicable in the following.

In an embodiment, the first sequence is pre-stored.

In an embodiment, when the mother code length N is 4096, a quantity K of to-be-encoded bits is 452, 536, 904, 1048, 1808, 2072, 2712, or 3096; or when the mother code length N is 8192, a quantity K of to-be-encoded bits is 235, 470, 940, 1880, 2820, or 3760.

In an embodiment, K may float based on the foregoing value, for example, may be a specific K value obtained by increasing or decreasing the foregoing value by 10, 12, 15, or 20. More specifically, based on 452, a quantity K of information bits may be a specific integer between 432 and 472: 433, 434, 435, 436, 437, 438, 439, 440, . . . , 470, 471, or 472. Similarly, based on 536, the quantity K of information bits may be an integer between 516 and 556: 516, 517, . . . , 555, or 556. Based on 3096, the quantity K of information bits may be an integer between 3076 and 3116: 3076, 3077, . . . , 3115, or 3116. Based on 235, the quantity K of information bits may be an integer between 215 and 255: 215, 216, . . . , 254, or 255. Based on 470, the quantity K of information bits may be an integer between 450 and 490: 450, 451, . . . , 489, or 490. Based on 940, the quantity K of information bits may be an integer between 920 and 960: 920, 921, . . . , 959, or 960. Another K value is also applicable.

In an embodiment, when the mother code length is 4096, the first sequence is the sequence Q1 in this specification; or when the mother code length is 8192, the first sequence is the sequence Q2 in this specification.

In an embodiment, the method further includes: performing rate matching on the bits obtained through polar code encoding to obtain bits after rate matching. For example, a sequence obtained through polar code encoding is punctured based on a target code length. If a sequence number in the first sequence provided in this application is set as a location for rate matching (puncture or shorten), the sequence number or these sequence numbers are skipped. In an embodiment, rate matching, for example, puncture, may be performed in ascending order of the sequence numbers. A quantity of bits that need to be punctured may be determined based on a difference between the mother code length and the target code length. For example, if the mother code length is 8192 and the sent target code length is 7520, the quantity of bits that need to be punctured is 672 (8192-7520). In an embodiment, rate matching may alternatively be performed based on a shortened location set S1 provided in the later segment of this specification.

It may be understood that it is assumed that the first sequence has M elements after punctured or shortened bit locations are excluded. Then reliability of the polar channels corresponding to the selected K sequence numbers is higher than reliability of polar channels corresponding to remaining (M–K) sequence numbers in the sequence. Preferably, the sequence includes sequence numbers of M polar channels, the sequence numbers of the M polar channels are arranged in the sequence based on reliability of the M polar channels, and M is a positive integer. However, it may be understood that the bit locations that need to be punctured or shortened are excluded in advance due to rate matching, and reliability sorting in the sequence may be discontinuous. In addition, an adjustment of some locations in the sequence also does not affect reliability of channel transmission in this scenario. For example, an interchange among the selected K sequence numbers does not affect selection of the K sequence numbers, provided that the reliability of the polar channels corresponding to the selected K sequence numbers is higher than the reliability of the polar channels corresponding to the remaining (M–K) sequence numbers in the sequence. In an embodiment, the selected K sequence numbers are last K sequence numbers or first K sequence numbers in the first sequence.

In an embodiment, the to-be-encoded bits include a CRC bit.

In an embodiment, the to-be-encoded bits include a PC bit.

According to the encoding method provided in this embodiment, after input information bits are received, the quantity K of to-be-encoded bits is determined. In addition to online calculation or pre-calculation and storage of one first sequence, a plurality of second sequences may be further calculated online or stored, where a length of the first sequence corresponds to the mother code length of the polar code, the plurality of second sequences respectively store information bit location sequence number sets corresponding to different to-be-encoded bit lengths K, and the second sequence is a third sequence or a subset of a third sequence. In this case, the third sequence is a longest information bit location sequence number set in a specific case, for example, a longest information bit location sequence number set in a bit length obtained through specific rate matching. Sequence number sorting of polar channels in the second sequence is consistent with sequence number sorting of polar channels in the third sequence.

Regardless of a manner of online calculation or a manner of pre-calculation and storage, after locations of the information bits are determined, remaining locations may be considered as locations of frozen bits, or referred to as fixed bits. Polar encoding is performed on the K to-be-encoded bits to obtain a bit sequence after polar encoding.

The following describes a sequence of the sequence numbers of the polar channels that is obtained by sorting based on reliability of an $i^{th}$ polar channel in the N polar channels. The sequence numbers of the N polar channels may be 0 to (N–1), or may be 1 to N. In this embodiment of this application, when the reliability of the $i^{th}$ polar channel of the N polar channels is determined, a value of i may be 1, 2, . . . , or N, or may be 0, 1, . . . , or N–1.

It may be understood that the formulas in embodiments of this application are merely examples. Solutions obtained by persons skilled in the art on the basis of simply changing the formulas without affecting performance of the formulas fall within the protection scope of embodiments of this application.

The first sequence may be a part of any one of or any one of the sequence Q1 and the sequence Q2 that are determined based on different criteria. In an embodiment, these sequences may alternatively be represented by using corresponding tables. If a table form is used, entries included in the table are "reliability or sequence numbers of reliability" and "sequence numbers of polar channels", where the "reliability or sequence numbers of reliability" refer to a natural reliability order that is arranged in ascending order or descending order, and the "sequence numbers of polar channels" refer to sequence numbers of polar channels in a corresponding sequence.

Correspondingly, based on the wireless communication network scenario shown in FIG. 1 and the communication system framework shown in FIG. 2, FIG. 5 shows a polar code decoding method according to an embodiment of this application. A specific process is as follows:

Operation 501: Receive to-be-decoded bit information, where the to-be-decoded bit information includes information about K information bits, the K information bits are carried on polar channels corresponding to K sequence numbers of a first sequence, the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$.

Operation 502: Perform polar code decoding based on the to-be-decoded bit information to obtain the K information bits.

It may be understood that it is assumed that the first sequence has M elements after punctured or shortened bit locations are excluded. Then reliability of the polar channels corresponding to the selected K sequence numbers is higher than reliability of polar channels corresponding to remaining (M–K) sequence numbers in the sequence. Preferably, the sequence includes sequence numbers of M polar channels, the sequence numbers of the M polar channels are arranged in the sequence based on reliability of the M polar channels, and M is a positive integer. However, it may be understood that the bit locations that need to be punctured or shortened are excluded in advance due to rate matching, and reliability sorting in the sequence may be discontinuous. In addition, an adjustment of some locations in the sequence also does not affect reliability of channel transmission in this scenario. For example, an interchange among the selected K sequence numbers does not affect selection of the K sequence numbers, provided that the reliability of the polar channels corresponding to the selected K sequence numbers is higher than the reliability of the polar channels corresponding to the remaining (M–K) sequence numbers in the sequence. In an embodiment, the selected K sequence numbers are last K sequence numbers or first K sequence numbers in the first sequence.

In an embodiment, the first sequence is pre-stored.

In an embodiment, when the mother code length N is 4096, a quantity K of information bits is 452, 536, 904, 1048, 1808, 2072, 2712, or 3096. In an embodiment, K may float based on the foregoing value, for example, may be a value obtained by increasing or decreasing the foregoing value by 20. Based on 452, the quantity K of information bits may be an integer between 432 and 472: 433, 434, 435, 436, 437, 438, 439, 440, . . . , 470, 471, or 472. Similarly, based on 536, the quantity K of information bits may be an integer between 516 and 556: 516, 517, . . . , 555, or 556.

Based on 3096, the quantity K of information bits may be an integer between 3076 and 3116: 3076, 3077, . . . 3115, or 3116. Another K value is also applicable.

Alternatively, when the mother code length N is 8192, a quantity K of information bits is 235, 470, 940, 1880, 2820, or 3760. In an embodiment, K may float based on the foregoing value, for example, may be a value obtained by increasing or decreasing the foregoing value by 20. Based on 235, the quantity K of information bits may be an integer between 215 and 255: 215, 216, . . . , 254, or 255. Based on 470, the quantity K of information bits may be an integer between 450 and 490: 450, 451, . . . , 489, or 490. Based on 940, the quantity K of information bits may be an integer between 920 and 960: 920, 921, . . . , 959, or 960. Another K value is also applicable.

In an embodiment, when the mother code length is 4096, the first sequence is the sequence Q1 in this specification; or when the mother code length is 8192, the first sequence is the sequence Q2 in this specification.

In an embodiment, the sequence numbers of the N polar channels are 0 to (N–1) or 1 to N.

In an embodiment, the to-be-encoded bits include a CRC bit.

In an embodiment, the to-be-encoded bits include a PC bit.

Figure 6:
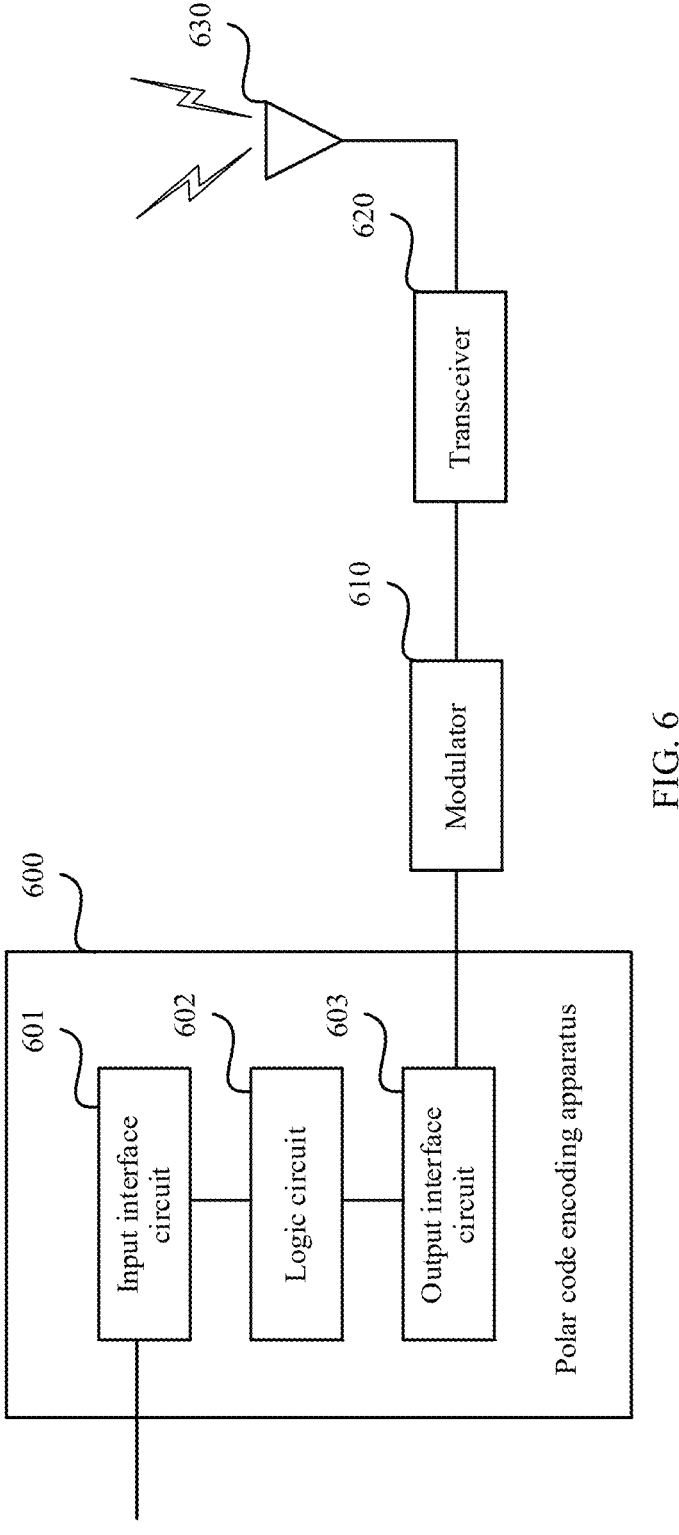
FIG. 6 is a schematic diagram of a polar code encoding apparatus 600 according to an embodiment of this application.

Based on a same inventive concept of the polar code encoding method shown in FIG. 4, as shown in FIG. 6, an embodiment of this application further provides a polar code encoding apparatus 600. The polar code encoding apparatus 600 is configured to perform the polar code encoding method shown in FIG. 4. The polar code encoding method shown in FIG. 4 may be partially or completely implemented by using hardware or software. When the polar code encoding method is implemented by using hardware, the polar code encoding apparatus 600 includes: an input interface circuit 601, configured to obtain to-be-encoded bits; a logic circuit 602, configured to perform the polar code encoding method shown in FIG. 4, where for details, refer to the descriptions of the foregoing method embodiment, and details are not described herein again; and an output interface circuit 603, configured to output an encoded bit sequence.

Further, the encoded bit sequence output by the encoding apparatus 600 is modulated by a modulator 610, and then is output to a transceiver 620. The transceiver 620 performs corresponding processing (including but not limited to digital-to-analog conversion and/or frequency conversion) on the modulated sequence, and then sends a processed bit sequence out by using an antenna 630. It is easy to understand that, from a product integration perspective, in some conditions, the modulator 610 and the transceiver 620 may be a function implementation module or implementation unit, or the transceiver 620 and the antenna 660 may be a function implementation module or implementation unit. In an embodiment, the system may further include a demodulator 611, configured to demodulate the encoded bit information obtained by the transceiver. 611 is not shown in the figure. Similarly, functions of the modulator and the demodulator may be implemented by using one physical entity. For example, 610 may alternatively be a modem, and the encoding apparatus and a decoding apparatus may be a same physical entity.

In an embodiment, the polar code encoding apparatus 600 may be a chip or an integrated circuit in a specific implementation.

Figure 7:
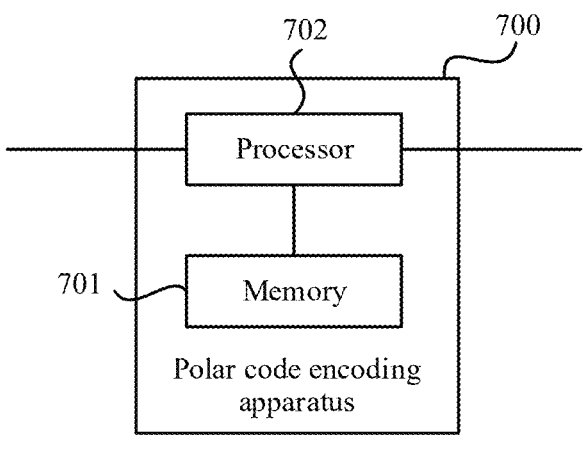
FIG. 7 is a schematic diagram of a polar code encoding apparatus 700 according to an embodiment of this application.

In an embodiment, when the polar code encoding method in the foregoing embodiment is partially or completely implemented by using software, as shown in FIG. 7, a polar code encoding apparatus 700 includes: a memory 701, configured to store a program; and a processor 702, configured to execute the program stored in the memory 701, where when the program is executed, the polar code encoding apparatus 700 may be enabled to implement the polar code encoding method provided in the embodiment in FIG. 4.

In an embodiment, the memory 701 may be a physically independent unit. Alternatively, as shown in FIG. 7, the memory 701 is integrated with the processor 702.

In an embodiment, when the encoding method in the embodiment in FIG. 4 is partially or completely implemented by using software, the polar code transmission apparatus 700 may alternatively include only the processor 702. The memory 701 configured to store the program is located outside the polar code encoding apparatus 700. The processor 702 is connected to the memory 701 by using a circuit/wire, and is configured to read and execute the program stored in the memory 701.

Figure 8:
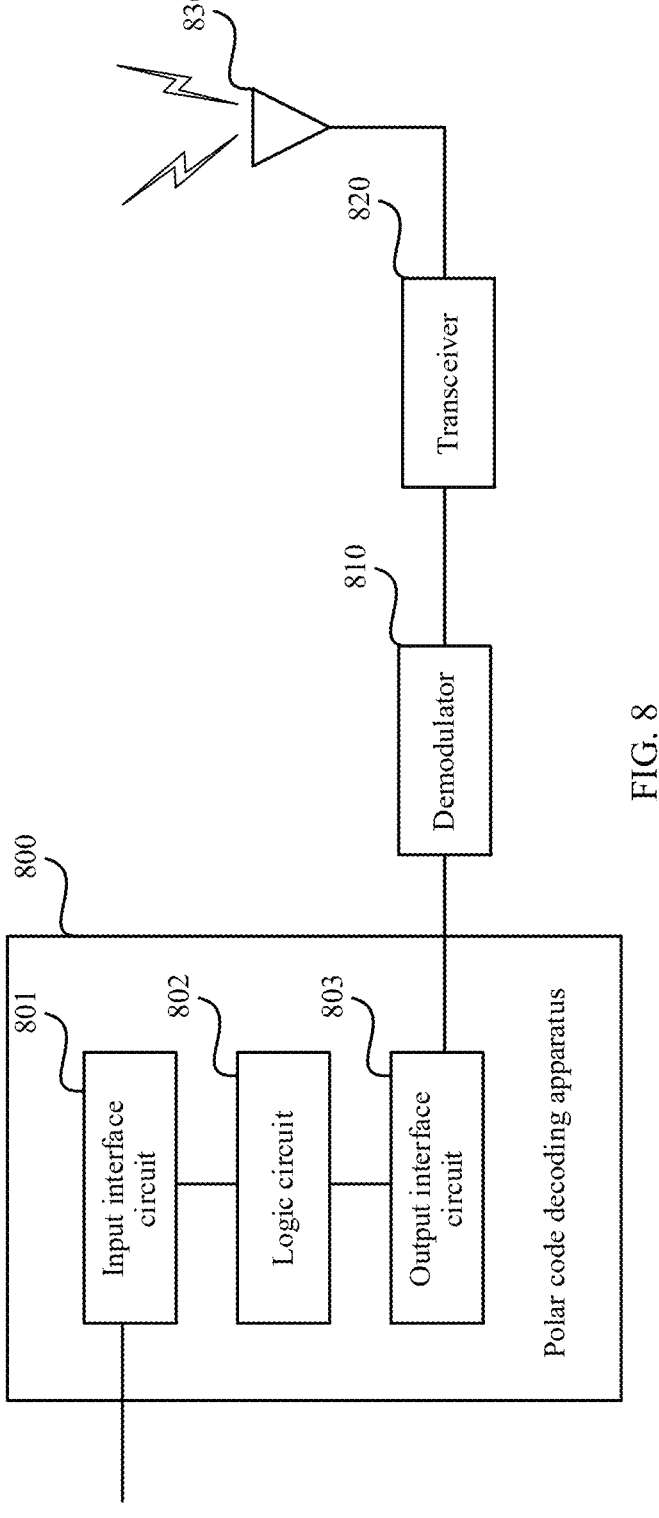
FIG. 8 is a schematic diagram of a polar code decoding apparatus 800 according to an embodiment of this application.

Similarly, based on a same inventive concept of the polar code decoding method shown in FIG. 5, as shown in FIG. 8, an embodiment of this application further provides a polar code decoding apparatus 800. The polar code decoding apparatus 800 is configured to perform the polar code decoding method shown in FIG. 5. The polar code decoding method shown in FIG. 8 may be partially or completely implemented by using hardware or software. When the polar code decoding method is implemented by using hardware, the polar code decoding apparatus 800 includes: an input interface circuit 801, configured to obtain to-be-decoded bits; a logic circuit 802, configured to perform the polar code decoding method shown in FIG. 5, where for details, refer to the descriptions of the foregoing method embodiment, and details are not described herein again; and an output interface circuit 803, configured to output a decoded bit sequence.

Further, the decoding apparatus 800 is further connected to a demodulator 810 and a transceiver 820, and the transceiver 820 is further connected to an antenna 830. The antenna receives encoded bit information, the transceiver performs corresponding processing on the encoded bit information and transmits processed bit information to the demodulator, and the demodulator 810 demodulates the processed encoded bit information and provides demodulated bit information to the decoding apparatus for next processing. It is easy to understand that, from a product integration perspective, in some conditions, the demodulator 810 and the transceiver 820 may be a function implementation module or implementation unit, or the transceiver 820 and the antenna 830 may be a function implementation module or implementation unit.

In an embodiment, the polar code decoding apparatus 800 may be a chip or an integrated circuit in a specific implementation.

Figure 9:
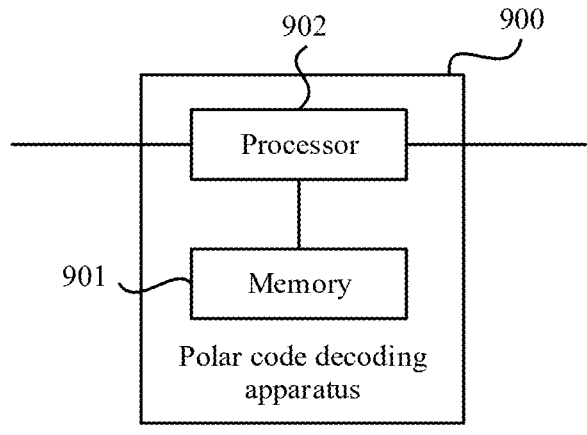
FIG. 9 is a schematic diagram of a polar code decoding apparatus 900 according to an embodiment of this application.

In an embodiment, when the polar code decoding method in the foregoing embodiment is partially or completely implemented by using software, as shown in FIG. 9, a polar code decoding apparatus 900 includes: a memory 901, configured to store a program; and a processor 902, configured to execute the program stored in the memory 901, where when the program is executed, the polar code decoding apparatus 900 may be enabled to implement the polar code decoding method provided in the embodiment in FIG. 5.

In an embodiment, the memory 901 may be a physically independent unit. Alternatively, the memory 901 is integrated with the processor 902.

In an embodiment, when the decoding method in the embodiment in FIG. 5 is partially or completely implemented by using software, the polar code transmission apparatus 900 may alternatively include only the processor 902. The memory 901 configured to store the program is located outside the polar code decoding apparatus 900. The processor 902 is connected to the memory 901 by using a circuit/wire, and is configured to read and execute the program stored in the memory 901.

The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory in the foregoing embodiment may include a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories.

Figure 10:
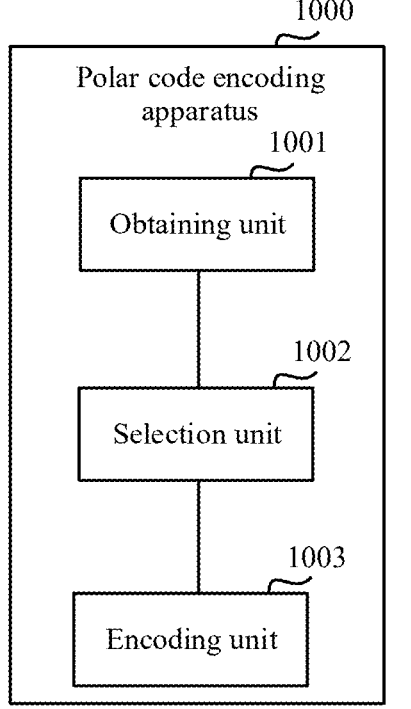
FIG. 10 is a schematic diagram of a polar code encoding apparatus 800 according to an embodiment of this application.

Based on the polar code encoding method shown in FIG. 4, as shown in FIG. 10, an embodiment of this application further provides a polar code encoding apparatus 1000. The polar code encoding apparatus 1000 is configured to perform the polar code encoding method shown in FIG. 4, and the polar code encoding apparatus 1000 includes:

an obtaining unit 1001, configured to obtain K to-be-encoded bits;

a selection unit 1002, configured to select K sequence numbers from a first sequence, where the to-be-encoded bits are placed on polar channels corresponding to the K sequence numbers; and an encoding unit 1003, configured to perform polar code encoding on the K to-be-encoded bits to obtain encoded bits.

The first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$.

The obtaining unit 1001, the selection unit 1002, and/or the encoding unit 1003 of the polar code encoding apparatus 1000 is further configured to partially or completely perform the polar code encoding method shown in FIG. 4. For a specifically implemented function, refer to the foregoing polar code encoding method.

Figure 11:
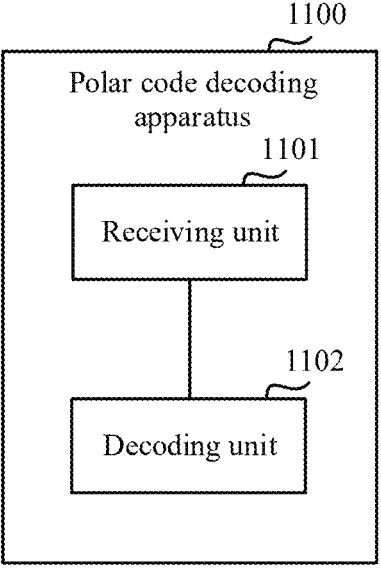
FIG. 11 is a schematic diagram of a polar code decoding apparatus 1100 according to an embodiment of this application.

Based on the polar code decoding method shown in FIG. 5, as shown in FIG. 11, an embodiment of this application further provides a polar code decoding apparatus 1100. The polar code decoding apparatus 1100 is configured to perform the polar code decoding method shown in FIG. 5, and the polar code decoding apparatus 1100 includes:

a receiving unit 1101, configured to receive to-be-decoded bit information, where the to-be-decoded bit information includes information about K information bits, the K information bits are carried on polar channels corresponding to K sequence numbers of a first sequence, the first sequence includes sequence numbers of N polar channels, the first sequence is one or a sub-sequence of a sequence Q1 or Q2 in this specification, K is a positive integer, N is a mother code length of polar code, $N=2^n$, n is a positive integer, and $K \leq N$; and a decoding unit 1102, configured to perform polar code decoding based on the to-be-decoded bit information to obtain the K information bits.

The obtaining unit 1101 and/or the decoding unit 1102 of the polar code decoding apparatus 1100 is further configured to partially or completely perform the polar code decoding method shown in FIG. 5. For a specifically implemented function, refer to the foregoing polar code decoding method.

An embodiment of this application further provides a computer storage medium. The computer storage medium stores a computer program. The computer program includes the polar code encoding method shown in FIG. 4 or the polar code decoding method shown in FIG. 5.

An embodiment of this application further provides a computer program product that includes instructions. When the computer program product runs on a computer, the computer is enabled to perform the polar code encoding method shown in FIG. 4 or perform the polar code decoding method shown in FIG. 5.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and operations are performed on the computer or the another programmable device, so that computer-implemented processing is generated. Therefore, the instructions executed on the computer or the another programmable device provide operations for implementing a specific function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. This application is intended to cover these modifications and variations of embodiments of this application provided that they fall within the scope of the following claims and their equivalent technologies.

The first sequence Q1 is obtained by equally considering performance of code when a to-be-encoded bit length K is 536, 1048, 2072, 3096, 452, 904, 1808, or 2712, a sequence length is 4096, and Q1=

[0,1,2,4,8,16,3,32,5,6,9,64,10,17,12,18,128,33,20,34,7,
24,36,65,11,256,66,40,13,19,68,1 4,129,48,21,72,130,
35,22,25,512,132,37,80,26,38,257,67,136,41,28,258,
96,69,42,15,144,49,260,70, 44,73,131,50,23,1024,264,
74,160,513,133,52,81,27,76,514,134,39,272,82,137,
56,29,516,259,192, 97,138,84,43,30,145,288,98,261,
71,520,140,45,88,146,51,262,100,1025,46,265,75,
2048,161,528,1 48,53,320,1026,266,104,77,162,515,
135,54,273,83,152,57,1028,268,78,544,164,517,274,
193,112,1 39,85,58,31,1032,518,384,289,194,99,276,
168,86,521,141,60,89,147,290,576,263,196,101,522,
142, 1040,47,280,90,2049,176,529,149,292,102,321,
1027,524,267,200,105,2050,92,163,530,150,55,32
2,1056,153,296,1029,106,269,79,640,545,2052,165,
532,275,208,113,154,324,59,1030,270,108,546, 1033,
166,519,385,304,195,114,2056,277,169,87,536,156,
61,1088,328,1034,548,386,291,224,577, 278,197,170,
116,523,143,1041,62,281,91,2064,177,1036,768,578,
388,293,198,103,552,336,172,10 42,525,282,201,120,
2051,93,178,531,151,294,580,323,1152,1057,526,392,
297,202,1044,107,284,2 080,94,641,560,2053,180,
533,209,352,1058,155,325,298,1031,584,271,204,109,
642,547,2054,104 8,167,534,400,305,210,115,2057,
184,326,537,1060,157,300,1089,110,329,1035,644,
549,387,2112, 306,225,592,2058,279,212,171,117,
538,158,1280,63,1090,330,1064,2065,550,416,1037,
769,226,5 79,389,308,199,648,118,553,2060,337,173,
1043,540,283,216,121,1092,2066,332,179,1038,770,
60 8,390,295,228,581,554,338,1153,174,1072,527,
393,312,203,1045,122,2176,285,2081,95,656,561,2
068,181,1096,772,582,448,353,1154,1059,556,394,
340,299,232,1046,585,286,205,2082,124,643,5
62,2055,1049,182,535,401,211,354,2072,1536,185,
327,1156,776,1061,586,396,301,206,1104,111,6
72,344,2084,1050,645,564,402,2113,307,240,593,
2059,213,186,356,539,1062,159,1281,302,1091, 588,
331,1160,1065,646,2304,551,417,2114,1052,784,227,
594,404,2088,309,214,649,119,568,2061, 188,1282,
541,1120,217,360,1093,1066,2067,333,418,1039,771,
704,609,391,2116,310,229,650,596, 555,2062,339,
1168,175,1073,542,408,313,218,1284,123,1094,2177,
2096,334,657,1068,800,2069, 610,420,1097,773,230,
583,449,368,1155,652,1074,557,395,2120,341,314,
233,1047,600,2178,287, 220,2083,125,658,563,2070,
1288,183,1098,774,612,450,355,1184,2073,1537,558,
424,342,1157,77 7,234,1076,587,397,316,207,2560, 1105,126,673,2180,345,2085,1051,660,565,403,2128,
241,1100, 832,2074,1538,452,187,357,1158,778,1063,
616,398,1296,303,236,1106,589,674,346,1161,2086,
10 80,647,2305,566,432,2115,1053,785,242,2184,595,
405,2089,215,664,358,569,2076,1540,189,1283, 1216,
780,1121,590,456,361,1162,1108,1067,676,2306,348,
419,2144,1054,786,705,624,406,2117,2 090,311,244,
651,597,570,2063,1169,190,1312,543,409,1122,219,
1285,362,1095,2192,1544,2097,3 35,1164,896,1069,
801,706,2308,611,421,2118,1112,788,231,680,598,
464,2092,369,1170,653,1075, 572,410,2121,315,248,
1286,601,1124,2179,221,2098,364,659,1070,802,
2071,1289,422,1099,775,7 08,613,451,3072,370,1185,
654,2312,1552,559,425,2122,343,1172,792,235,1077,
602,412,2208,317, 222,2561,1344,127,688,2181,2100,
1290,661,1128,804,2129,614,480,1101,833,1186,
2075,1539,45 3,426,372,1159,779,712,1078,617,399,
2124,1297,318,237,2562,1107,604,675,2182,347,
1176,2087, 1081,662,2320,567,433,2130,1292,243,
1102,2185,834,2104,1568,454,665,359,1188,808,
2077,154 1,618,428,1298,1217,781,238,1136,591,457,
376,1163,2564,1109,1082,677,2307,2240,349,434,214
5,1055,787,720,2186,625,407,2132,2091,245,666,836,
571,2078,1542,1408,191,1313,1218,782,112 3,620,
458,1300,363,1192,1110,2193,1545,678,2336,350,
1165,897,2146,1084,816,707,2309,626,43 6,2119,
2568,1113,789,246,681,2188,599,465,2093,1171,668,
1314,573,411,2136,1600,249,1287,12 20,840,1125,
2194,1546,460,2099,365,1166,898,1071,803,736,
2310,1304,423,2148,1114,790,709,6 82,628,466,3073,
2094,371,1200,655,2313,1553,574,440,2123,1173,
793,250,1316,603,413,1126,22 09,223,2576,1345,366,
689,2196,1548,2101,1291,1224,900,1129,805,710,
2368,615,481,3074,1116, 848,1187,684,2314,1554,
468,427,2152,373,1174,794,713,1079,632,414,2125,
2210,319,252,2563,1 346,605,690,2183,1177,2102,
1320,663,2321,1130,806,2131,1293,482,1103,2200,
835,1664,2105,15 69,455,3076,904,374,1189,809,714,
2316,1556,619,429,2126,1299,1232,796,239,2592,
1137,606,47 2,2212,377,1178,2565,1348,1083,692,
2322,2241,435,2160,1294,721,1132,2187,864,2133,
2106,15 70,484,667,837,1190,810,2079,1543,1409,
430,1328,1219,783,716,1138,621,459,3080,1301,378,
11 93,2566,1111,2432,1560,679,2337,2242,351,1180,
912,2147,1085,817,722,2324,2216,627,437,2134,
2569,1352,247,696,2189,838,2108,1572,1410,669,
1315,1248,812,2137,1601,622,488,1302,1221,8
41,1194,1140,2195,1547,461,2338,380,1167,899,
2624,1086,818,737,2311,2244,1305,438,2149,257
0,1115,791,724,683,2190,629,467,3088,2095,1201,
670,2328,1792,575,441,2138,1602,1412,251,13
17,1222,842,1127,2224,1576,462,2577,1360,367,
1196,928,2197,1549,738,2340,1306,1225,901,21
50,1144,820,711,2369,630,496,3075,2572,1117,849,
1202,685,2315,2248,1555,469,442,2153,1175, 795,
728,1318,633,415,2140,1604,2211,253,2578,1347,
844,691,2198,1550,1416,2103,1321,1226,9 02,1131,
807,740,2370,1308,483,3104,1118,2201,850,1665,
686,2344,1584,470,3077,905,2154,375, 1204,824,715,
2317,1557,634,444,2127,2688,1233,797,254,2593,
1376,607,473,2213,1179,2580,13 49,1322,693,2323,
2256,1608,2161,1295,1228,960,1133,2202,865,1666,
2372,2107,1571,485,3078, 906,852,1191,811,744,
2318,1558,1424,431,2156,1329,1234,798,717,2594,
1139,636,474,3081,2214, 379,1208,2567,1350,2433,
1561,694,2352,2243,1181,913,2162,1324,723,2325,
1134,2217,866,213 5,2584,1353,486,697,2204,839, 1668,2109,1573,1411,3136,908,1330,1249,813,718,
2376,1616,623, 489,3082,1303,1236,856,1195,2596,
1141,2434,1562,476,2339,2272,381,1182,914,2625,
1087,819,7 52,2326,2245,2218,439,2164,2571,1354,
725,698,2191,868,3089,2110,1574,1440,671,2329,
1793,1 250,814,2139,1603,1413,490,1332,1223,843,
1672,1142,2225,1577,463,3084,2816,1361,382,1197,
929,2626,2436,1564,739,2341,2246,1307,1240,916,
2151,2600,1145,821,726,2384,2220,631,497,3 090,
2573,1356,1203,700,2330,2249,1794,443,2168,1632,
1414,729,1319,1252,872,2141,1605,2226, 1578,492,
2579,1362,845,1198,930,2199,1551,1417,2342,1336,
1227,903,2628,1146,822,741,2371, 3200,1309,498,
3105,2574,1119,2440,851,1680,687,2345,2250,1585,
471,3092,920,2155,1205,825, 730,2332,1796,635,445,
2142,1606,2689,1472,255,2608,1377,846,2228,1580,
1418,2581,1364,1323, 1256,932,2257,1609,742,2400,
1310,1229,961,3106,1148,2203,880,1667,2373,2346,
1586,500,307 9,907,2632,853,1206,826,745,2319,
2252,1559,1425,446,2157,2690,1235,799,732,2595,
1378,637,4 75,3096,2215,1209,2582,1351,2448,1800,
695,2353,2258,1610,1420,2163,1325,1230,962,1135,
223 2,867,1696,2374,2585,1368,487,3108,936,2205,
854,1669,746,2348,1588,1426,3137,909,2158,133
1,1264,828,719,2377,1617,638,504,3083,2692,1237,
857,1210,2597,1380,2435,1563,477,2354,227 3,1183,
915,2640,1326,753,2327,2260,1612,2219,2165,2586,
1355,964,699,2206,869,1670,3328,21 11,1575,1441,
3138,910,1808,1251,815,748,2378,1618,1428,491,
3112,1333,1238,858,1673,2598,11 43,2464,1592,478,
3085,2817,2274,383,1212,944,2627,2437,1565,754,
2356,2247,2696,1241,917,2 166,2601,1384,727,2385,
2221,870,3091,2588,1357,1442,701,2331,2264,1795,
1728,2169,1633,141 5,3140,968,1334,1253,873,1674,
2380,1620,2227,1579,493,3086,2818,1363,860,1199,
931,2656,24 38,1566,1432,2343,2276,1337,1242,918,
2629,2602,1147,823,756,2386,3201,2222,499,3120,
2575, 1358,2441,1681,702,2360,2251,1824,3093,921,
2170,1634,1444,731,2333,1797,1254,874,2143,160
7,2704,1473,494,2609,1392,847,1676,2229,1581,
1419,3144,2820,1365,1338,1257,933,2630,2496,
1624,743,2401,3202,1311,1244,976,3107,2604,1149,
2442,881,1682,2388,2347,2280,1587,501,309 4,922,
2633,1207,827,760,2334,2253,1798,447,2172,1636,
2691,1474,733,2610,1379,876,3097,223 0,1582,1448,
2583,1366,2449,1801,1258,934,2259,1611,1421,2402,
1340,1231,963,3584,1150,2233, 882,1697,2375,3204,
2824,1369,502,3109,937,2634,2444,855,1684,747,
2349,2254,1589,1427,315 2,924,2159,2720,1265,829,
734,2392,1856,639,505,3098,2693,1476,1211,2612,
1381,2450,1802,23 55,2288,1640,1422,2641,1327,
1260,992,2261,1613,2234,1698,2404,2587,1370,965,
3110,938,2207, 884,1671,3329,2350,1590,1456,3139,
911,2636,1809,1266,830,749,2379,3208,1619,1429,
506,311 3,2694,1239,859,1688,2599,1382,2465,1593,
479,3100,2832,2275,1213,945,2642,2452,1804,755,2
357,2262,1614,2697,1480,2167,2616,1385,966,2236,
871,1700,3330,2589,1372,1443,3168,940,226 5,1810,
1729,750,2408,1648,1430,3141,969,3114,1335,1268,
888,1675,2381,1621,2466,1594,508,3 087,2819,2752,
861,1214,946,2657,2439,1567,1433,2358,2277,2698,
1243,919,2644,2603,1386,757, 2387,3216,2223,3121,
2590,1359,2456,1920,703,2361,2266,1825,1730,3332,
2171,1635,1445,3142, 970,1812,1255,875,1704,2382,
1622,2705,1488,495,3116,2848,1393,862,1677,2658,
2468,1596,14 34,3145,2821,2278,1339,1272,948,
2631,2497,1625,758,2416,3203,2700,1245,977,3122, 2605,1388, 2443,1683,2389,2362,2281,1826,3095,
923,2648,1446,761,2335,2268,1799,1732,2173,1637,
2706, 1475,972,2611,1394,877,1678,3336,2231,1583,
1449,3146,2822,1367,1816,1259,935,2660,2498,16
26,1436,2403,3232,1341,1246,978,3585,2606,1151,
2472,883,1712,2390,3205,2825,2282,503,3124, 952,
2635,2445,1685,762,2364,2255,1828,3153,925,2174,
1638,2721,1504,735,2393,1857,878,309 9,2708,1477,
1450,2613,1396,2451,1803,1736,2289,1641,1423,
3148,2880,1342,1261,993,3586,250 0,1628,2235,
1699,2405,3206,2826,1371,980,3111,939,2664,2446,
885,1686,3344,2351,2284,1591, 1457,3154,926,2637,
2722,1267,831,764,2394,3209,1858,507,3128,2695,
1478,1689,2614,1383,248 0,1832,3101,2833,2290,
1642,1452,2643,2453,1805,1262,994,2263,1615,2712,
1481,2406,2617,140 0,967,3588,2237,886,1701,3331,
3264,2828,1373,1458,3169,941,2638,2504,1811,1744,
751,2409,3 210,1649,1431,3156,984,3115,2724,1269,
889,1690,2396,1860,2467,1595,509,3102,2834,2753,
121 5,947,2672,2454,1806,2359,2292,1644,2699,
1482,2645,2618,1387,996,3217,2238,1702,3360,2591,
1374,2457,1921,3170,942,2267,1840,1731,3333,2410,
1650,1460,3143,971,3592,1813,1270,890,1 705,2383,
3212,1623,2944,1489,510,3117,2849,2754,863,1692,
2659,2469,1597,1435,3160,2836,22 79,2728,1273,
949,2646,2512,1864,759,2417,3218,2701,1484,3123,
2620,1389,2458,1922,2363,229 6,1827,1760,3334,
2649,1447,3172,1000,2269,1814,1733,1706,2412,
1652,2707,1490,973,3118,285 0,1395,892,1679,3337,
2470,1598,1464,3147,2823,2756,1817,1274,950,2661,
2499,1627,1437,2418, 3233,2702,1247,979,3600,
2607,1390,2473,1713,2391,3220,2840,2283,3125,953,
2650,2460,1924, 763,2365,2270,1829,1734,3392,
2175,1639,2736,1505,974,1872,879,1708,3338,2709,
1492,1451,31 76,2852,1397,1818,1737,2662,2528,
1656,1438,3149,2881,3234,1343,1276,1008,3587,
2501,1629,2 474,1714,2420,3207,2827,2760,981,
3126,954,2665,2447,1687,3345,2366,2285,1830,3155,
927,265 2,2723,1506,765,2395,3224,1859,3129,2710,
1479,1928,2615,1398,2481,1833,1738,3340,2291,164
3,1453,3150,2882,1820,1263,995,3616,2502,1630,
2713,1496,2407,3236,2856,1401,982,3589,2666,
2476,887,1716,3346,3265,2829,2286,1459,3184,956,
2639,2505,1745,766,2424,3211,1888,3157,9 85,3130,
2725,1508,1691,2397,1861,2482,1834,3103,2835,
2768,1454,2673,2455,1807,1740,2293,1 645,2714,
1483,2884,2619,1402,997,3590,3456,2239,1703,3361,
3266,2830,1375,1936,3171,943,26 68,2506,1841,
1746,3348,2411,3240,1651,1461,3158,986,3593,2726,
1271,891,1720,2398,3213,186 2,2945,511,3132,2864,
2755,1693,2674,2484,1836,3161,2837,2294,1646,
2729,1512,2647,2513,186 5,998,3219,2716,1485,
3362,2621,1404,2459,1923,3648,2297,1842,1761,
3335,3268,2888,1462,317 3,1001,3594,2508,1815,
1748,1707,2413,3214,1653,2946,1491,988,3119,2851,
2784,893,1694,3352, 2471,1599,1465,3162,2838,
2757,2730,1275,951,2676,2514,1866,2419,3248,2703,
1486,3601,2622, 1391,2488,1952,3221,2841,2298,
1762,3364,2651,2461,1925,3174,1002,2271,1844,
1735,3393,241 4,1654,2737,1520,975,3596,1873,894,
1709,3339,3272,2948,1493,1466,3177,2853,2758,
1819,1752, 2663,2529,1657,1439,3164,2896,3235,
2732,1277,1009,3602,2516,1868,2475,1715,2421,
3222,284 2,2761,3127,955,2680,2462,1926,2367,
2300,1831,1764,3394,2653,2738,1507,1004,3225,
1874,171 0,3368,2711,1494,1929,3178,2854,1399,
1848,1739,3341,2530,1658,1468,3151,2883,3712, 1821,12 78,1010,3617,2503,1631,2952,1497,2422,
3237,2857,2762,983,3604,2667,2477,1717,3347,3280,
28 44,2287,3185,957,2654,2520,1984,767,2425,3226,
1889,3396,3131,2740,1509,1930,1876,2483,183
5,1768,3342,2769,1455,3180,2912,1822,1741,3618,
2532,1660,2715,1498,2885,3238,2858,1403,10
12,3591,3457,2478,1718,3376,3267,2831,2764,1937,
3186,958,2669,2507,1747,3349,2426,3241,18
90,3159,987,3608,2727,1510,1721,2399,3228,1863,
2960,3133,2865,2770,1932,2675,2485,1837,17
42,3400,2295,1647,2744,1513,2886,1880,999,3620,
3458,2717,1500,3363,3296,2860,1405,1938,36
49,2670,2536,1843,1776,3350,3269,2889,3242,1463,
3188,1016,3595,2509,1749,1722,2428,3215,1 892,
2947,989,3134,2866,2785,1695,3353,2486,1838,3163,
2839,2772,2731,1514,2677,2515,1867,3 249,2718,
1487,3840,2623,1406,2489,1953,3650,3460,2299,
1763,3365,3270,2890,1940,3175,1003, 3624,2510,
1845,1750,3408,2415,3244,1655,2976,1521,990,3597,
2786,895,1724,3354,3273,2949,1 467,3192,2868,
2759,1753,2678,2544,1896,3165,2897,3250,2733,
1516,3603,2517,1869,2490,1954, 3223,2843,2776,
3366,2681,2463,1927,3652,2301,1846,1765,3395,
2892,2739,1522,1005,3598,346 4,1875,1711,3369,
3274,2950,1495,1944,3179,2855,2788,1849,1754,
3356,2531,1659,1469,3166,28 98,3713,2734,1279,
1011,3632,2518,1870,2953,2423,3252,2872,2763,
3605,2682,2492,1956,3281,2 845,2302,1766,3424,
2655,2521,1985,1006,3227,1904,3397,3370,2741,
1524,1931,3656,1877,1850, 1769,3343,3276,3008,
1470,3181,2913,3714,1823,1756,3619,2533,1661,
2954,1499,2900,3239,285 9,2792,1013,3606,3472,
2479,1719,3377,3282,2846,2765,3187,959,2684,2522,
1986,2427,3256,189 1,3398,3609,2742,1511,1960,
3229,1878,2961,1770,3372,2771,1933,3182,2914,
1852,1743,3401,25 34,1662,2745,1528,2887,3716,
1881,1014,3621,3459,2956,1501,3378,3297,2861,
2766,1939,3664,2 671,2537,1777,3351,3284,2904,
3243,3189,1017,3610,2524,1988,1723,2429,3230,
1893,2962,3135, 2867,2800,1934,2487,1839,1772,
3402,2773,2746,1515,2916,1882,3622,3488,2719,
1502,3841,329 8,2862,1407,1968,3651,3461,2538,
1778,3380,3271,2891,3720,1941,3190,1018,3625,
2511,1751,34 09,2430,3245,1894,2977,991,3612,
2787,1725,3355,3288,2964,3193,2869,2774,1992,
2679,2545,18 97,3404,3251,2748,1517,3842,1884,
2491,1955,3680,3462,2777,3367,3300,2920,1942,
3653,3626,2 540,1847,1780,3410,2893,3246,2978,
1523,1020,3599,3465,1726,3384,3275,2951,1945,
3194,2870, 2789,1755,3357,2546,1898,3167,2899,
3728,2735,1518,3633,2519,1871,2968,3253,2873,
2778,384 4,2683,2493,1957,3654,3520,2303,1767,
3425,2894,2000,1007,3628,3466,1905,3412,3371,
3304,29 80,1525,1946,3657,2790,1851,1784,3358,
3277,3009,1471,3196,2928,3715,1757,3634,2548,
1900,2 955,2901,3254,2874,2793,3607,3473,2494,
1958,3283,2847,2780,3426,2685,2523,1987,3257,
1906, 3399,3848,2743,1526,1961,3658,3468,1879,
1771,3373,3278,3010,1948,3183,2915,3744,1853,175
8,3416,2535,1663,2984,1529,2902,3717,2794,1015,
3636,3474,2957,3379,3312,2876,2767,3665,26
86,2552,2016,3285,2905,3258,3428,3611,2525,1989,
1962,3231,1908,2963,3374,2801,1935,3660,1 854,
1773,3403,3012,2747,1530,2917,3718,1883,3623,
3489,2958,1503,3856,3299,2863,2796,1969, 3666,
3476,2539,1779,3381,3286,2906,3721,3191,1019,
3640,2526,1990,2431,3260,1895,2992,361 3,2802, 1964,3289,2965,1774,3432,2775,1993,2918,1912,
3405,3490,2749,1532,3843,3776,1885,19    70,3681,
3463,3016,3382,3301,2921,3722,1943,3668,3627,
2541,1781,3411,2908,3247,2979,1021,3    614,3480,
1727,3385,3290,2966,3195,2871,2804,1994,2547,
1899,3406,3729,2750,1519,3872,1886,    2969,3682,
3492,2779,3845,3302,2922,1972,3655,3521,2542,
1782,3440,2895,3724,2001,1022,362    9,3467,3413,
3386,3305,2981,1947,3672,2791,1785,3359,3292,
3024,3197,2929,3730,1996,3635,25    49,1901,2970,
3255,2875,2808,3846,2495,1959,3684,3522,2781,
3427,2924,2002,3630,3496,1907,3    414,3849,3306,
2982,1527,1976,3659,3469,1786,3388,3279,3011,
1949,3198,2930,3745,1759,3417,    2550,1902,2985,
2903,3732,2795,3637,3475,2972,3313,2877,2782,
3904,2687,2553,2017,3524,325    9,3429,3850,2004,
1963,3688,3470,1909,3375,3308,3040,1950,3661,
3746,1855,1788,3418,3013,29    86,1531,2932,3719,
3638,3504,2959,3857,3314,2878,2797,3667,3477,
2554,2018,3287,2907,3736,3    430,3641,2527,1991,
3261,1910,2993,3852,2803,1965,3662,3528,1775,
3433,3014,2008,2919,3748,    1913,3420,3491,2988,
1533,3858,3777,2798,1971,3696,3478,3017,3383,
3316,2936,3723,3669,364    2,2556,2020,2909,3262,
2994,3615,3481,1966,3291,2967,3434,2805,1995,
1914,3407,3968,2751,15    34,3873,3778,1887,3683,
3493,3018,3860,3303,2923,3752,1973,3670,3536,
2543,1783,3441,2910,3    725,1023,3644,3482,3387,
3320,2996,3673,2806,2024,3293,3025,3436,3731,
1997,3874,1916,2971,    3494,2809,3847,3780,1974,
3685,3523,3020,3442,2925,3726,2003,3631,3497,
3415,3864,3307,298    3,1977,3674,3484,1787,3389,
3294,3026,3199,2931,3760,1998,2551,1903,3000,
3733,2810,3876,29    73,3686,3552,2783,3905,2926,
2032,3525,3498,3444,3851,3784,2005,1978,3689,
3471,3390,3309,3    041,1951,3676,3747,1789,3419,
3028,2987,2933,3734,3639,3505,2974,3315,2879,
2812,3906,2555,    2019,3526,3737,3431,3880,2006,
3690,3500,1911,3853,3310,3042,1980,3663,3529,
1790,3448,301    5,2009,2934,3749,3421,3506,2989,
3859,3792,2799,3697,3479,3032,3317,2937,3738,
3908,3643,25    57,2021,3263,2995,3854,1967,3692,
3530,3435,3044,2010,3750,1915,3422,3969,2990,
1535,3888,3    779,3698,3508,3019,3861,3318,2938,
3753,3671,3537,2558,2022,2911,3740,3645,3483,
3321,2997,    3912,2807,2025,3532,3437,3970,2012,
3875,3808,1917,3495,3048,3862,3781,3754,1975,
3700,353    8,3021,3443,2940,3727,3646,3512,3865,
3322,2998,3675,3485,2026,3295,3027,3438,3761,
1999,19    18,3001,3972,2811,3877,3782,3687,3553,
3022,3920,2927,3756,2033,3540,3499,3445,3866,
3785,1    979,3704,3486,3391,3324,3056,3677,3762,
2028,3029,3002,3735,3878,2975,3554,2813,3907,
2034,    3527,3976,3446,3881,3786,2007,3691,3501,
3868,3311,3043,1981,3678,3544,1791,3449,3030,293
5,3764,3507,3004,3793,2814,3936,3033,3556,3739,
3909,3882,2036,3502,3855,3788,1982,3693,35
31,3450,3045,2011,3751,3423,3984,2991,3889,3794,
3699,3509,3034,3319,2939,3768,3910,2559,2    023,
3741,3884,3694,3560,3913,3046,2040,3533,3452,
3971,2013,3890,3809,3510,3049,3863,3796,    3755,
3701,3539,3036,2941,3742,3647,3513,3323,2999,
3914,2027,3534,3439,4000,2014,3810,191    9,3973,
3050,3892,3783,3702,3568,3023,3921,2942,3757,
3541,3514,3867,3800,3705,3487,3325,30    57,3916,
3763,2029,3003,3974,3879,3812,3555,3052,3922,
3758,2035,3542,3977,3447,3896,3787,3    706,3516, 3869,3326,3058,3679,3545,2030,3031,3765,3005,
4032,2815,3937,3557,3978,3924,3883,    3816,2037,
3503,3870,3789,1983,3708,3546,3451,3060,3766,
3985,3006,3795,3938,3035,3558,376    9,3911,2038,
3980,3885,3790,3695,3561,3928,3047,2041,3548,
3453,3986,3891,3824,3511,3064,37    97,3770,3940,
3037,3743,3886,3562,3915,2042,3535,3454,4001,
2015,3811,3988,3051,3893,3798,3    703,3569,3038,
2943,3772,3515,3801,3944,3564,3917,4002,2044,
3975,3894,3813,3570,3053,3923,    3759,3543,3992,
3897,3802,3707,3517,3327,3059,3918,2031,4004,
3814,4033,3054,3952,3572,397    9,3925,3898,3817,
3518,3871,3804,3709,3547,3061,3767,3007,4034,
3939,3559,4008,3926,3818,20    39,3981,3900,3791,
3710,3576,3929,3062,3549,3987,3825,3065,4036,
3771,3941,3982,3887,3820,3    563,3930,2043,3550,
3455,4016,3826,3989,3066,3799,3942,3039,3773,
4040,3945,3565,3932,4003,    2045,3990,3895,3828,
3571,3068,3774,3993,3803,3946,3566,3919,2046,
4005,3815,4048,3055,395    3,3573,3994,3899,3832,
3519,3805,3948,4006,4035,3954,3574,4009,3927,
3819,3996,3901,3806,37    11,3577,3063,4064,4037,
4010,3956,3983,3902,3821,3578,3931,3551,4017,
3827,3067,4038,3943,4    012,3822,4041,3960,3580,
3933,4018,3991,3829,3069,3775,4042,3947,3567,
3934,2047,4020,3830,    4049,3070,3995,3833,4044,
3949,4007,4050,3955,3575,4024,3834,3997,3807,
3950,4065,4052,401    1,3957,3998,3903,3836,3579,
4066,4039,3958,4013,3823,4056,3961,3581,4019,
4068,4014,4043,39    62,3582,3935,4021,3831,3071,
4072,4045,3964,4022,4051,4025,3835,4046,3951,
4080,4053,4026,3    999,3837,4067,4054,3959,4028,
3838,4057,4069,4015,4058,3963,3583,4070,4073,
4060,3965,4023,    4074,4047,3966,4081,4027,4076,
4082,4055,4029,3839,4084,4030,4059,4071,4088,
4061,4075,406    2,3967,4077,4083,4078,4085,4031,
4086,4089,4090,4063,4092,4079,4087,4091,4093,
4094,4095,].

The first sequence Q2 is obtained by equally considering performance of code when a to-be-encoded bit length K is 235, 470, 940, 1880, 2820, or 3760, a sequence length is 8192 (for the sake of length and actual use, a length of an actual sequence currently displayed by Q2 is 3760, a maximum information bit quantity in this scenario is 3760 when the mother code length is 8192, and therefore, only 3760 sequence numbers in the 8192 sequence numbers need to be concerned), and Q2=

[6309,5445,6419,5391,6298,6203,5667,5287,6414,5654,
6252,5425,5330,5235,6310,666    3,5446,5657,6339,
5277,3623,6258,5420,4819,6421,5230,6313,6231,
5449,3381,3721,6300,4935,62    05,5669,5507,5004,
5426,5345,4909,4814,3613,3289,5399,5332,5291,
6692,5237,5658,6435,5278,3    405,5010,5183,4915,
6422,6341,6314,3681,6260,3463,6667,5450,4821,
3382,3301,4794,3722,6287,    4964,3668,3627,6206,
5670,3411,4767,6425,3247,2979,5346,4910,3614,
6235,3480,5699,5509,458    6,3385,3290,5428,2966,
5319,4939,5768,3195,5238,6321,5673,4559,7180,
5457,4478,5293,3406,50    25,6722,3729,6532,5660,
4835,6437,6342,5403,2969,5336,5012,3682,6247,
3492,6696,5241,2779,4    917,4822,3845,6480,3302,
2922,6316,4727,4593,3655,7186,3521,6669,5452,
5299,3440,4796,2895,    6426,3724,6345,4539,3629,
6264,3467,5728,5510,3413,4825,3386,3305,5415,
2981,5348,4968,194    7,3672,6237,5701,2791,6322,
5674,4588,3359,3292,6675,5458,4941,5294,3197,
5026,2929,3730,62    95,5647,5513,3635,6438,2549, 1901,5432,2970,5323,4999,6724,3255,2875,5242,
4918,4837,3846,6 467,5405,2495,1959,4594,3684,
7201,3522,6670,5215,2781,6536,4947,5776,3427,
4783,2924,6441, 6346,5681,2002,4567,7188,5016,
3630,6251,3496,1907,5301,3414,4921,4826,3849,
6428,3306,589 2,2982,1527,4731,1976,4541,3659,
6238,3469,5702,6785,5568,1786,4351,3388,3279,
6704,5473,30 11,4942,1949,3198,2930,3745,6324,
5676,1759,5514,3417,6677,5460,2550,1902,5419,
2985,5352,5 028,2903,3732,6353,5705,2795,4838,
3637,6496,3475,5406,2972,5325,5057,7202,3313,
2877,5244, 2782,6299,4976,5763,6469,2687,6442,
2553,5682,2017,4596,7175,3524,5003,6728,3259,
4949,530 2,3429,4922,4841,3850,6415,6348,5655,
2004,5521,1963,4542,3688,6253,3470,1909,6786,
5331,48 95,4828,3375,3308,6691,5474,3040,4733,
1950,4571,3661,7192,3746,6311,1855,1788,5305,
3418,6 678,5447,3013,6544,5896,2986,1531,4791,
2932,6449,3719,6354,5706,5516,3638,6259,3504,
5421, 2959,5326,5058,3857,3314,2878,5231,2797,
6328,4963,5792,3667,6470,3477,6681,5464,2554,201
8,4583,7204,3287,5032,2907,3736,6301,4950,5765,
3430,4842,3641,6444,2527,5684,1991,5522,72
33,5005,6254,3261,1910,5427,2993,5360,4924,4815,
3852,6473,5713,2803,4734,1965,4600,3662,7 179,
3528,6788,5333,4953,1775,5306,3433,6693,5476,
3014,6531,5659,2008,4573,2919,6450,3748, 6369,
1913,5279,3420,5011,6736,3491,5422,2988,1533,
4849,3858,6423,3777,6356,5708,2798,631 5,1971,
3696,6261,3478,6682,5451,3017,5060,3383,3316,
4795,2936,3723,6302,4965,5766,3669,36 42,6207,
2556,5671,2020,5537,7234,5006,2909,3262,5904,
2994,5347,4911,4844,3615,6474,3481,5 714,5524,
1966,4587,7208,3291,5429,2967,5334,4954,5769,
3434,6694,5239,2805,6560,5688,1995, 4574,7181,
6913,6370,1914,4479,5308,3407,5040,6723,3968,
6533,5661,2751,1534,4850,3873,645 2,3778,6343,
1887,6792,5337,5013,3683,6262,3493,6697,5480,
3018,4823,3860,6481,3303,2923,37 52,6317,4966,
1973,3670,7187,3536,6684,5453,2543,1783,5538,
3441,4797,2910,6427,3725,6360,5 891,5824,1023,
3644,6265,3482,5729,5511,7236,5064,3387,3320,
5430,2996,5349,4969,5770,3673, 6476,5716,2806,
6323,5675,2024,4589,7182,3293,6914,5459,3025,
4956,5295,3436,5027,6752,373 1,6534,5662,1997,
5528,3874,6439,6372,1916,5433,2971,5338,5014,
6725,3494,6698,5243,2809,49 19,4852,3847,6482,
3780,7297,6318,1974,4595,3685,7216,3523,6671,
5454,3020,6537,5777,3442,4 798,2925,6456,3726,
6347,5920,2003,7189,5017,3631,6266,3497,5730,
5540,3415,4827,3864,6429, 3307,5893,2983,5350,
4970,1977,3674,6239,3484,5703,6800,5569,1787,
4590,3389,3294,6705,548 8,3026,4943,5772,3199,
2931,3760,6325,5677,1998,5515,7240,6916,5461,
2551,1903,5434,3000,53 53,5029,6726,3733,6592,
5720,2810,4839,3876,6497,7298,5407,2973,5340,
5072,3686,7203,3552,6 700,5245,2783,6538,4977,
5778,3905,6484,2926,6443,6376,5683,2032,4597,
7190,3525,5018,6729, 3498,5303,3444,4923,4856,
3851,6430,3784,6349,5894,2005,1978,4543,3689,
6268,3471,5732,678 7,5570,4829,3390,3309,6706,
5475,3041,4972,1951,3676,7193,3747,6326,5678,
1789,5544,3419,66 79,5462,3028,6545,5897,2987,
5354,5030,2933,3734,6355,5707,5517,3639,6498,
3505,5436,2974,5 327,5059,3315,2879,5246,2812,
6329,4978,5793,3906,6471,7300,6920,5465,2555,
2019,4598,7205, 3526,5033,6730,3737,6540,4951, 5780,3431,4843,3880,6350,5685,2006,5523,7248,
5020,3690,625 5,3500,1911,6816,5361,4925,4830,
3853,6488,3310,5952,3042,4735,1980,4601,3663,
7194,3529,67 89,5572,1790,5307,3448,6708,5477,
3015,6546,5898,2009,2934,3749,6384,5736,5518,
3421,3506,5 423,2989,5356,5088,3859,3792,2799,
5794,3697,6500,3479,5466,3032,5061,3317,5034,
2937,3738, 4980,3908,7425,3643,2557,2021,5552,
5007,3263,5905,2995,5362,4926,4845,3854,7304,
1967,460 2,3692,3530,5335,4955,5784,3435,3044,
2010,4575,6928,3750,1915,5309,3422,5041,3969,
5900,29 90,1535,4851,3888,3779,5576,3698,3508,
3019,5062,3318,2938,4967,7426,3537,2558,2022,
7264,5 036,2911,3740,4846,3645,3483,5744,3321,
2997,4984,3912,2807,2025,4604,3532,6848,3437,
3970, 2012,3808,1917,3048,7312,1975,3021,6016,
2940,7428,3512,2998,2026,6944,1918,3972,3920,305
6,7681,6445,6451,6737,6357,5709,6330,6683,7206,
6303,5767,6446,5686,7235,6732,6475,5715,55
25,7209,6790,6695,5478,6561,5689,7196,6371,6738,
6548,6453,6358,5710,6793,6263,6712,5481,3 861,
3753,6332,5796,3671,6685,5468,5539,6361,5906,
5825,6504,5526,7237,5065,7210,5431,5364, 5771,
6477,5717,6562,5690,7183,6915,4957,5310,5042,
6753,6535,5663,5529,3875,6454,6373,679 4,5339,
5015,6740,3495,6699,5482,4853,3862,6483,3781,
3754,6319,3700,7217,3538,6686,5455,65 52,3443,
4799,6457,3727,6362,5921,5826,3646,6267,5731,
5541,7238,5066,3865,3322,5908,5351,4 971,5800,
3675,6478,3485,5718,6801,5584,4591,7212,3295,
5489,3027,4958,5773,3438,6754,3761, 6564,5692,
1999,5530,7241,6917,6374,5435,3001,5368,5044,
6727,6593,5721,2811,4854,3877,651 2,3782,7299,
6796,5341,5073,3687,7218,3553,6701,5484,3022,
6539,5779,6485,2927,6458,3756,63 77,5922,2033,
7191,3540,5019,6744,3499,5542,3445,4857,3866,
6431,3785,6364,5895,5828,1979,3 704,6269,3486,
5733,6802,5571,5068,3391,3324,6707,5490,4973,
5774,3677,7432,3762,6327,5679, 2028,5545,7242,
6918,5463,3029,5912,3002,5355,5031,6756,3735,
6594,5722,5532,3878,6499,732 8,5437,2975,5342,
5074,3554,6702,5247,2813,6568,4979,5808,3907,
6486,7301,6921,6378,2034,45 99,7220,3527,5048,
6731,3976,6541,5781,3446,4858,3881,6460,3786,
6351,5924,2007,7249,5021,3 691,6270,3501,5734,
6817,5600,4831,3868,6489,3311,5953,3043,4974,
1981,3678,7195,3544,6804, 5573,1791,5546,3449,
6709,5492,3030,6547,5899,5832,2935,3764,6385,
5737,5519,7244,6976,350 7,5438,3004,5357,5089,
7682,3793,6596,5724,2814,6331,5795,3936,6501,
7302,6922,5467,3033,50 76,7207,3556,5035,6760,
3739,6542,4981,5782,3909,7440,3882,6447,6380,
5687,2036,5553,7250,5 022,6733,3502,6818,5363,
4927,4860,3855,6490,3788,7305,5954,1982,4603,
3693,7224,3531,6791, 5574,5785,3450,6710,5479,
3045,6576,5928,2011,7197,6929,3751,6386,5738,
5548,3423,6739,398 4,6549,5901,2991,5358,5090,
3889,3794,6359,5711,6808,5577,3699,6502,3509,
6713,5496,3034,50 63,7684,3319,2939,3768,6333,
4982,5797,3910,7427,7360,6924,5469,2559,2023,
5554,7265,5037,6 734,3741,6600,5907,5840,4847,
3884,6505,7306,5745,5527,7252,5080,3694,7211,
3560,6820,5365, 4985,5786,3913,6492,5956,3046,
6563,5691,2040,4605,7198,3533,6930,6849,5311,
3452,5043,676 8,3971,6550,5902,2013,3890,6455,
3809,6388,5740,6795,5578,6741,3510,6714,5483,
3049,5092,38 63,3796,7313,3755,6334,5798,3701, 7456,3539,6687,5470,3036,6553,6017,7266,5038,
2941,3742,6    363,5936,5827,7429,3647,6506,3513,
5746,5556,7239,5067,7688,3323,5909,2999,5366,
4986,5801,    3914,6479,7308,5719,7040,5585,2027,
4606,7213,3534,6945,6850,4959,5788,3439,6755,
4000,656    5,5693,2014,5531,7256,6932,3810,6375,
1919,6824,5369,5045,6742,3973,6608,5960,3050,
4855,38    92,6513,3783,7314,6797,5580,3702,7219,
3568,6716,5485,3023,6554,6018,3921,2942,6459,
3757,6    392,5923,5856,7430,3541,6745,3514,5543,
7268,5096,3867,3800,6365,5910,5829,5802,3705,
6508,    3487,5748,6803,5586,5069,7214,3325,6946,
5491,3057,4988,5775,3916,7433,3763,6566,5694,202
9,5560,7243,6919,6852,5913,3003,5370,5046,6757,
3974,6595,5723,5533,3879,6514,3812,7329,67
98,5343,5075,7696,3555,6703,5486,3052,6569,5809,
3922,6487,7316,6936,3758,6379,2035,7221,3    542,
5049,6746,3977,6556,6020,3447,4859,3896,6461,
3787,6366,5925,5830,7488,3706,6271,3516,    5735,
6832,5601,5070,3869,3326,5968,3058,4975,5804,
3679,7434,3545,6805,5588,2030,5547,727    2,6948,
5493,3031,5914,5833,6758,3765,6624,5752,5534,
7245,6977,7330,5439,3005,5372,5104,76    83,4032,
6597,5725,2815,6570,5810,3937,6516,7303,6923,
6856,5077,7222,3557,5050,6761,3978,6    543,5783,
3924,7441,3883,6462,3816,6381,5926,2037,7251,
5023,6748,3503,6819,5602,4861,3870,    6491,3789,
7320,5955,1983,3708,7225,3546,6806,5575,6024,
3451,6711,5494,3060,6577,5929,583    4,7436,3766,
6387,5739,5549,7246,6978,3985,5916,3006,5359,
5091,7712,3795,6598,5726,6809,55    92,3938,6503,
7332,6952,5497,3035,5078,7685,3558,6762,3769,
6572,4983,5812,3911,7442,7361,6    925,6382,2038,
5555,7280,5052,6735,3980,6601,5841,4862,3885,
6520,3790,7307,5984,7253,5081,    3695,7226,3561,
6821,5604,5787,3928,6493,5957,3047,6578,5930,
2041,7199,3548,6931,6864,555    0,3453,6769,3986,
6551,5903,5836,3891,3824,6389,5741,6810,5579,
6980,3511,6715,5498,3064,50    93,7686,3797,7552,
3770,6335,5799,3940,7457,7362,6926,5471,3037,
6032,7267,5039,6764,3743,6    602,5937,5842,7444,
3886,6507,7336,5747,5557,7254,5082,7689,3562,
6822,5367,4987,5816,3915,    6494,7309,5958,7041,
2042,4607,7228,3535,6960,6851,5789,3454,6770,
4001,6580,5932,2015,725    7,6933,3811,6390,5742,
6825,5608,6743,3988,6609,5961,3051,5094,3893,
3798,7315,6812,5581,37    03,7458,3569,6717,5500,
3038,6555,6019,7744,2943,3772,6393,5938,5857,743
1,7364,6984,3515,5    558,7269,5097,7690,3801,6604,
5911,5844,5803,3944,6509,7310,5749,7042,5587,
5084,7215,3564,    6947,6880,4989,5790,3917,7448,
4002,6567,5695,2044,5561,7258,6934,6853,6826,
5371,5047,677    2,3975,6610,5962,3894,6515,3813,
7344,6799,5582,7697,3570,6718,5487,3053,6584,
6048,3923,73    17,6937,3759,6394,5858,7460,3543,
6747,3992,6557,6021,7270,5098,3897,3802,6367,
5940,5831,7    489,3707,6510,3517,5750,6833,5616,
5071,7692,3327,5969,3059,4990,5805,3918,7435,
7368,7044,    5589,2031,5562,7273,6949,6854,5915,
5848,6759,4004,6625,5753,5535,7260,6992,3814,
7331,682    8,5373,5105,7698,4033,6612,5964,3054,
6571,5811,3952,6517,7318,6938,6857,7223,3572,
5051,67    76,3979,6558,6022,3925,3898,6463,3817,
6396,5927,5860,7490,6749,3518,6834,5603,5100,
3871,3    804,7321,5970,5806,3709,7464,3547,6807,
5590,6025,7274,6950,5495,3061,5944,5835,7437,
3767,    6626,5754,5564,7247,6979,7808,5917,3007, 5374,5106,7713,4034,6599,5727,7048,5593,3939,651
8,7333,6953,6858,5079,7700,3559,6763,4008,6573,
5813,3926,7443,7376,6940,3818,6383,2039,72
81,5053,6750,3981,6616,6080,4863,3900,6521,3791,
7322,5985,7492,3710,7227,3576,6836,5605,6    026,
3929,5972,3062,6579,5931,5864,7438,3549,6865,
5551,7276,7008,3987,5918,5837,7714,3825,    6628,
5756,6811,5594,6981,7334,6954,5499,3065,5108,
7687,4036,7553,3771,6574,5814,3941,747    2,7363,
6927,6860,6033,7282,5054,6765,3982,6603,5843,
7445,3887,6522,3820,7337,5986,7255,50    83,7704,
3563,6823,5606,5817,3930,6495,7324,5959,7056,
2043,7229,3550,6961,6866,6028,3455,6    771,4016,
6581,5933,5838,7496,3826,6391,5743,6840,5609,
6982,3989,5976,3066,5095,7716,3799,    7554,6813,
5596,3942,7459,7392,6956,5501,3039,6034,7745,
6766,3773,6632,5939,5872,7446,736    5,6985,7338,
5559,7284,5112,7691,4040,6605,5845,5818,3945,
6524,7311,5988,7043,5085,7230,35    65,6962,6881,
5791,3932,7449,4003,6582,5934,2045,7259,6935,
6868,6827,5610,6773,3990,6611,5    963,3895,3828,
7345,6814,5583,7936,3571,6719,5502,3068,6585,
6049,7746,7556,3774,6395,5859,    7461,7366,6986,
3993,6036,7271,5099,7720,3803,6606,5941,5846,
7504,3946,6511,7340,5751,707    2,5617,5086,7693,
3566,6882,4991,5820,3919,7450,7369,7045,2046,
5563,7288,6964,6855,5849,67    74,4005,6640,5992,
7261,6993,3815,7346,6829,5612,7699,4048,6613,
5965,3055,6586,6050,3953,7    319,6939,6872,7462,
3573,6777,3994,6559,6023,7748,3899,3832,6397,
5942,5861,7491,6988,3519,    6835,5618,5101,7694,
3805,7560,5971,5807,3948,7465,7370,7046,5591,
6040,7275,6951,6884,594    5,5850,7452,4006,6627,
5755,5565,7262,6994,7809,6830,5375,5107,7728,
4035,6614,5966,7049,39    54,6519,7348,6968,6859,
7701,3574,6778,4009,6588,6052,3927,7377,6941,
3819,6398,5862,7520,6    751,3996,6617,6081,5102,
3901,3806,7323,6000,7493,3711,7466,3577,6837,
5620,6027,7752,5973,    3063,5946,5865,7439,7372,
7104,5566,7277,7009,7810,5919,5852,7715,4064,
6629,5757,7050,559    5,6996,7335,6955,6888,5109,
7702,4037,7568,4010,6575,5815,3956,7473,7378,
6942,6861,7283,50    55,6780,3983,6618,6082,3902,
6523,3821,7352,5987,7494,7705,3578,6838,5607,
6056,3931,7325,5    974,7057,5866,7468,3551,6867,
6029,7278,7010,4017,5948,5839,7497,3827,6630,
5758,6841,5624,    6983,7812,5977,3067,5110,7717,
4038,7555,7052,5597,3943,7474,7393,6957,6862,
6035,7760,676    7,4012,6633,5873,7447,7380,7000,
3822,7339,7285,5113,7706,4041,6620,6084,5819,
3960,6525,73    26,5989,7058,7231,3580,6963,6896,
6030,3933,4018,6583,5935,5868,7498,6869,6842,
5611,7012,3    991,5978,7718,3829,7584,6815,5598,
7937,7394,6958,5503,3069,6064,7747,7557,3775,
6634,5874,    7476,7367,6987,7816,6037,7286,5114,
7721,4042,6607,5847,7505,3947,6526,7341,5990,
7073,508    7,7708,3567,6883,5821,3934,7451,7384,
7060,2047,7289,6965,6870,6088,6775,4020,6641,
5993,75    00,3830,7347,6844,5613,7938,4049,5980,
3070,6587,6051,7776,7558,6873,7463,7396,7016,
3995,6    038,7749,7722,3833,6636,5943,5876,7506,
6989,7342,7074,5619,5116,7695,4044,7561,5822,
3949,    7480,7371,7047,6041,7290,6966,6885,5851,
7453,4007,6642,5994,7263,6995,7824,6831,5614,772
9,4050,6615,5967,7064,3955,7349,6969,6874,7940,
3575,6779,4024,6589,6053,7750,7616,3834,63
99,5863,7521,6990,3997,6096,5103,7724,3807,7562, 6001,7508,3950,7467,7400,7076,5621,6042,7 753,
6886,5947,5880,7454,7373,7105,5567,7292,7024,
7811,5853,7730,4065,6644,5996,7051,6997, 7350,
6970,6889,7703,4052,7569,4011,6590,6054,3957,
7379,6943,6876,7522,6781,3998,6619,608 3,3903,
3836,7353,6002,7495,7944,3579,6839,5622,6057,
7754,7564,5975,5867,7469,7374,7106,60 44,7279,
7011,7840,5949,5854,7512,4066,6631,5759,7080,
5625,6998,7813,6890,5111,7732,4039,7 570,7053,
3958,7475,7408,6972,6863,7761,6782,4013,6648,
6112,7381,7001,3823,7354,7524,7707, 4056,6621,
6085,6058,3961,7327,6004,7059,7470,3581,6897,
6031,7756,4019,5950,5869,7499,710 8,6843,5626,
7013,7814,5979,7719,4068,7585,7054,5599,7952,
7395,6959,6892,6065,7762,7572,40 14,6635,5875,
7477,7382,7002,7817,7287,5115,7736,4043,6622,
6086,3962,6527,7356,5991,7088,7 709,3582,6898,
6060,3935,7385,7061,5870,7528,6871,6089,7014,
4021,6008,7501,3831,7586,6845, 5628,7939,7872,
5981,3071,6066,7777,7559,7112,7478,7397,7017,
7818,6039,7764,7723,4072,663 7,5877,7507,7004,
7343,7075,5117,7710,4045,7576,5823,3964,7481,
7386,7062,7291,6967,6900,60 90,4022,6643,5995,
7502,7825,6846,5615,7968,4051,5982,7065,7778,
7588,6875,7941,7398,7018,4 025,6068,7751,7617,
3835,6638,5878,7536,6991,7820,6097,5118,7725,
4046,7563,7509,3951,7482, 7401,7077,6043,7768,
6887,5881,7455,7388,7120,7293,7025,7826,6092,
7731,4080,6645,5997,706 6,7351,6971,6904,7942,
4053,4026,6591,6055,7780,7618,6877,7523,7020,
3999,6098,7726,3837,75 92,6003,7510,7945,7402,
7078,5623,6072,7755,7565,5882,7484,7375,7107,
6045,7294,7026,7841,5 855,7513,4067,6646,5998,
7081,6999,7828,6891,7733,4054,7571,7068,3959,
7409,6973,6878,8000, 6783,4028,6649,6113,7620,
3838,7355,7525,7946,4057,6100,6059,7784,7566,
6005,7471,7404,713 6,6046,7757,7842,5951,5884,
7514,7109,7082,5627,7028,7815,7734,4069,7600,
7055,7953,7410,69 74,6893,7763,7573,4015,6650,
6114,7383,7003,7832,7526,7737,4058,6623,6087,
3963,7357,6006,7 089,7948,3583,6899,6061,7758,
7624,5871,7529,7110,6104,7015,7844,6009,7516,
4070,7587,7084, 5629,7954,7873,6894,6067,7792,
7574,7113,7479,7412,7032,7819,7765,7738,4073,
6652,6116,700 5,7358,7090,7711,4060,7577,6062,
3965,7387,7063,7530,6901,6091,4023,6010,7503,
8064,6847,56 30,7969,7874,5983,7779,7589,7114,
7956,7399,7019,7848,6069,7766,7632,4074,6639,
5879,7537,7 006,7821,5119,7740,4047,7578,3966,
7483,7416,7092,7769,6902,6120,7389,7121,7532,
7827,6093, 7970,4081,6012,7067,7590,6905,7943,
7876,4027,6070,7781,7619,7116,7538,7021,7822,
6099,772 7,4076,7593,7511,7960,7403,7079,6073,
7770,7580,5883,7485,7390,7122,7295,7027,7856,
6094,40 82,6647,5999,7096,7829,6906,7972,4055,
7069,7782,7648,6879,8001,7022,4029,6128,7621,
3839,7 594,7540,7947,7880,6101,6074,7785,7567,
7486,7405,7137,6047,7772,7843,5885,7515,7124,
7083, 7029,7830,7735,4084,7601,7070,7411,6975,
6908,8002,4030,6651,6115,7622,7833,7527,7976,405
9,6102,7786,7596,6007,7949,7406,7138,6076,7759,
7625,5886,7544,7111,6105,7030,7845,7517,40
71,7602,7085,7955,7888,6895,7793,7575,7128,7413,
7033,7834,8004,7739,4088,6653,6117,7359,7 091,
7950,4061,6063,7788,7626,7531,7140,6106,7846,
6011,7518,8065,7086,5631,7984,7875,7794, 7604,
7115,7957,7414,7034,7849,7767,7633,4075,6654, 6118,7007,7836,7741,4062,7579,3967,741 7,7093,
8008,6903,6121,7628,7533,8066,6108,7971,7904,
6013,7591,7144,7958,7877,7850,6071,77 96,7634,
7117,7539,7036,7823,7742,4077,7608,7961,7418,
7094,7771,7581,6122,7391,7123,7534,7 857,6095,
4083,6014,7097,8068,6907,7973,7878,7783,7649,
7118,8016,7023,7852,6129,7636,4078, 7595,7541,
7962,7881,6075,7800,7582,7487,7420,7152,7773,
7858,6124,7125,7098,7831,7974,408 5,7071,7650,
6909,8003,4031,6130,7623,8072,7542,7977,7882,
6103,7787,7597,7964,7407,7139,60 77,7774,7640,
5887,7545,7126,7031,7860,4086,7603,7100,7889,
6910,8032,7129,7652,7835,8005,7 978,4089,6132,
7598,7951,7884,6078,7789,7627,7546,7141,6107,
7847,7519,8080,7087,7985,7890, 7795,7605,7130,
7415,7035,7864,8006,4090,6655,6119,7837,7980,
4063,7790,7656,8009,7142,613 6,7629,7548,8067,
6109,7986,7905,7606,7145,7959,7892,7851,7797,
7635,7132,7037,7838,7743,40 92,7609,7419,7095,
8010,6123,7630,7535,8096,6110,7906,6015,8069,
7146,7988,7879,7798,7664,7 119,8017,7038,7853,
7637,4079,7610,7963,7896,7801,7583,7421,7153,
8012,7859,6125,7099,8070, 7975,7908,7651,7148,
8018,7854,613 1,7638,8073,7543,7992,7883,7802,
7612,7965,7422,7154,777 5,7641,6126,7127,7861,
4087,7101,8128,6911,8033,7653,8074,8020,7979,
7912,6133,7599,7966,78 85,6079,7804,7642,7547,
7156,7862,8081,7102,7891,8034,7131,7654,7865,
8007,4091,6134,8076,7 981,7886,7791,7657,8024,
7143,6137,7644,7549,8082,7987,7920,7607,7160,
7893,7866,8036,7133, 7839,7982,4093,7658,8011,
6138,7631,7550,8097,6111,7907,8084,7147,7989,
7894,7799,7665,7134, 7039,7868,4094,7611,7897,
8040,7660,8013,8098,6140,8071,7990,7909,7666,
7149,8019,7855,763 9,8088,7993,7898,7803,7613,
7423,7155,8014,6127,8100,7910,8129,7150,8048,
7668,8075,8021,79 94,7913,7614,7967,7900,7805,
7643,7157,7863,7103,8130,8035,7655,8104,8022,
7914,6135,8077,7 996,7887,7806,7672,8025,7158,
7645,8083,7921,7161,8132,7867,8037,8078,7983,
7916,7659,8026, 6139,7646,7551,8112,7922,8085,
7162,7895,8038,7135,7869,4095,8136,8041,7661,
8028,8099,614 1,8086,7991,7924,7667,7164,7870,
8089,7899,8042,7662,8015,6142,8101,7911,8144,
7151,8049,76 69,8090,7995,7928,7615,7901,8044,
8102,8131,8050,7670,8105,8023,7915,8092,7997,
7902,7807,7 673,7159,8160,8133,8106,8052,8079,
7998,7917,7674,8027,7647,8113,7923,7163,8134,
8039,8108, 7918,8137,8056,7676,8029,8114,8087,
7925,7165,7871,8138,8043,7663,8030,6143,8116,
7926,814 5,7166,8091,7929,8140,8045,8103,8146,
8051,7671,8120,7930,8093,7903,8046,8161,8148,
8107,80 53,8094,7999,7932,7675,8162,8135,8054,
8109,7919,8152,8057,7677,8115,8164,8110,8139,
8058,7 678,8031,8117,7927,7167,8168,8141,8060,
8118,8147,8121,7931,8142,8047,8176,8149,8122,
8095, 7933,8163,8150,8055,8124,7934,8153,8165,
8111,8154,8059,7679,8166,8169,8156,8061,8119,
8170, 8143,8062,8177,8123,8172,8178,8151,8125,
7935,8180,8126,8155,8167,8184,8157,8171,8158,806
3,8173,8179,8174,8181,8127,8182,8185,8186,8159,
8188,8175,8183,8187,8189,8190,8191,].
Shortened location set, S1=
[15,31,47,63,79,95,111,127,143,159,175,191,207,223,
239,255,271,287,303,319,335,351, 367,383,399,415,
431,447,463,479,495,511,527,543,559,575,591,607,
623,639,655,671,687,703,71 9,735,751,767,783,799, 815,831,847,863,879,895,911,927,943,959,975,991,
1007,1023,1039,1055,1     071,1087,1103,1119,1135,
1151,1167,1183,1199,1215,1231,1247,1263,1279,
1295,1311,1327,1343,     1359,1375,1391,1407,1423,
1439,1455,1471,1487,1503,1519,1535,1551,1567,
1583,1599,1615,163     1,1647,1663,1679,1695,1711,
1727,1743,1759,1775,1791,1807,1823,1839,1855,
1871,1887,1903,19     19,1935,1951,1967,1983,1999,
2015,2031,2047,2063,2079,2095,2111,2127,2143,
2159,2175,2191,2     207,2223,2239,2255,2271,2287,
2303,2319,2335,2351,2367,2383,2399,2415,2431,
2447,2463,2479,     2495,2511,2527,2543,2559,2575,
2591,2607,2623,2639,2655,2671,2687,2703,2719,
2735,2751,276     7,2783,2799,2815,2831,2847,2863,
2879,2895,2911,2927,2943,2959,2975,2991,3007,
3023,3039,30     55,3071,3087,3103,3119,3135,3151,
3167,3183,3199,3215,3231,3247,3263,3279,3295,
3311,3327,3     343,3359,3375,3391,3407,3423,3439,
3455,3471,3487,3503,3519,3535,3551,3567,3583,
3599,3615,     3631,3647,3663,3679,3695,3711,3727,
3743,3759,3775,3791,3807,3823,3839,3855,3871,
3887,390     3,3919,3935,3951,3967,3983,3999,4015,
4031,4047,4063,4079,4095].

It should be noted that the foregoing sequences are merely some examples, and the sequences are applied to a polar encoding process to help improve performance of polar code encoding and decoding. In any one of the example sequences, an adjustment or equivalent replacement including but not limited to the following aspects may be made without affecting an overall effect of the sequence:

1. Locations of a few elements in the sequence are interchanged. For example, a location of a sequence number may be adjusted within a set amplitude. For example, if the set amplitude is 5, a location of an element whose sequence number is 10 is adjusted within a range of five locations on the left and five locations on the right.

2. Although some elements in the sequence are adjusted, a channel set that is selected based on the sequence and that is used for transmitting T-bit information is consistent or similar.

3. The sequence includes N elements from 0 to N−1, and the N elements from 0 to N−1 represent sequence numbers of N polar channels. Actually, the sequence numbers of the N polar channels may alternatively be from 1 to N. In this case, each sequence number in the sequence is increased by 1. This is also a sequence number form in the foregoing calculation manners. Certainly, the sequence numbers or identifiers of the polar channels may alternatively be represented in another manner. A specific representation manner does not affect specific locations of the polar channels represented in the sequence.

4. The sequence numbers of the N polar channels in the sequence are arranged based on reliability of the N polar channels in ascending order. In this case, selection of K polar channels based on the reliability in descending order is that polar channels corresponding to last K sequence numbers in any of the foregoing sequences are selected. Actually, the sequence numbers of the N polar channels may alternatively be arranged based on the reliability of the N polar channels in descending order. In this case, elements in the sequence are arranged in an inverse order or opposite order. In this case, selection of K polar channels based on the reliability in descending order is that polar channels corresponding to first K sequence numbers are selected.

5. The sequence may alternatively be represented by using a normalized reliability or equivalent reliability sequence of channels. For example, if a sorting location of a channel x in the sequence is n (a leftmost side is denoted as 1), reliability of the channel may be represented as n or normalized n/N, where N is a length of the sequence.

What is claimed is:

1. A method for encoding polar code, comprising:

obtaining, by a processor, K bits to be encoded;

selecting, by the processor, K sequence numbers from a first sequence, wherein the K bits are placed on polar channels corresponding to the K sequence numbers;

performing, by the processor, polar code encoding on the K bits to obtain encoded bits, wherein the first sequence comprises sequence numbers of N polar channels, the first sequence is one of Q1, Q2, a sub-sequence of Q1 or a sub-sequence of Q2, K is a positive integer, N is a mother code length of polar code, $N=2^n$, n is a positive integer, and $K \leq N$;

transmitting a signal comprising the encoded data bits, wherein sequence Q1=[0,1,2,4,8,16,3,32,5,6,9,64,10,17,
12,18,128,33,20,34,7,24,36,65,11,256,66,40,13,19,68,
14,129,4     8,21,72,130,35,22,25,512,132,37,80,26,38,
257,67,136,41,28,258,96,69,42,15,144,49,260,70,44,7
3,131,50,23,1024,264,74,160,513,133,52,81,27,76,
514,134,39,272,82,137,56,29,516,259,192,97, 138,84,
43,30,145,288,98,261,71,520,140,45,88,146,51,262,
100,1025,46,265,75,2048,161,528,14     8,53,320,1026,
266,104,77,162,515,135,54,273,83,152,57,1028,268,
78,544,164,517,274,193,112, 139,85,58,31,1032,518,
384,289,194,99,276,168,86,521,141,60,89,147,290,
576,263,196,101,522,     142,1040,47,280,90,2049,176,
529,149,292,102,321,1027,524,267,200,105,2050,92,
163,530,150,     55,322,1056,153,296,1029,106,269,79,
640,545,2052,165,532,275,208,113,154,324,59,1030,
270,     108,546,1033,166,519,385,304,195,114,2056,
277,169,87,536,156,61,1088,328,1034,548,386,29
1,224,577,278,197,170,116,523,143,1041,62,281,91,
2064,177,1036,768,578,388,293,198,103,55     2,336,
172,1042,525,282,201,120,2051,93,178,531,151,294,
580,323,1152,1057,526,392,297,202,     1044,107,284,
2080,94,641,560,2053,180,533,209,352,1058,155,325,
298,1031,584,271,204,109,     642,547,2054,1048,167,
534,400,305,210,115,2057,184,326,537,1060,157,300,
1089,110,329,103     5,644,549,387,2112,306,225,592,
2058,279,212,171,117,538,158,1280,63,1090,330,
1064,2065,5     50,416,1037,769,226,579,389,308,199,
648,118,553,2060,337,173,1043,540,283,216,121,
1092,2     066,332,179,1038,770,608,390,295,228,581,
554,338,1153,174,1072,527,393,312,203,1045,122,
2176,285,2081,95,656,561,2068,181,1096,772,582,
448,353,1154,1059,556,394,340,299,232,104     6,585,
286,205,2082,124,643,562,2055,1049,182,535,401,
211,354,2072,1536,185,327,1156,776,     1061,586,396,
301,206,1104,111,672,344,2084,1050,645,564,402,
2113,307,240,593,2059,213,18     6,356,539,1062,159,
1281,302,1091,588,331,1160,1065,646,2304,551,417,
2114,1052,784,227,59     4,404,2088,309,214,649,119,
568,2061,188,1282,541,1120,217,360,1093,1066,
2067,333,418,103     9,771,704,609,391,2116,310,229,
650,596,555,2062,339,1168,175,1073,542,408,313,
218,1284,1     23,1094,2177,2096,334,657,1068,800,
2069,610,420,1097,773,230,583,449,368,1155,652,
1074,5     57,395,2120,341,314,233,1047,600,2178,287,
220,2083,125,658,563,2070,1288,183,1098,774,61
2,450,355,1184,2073,1537,558,424,342,1157,777,234, 1076,587,397,316,207,2560,1105,126,673, 2180,345,
2085,1051,660,565,403,2128,241,1100,832,2074,
1538,452,187,357,1158,778,1063,61 6,398,1296,303,
236,1106,589,674,346,1161,2086,1080,647,2305,566,
432,2115,1053,785,242,21 84,595,405,2089,215,664, 5
358,569,2076,1540,189,1283,1216,780,1121,590,456,
361,1162,1108,1 067,676,2306,348,419,2144,1054,
786,705,624,406,2117,2090,311,244,651,597,570,
2063,1169,1 90,1312,543,409,1122,219,1285,362,
1095,2192,1544,2097,335,1164,896,1069,801,706, 10
2308,61 1,421,2118,1112,788,231,680,598,464,2092,
369,1170,653,1075,572,410,2121,315,248,1286,601,
1124,2179,221,2098,364,659,1070,802,2071,1289,
422,1099,775,708,613,451,3072,370,1185,65 4,2312,
1552,559,425,2122,343,1172,792,235,1077,602,412, 15
2208,317,222,2561,1344,127,688,21 81,2100,1290,
661,1128,804,2129,614,480,1101,833,1186,2075,
1539,453,426,372,1159,779,712, 1078,617,399,2124,
1297,318,237,2562,1107,604,675,2182,347,1176,
2087,1081,662,2320,567,4 33,2130,1292,243,1102, 20
2185,834,2104,1568,454,665,359,1188,808,2077,
1541,618,428,1298,12 17,781,238,1136,591,457,376,
1163,2564,1109,1082,677,2307,2240,349,434,2145,
1055,787,720, 2186,625,407,2132,2091,245,666,836,
571,2078,1542,1408,191,1313,1218,782,1123,620, 25
458,13 00,363,1192,1110,2193,1545,678,2336,350,
1165,897,2146,1084,816,707,2309,626,436,2119,25
68,1113,789,246,681,2188,599,465,2093,1171,668,
1314,573,411,2136,1600,249,1287,1220,840, 1125,
2194,1546,460,2099,365,1166,898,1071,803,736, 30
2310,1304,423,2148,1114,790,709,682,6 28,466,3073,
2094,371,1200,655,2313,1553,574,440,2123,1173,
793,250,1316,603,413,1126,220 9,223,2576,1345,366,
689,2196,1548,2101,1291,1224,900,1129,805,710,
2368,615,481,3074,111 6,848,1187,684,2314,1554, 35
468,427,2152,373,1174,794,713,1079,632,414,2125,
2210,319,252,25 63,1346,605,690,2183,1177,2102,
1320,663,2321,1130,806,2131,1293,482,1103,2200,
835,1664, 2105,1569,455,3076,904,374,1189,809,714,
2316,1556,619,429,2126,1299,1232,796,239,2592,1 40
137,606,472,2212,377,1178,2565,1348,1083,692,
2322,2241,435,2160,1294,721,1132,2187,864, 2133,
2106,1570,484,667,837,1190,810,2079,1543,1409,
430,1328,1219,783,716,1138,621,459,3 080,1301,378,
1193,2566,1111,2432,1560,679,2337,2242,351,1180, 45
912,2147,1085,817,722,2324, 2216,627,437,2134,
2569,1352,247,696,2189,838,2108,1572,1410,669,
1315,1248,812,2137,160 1,622,488,1302,1221,841,
1194,1140,2195,1547,461,2338,380,1167,899,2624,
1086,818,737,231 1,2244,1305,438,2149,2570,1115, 50
791,724,683,2190,629,467,3088,2095,1201,670,2328,
1792,57 5,441,2138,1602,1412,251,1317,1222,842,
1127,2224,1576,462,2577,1360,367,1196,928,2197,1
549,738,2340,1306,1225,901,2150,1144,820,711,
2369,630,496,3075,2572,1117,849,1202,685,2 315, 55
2248,1555,469,442,2153,1175,795,728,1318,633,415,
2140,1604,2211,253,2578,1347,844,6 91,2198,1550,
1416,2103,1321,1226,902,1131,807,740,2370,1308,
483,3104,1118,2201,850,1665, 686,2344,1584,470,
3077,905,2154,375,1204,824,715,2317,1557,634,444, 60
2127,2688,1233,797,2 54,2593,1376,607,473,2213,
1179,2580,1349,1322,693,2323,2256,1608,2161,1295,
1228,960,113 3,2202,865,1666,2372,2107,1571,485,
3078,906,852,1191,811,744,2318,1558,1424,431,
2156,13 29,1234,798,717,2594,1139,636,474,3081, 65
2214,379,1208,2567,1350,2433,1561,694,2352,2243,
1181,913,2162,1324,723,2325,1134,2217,866,2135, 2584,1353,486,697,2204,839,1668,2109,157 3,1411,
3136,908,1330,1249,813,718,2376,1616,623,489,
3082,1303,1236,856,1195,2596,1141,2 434,1562,476,
2339,2272,381,1182,914,2625,1087,819,752,2326,
2245,2218,439,2164,2571,1354, 725,698,2191,868,
3089,2110,1574,1440,671,2329,1793,1250,814,2139,
1603,1413,490,1332,12 23,843,1672,1142,2225,1577,
463,3084,2816,1361,382,1197,929,2626,2436,1564,
739,2341,2246, 1307,1240,916,2151,2600,1145,821,
726,2384,2220,631,497,3090,2573,1356,1203,700,
2330,22 49,1794,443,2168,1632,1414,729,1319,1252,
872,2141,1605,2226,1578,492,2579,1362,845,1198,
930,2199,1551,1417,2342,1336,1227,903,2628,1146,
822,741,2371,3200,1309,498,3105,2574,1 119,2440,
851,1680,687,2345,2250,1585,471,3092,920,2155,
1205,825,730,2332,1796,635,445,2 142,1606,2689,
1472,255,2608,1377,846,2228,1580,1418,2581,1364,
1323,1256,932,2257,1609,7 42,2400,1310,1229,961,
3106,1148,2203,880,1667,2373,2346,1586,500,3079,
907,2632,853,1206, 826,745,2319,2252,1559,1425,
446,2157,2690,1235,799,732,2595,1378,637,475,
3096,2215,120 9,2582,1351,2448,1800,695,2353,
2258,1610,1420,2163,1325,1230,962,1135,2232,867,
1696,237 4,2585,1368,487,3108,936,2205,854,1669,
746,2348,1588,1426,3137,909,2158,1331,1264,828,7
19,2377,1617,638,504,3083,2692,1237,857,1210,
2597,1380,2435,1563,477,2354,2273,1183,915, 2640,
1326,753,2327,2260,1612,2219,2165,2586,1355,964,
699,2206,869,1670,3328,2111,1575, 1441,3138,910,
1808,1251,815,748,2378,1618,1428,491,3112,1333,
1238,858,1673,2598,1143,24 64,1592,478,3085,2817,
2274,383,1212,944,2627,2437,1565,754,2356,2247,
2696,1241,917,2166, 2601,1384,727,2385,2221,870,
3091,2588,1357,1442,701,2331,2264,1795,1728,2169,
1633,1415, 3140,968,1334,1253,873,1674,2380,1620,
2227,1579,493,3086,2818,1363,860,1199,931,2656,2
438,1566,1432,2343,2276,1337,1242,918,2629,2602,
1147,823,756,2386,3201,2222,499,3120,25 75,1358,
2441,1681,702,2360,2251,1824,3093,921,2170,1634,
1444,731,2333,1797,1254,874,214 3,1607,2704,1473,
494,2609,1392,847,1676,2229,1581,1419,3144,2820,
1365,1338,1257,933,263 0,2496,1624,743,2401,3202,
1311,1244,976,3107,2604,1149,2442,881,1682,2388,
2347,2280,158 7,501,3094,922,2633,1207,827,760,
2334,2253,1798,447,2172,1636,2691,1474,733,2610,
1379,8 76,3097,2230,1582,1448,2583,1366,2449,
1801,1258,934,2259,1611,1421,2402,1340,1231,963,3
584,1150,2233,882,1697,2375,3204,2824,1369,502,
3109,937,2634,2444,855,1684,747,2349,225 4,1589,
1427,3152,924,2159,2720,1265,829,734,2392,1856,
639,505,3098,2693,1476,1211,2612, 1381,2450,1802,
2355,2288,1640,1422,2641,1327,1260,992,2261,1613,
2234,1698,2404,2587,13 70,965,3110,938,2207,884,
1671,3329,2350,1590,1456,3139,911,2636,1809,1266,
830,749,2379, 3208,1619,1429,506,3113,2694,1239,
859,1688,2599,1382,2465,1593,479,3100,2832,2275,
1213, 945,2642,2452,1804,755,2357,2262,1614,2697,
1480,2167,2616,1385,966,2236,871,1700,3330,2 589,
1372,1443,3168,940,2265,1810,1729,750,2408,1648,
1430,3141,969,3114,1335,1268,888,16 75,2381,1621,
2466,1594,508,3087,2819,2752,861,1214,946,2657,
2439,1567,1433,2358,2277,26 98,1243,919,2644,
2603,1386,757,2387,3216,2223,3121,2590,1359,2456,
1920,703,2361,2266,18 25,1730,3332,2171,1635,
1445,3142,970,1812,1255,875,1704,2382,1622,2705,
1488,495,3116,28 48,1393,862,1677,2658,2468,1596,
1434,3145,2821,2278,1339,1272,948,2631,2497,1625, 758,24 16,3203,2700,1245,977,3122,2605,1388,2443,
1683,2389,2362,2281,1826,3095,923,2648,1446,7
61,2335,2268,1799,1732,2173,1637,2706,1475,972,
2611,1394,877,1678,3336,2231,1583,1449,3 146,
2822,1367,1816,1259,935,2660,2498,1626,1436,2403,
3232,1341,1246,978,3585,2606,1151, 2472,883,1712,
2390,3205,2825,2282,503,3124,952,2635,2445,1685,
762,2364,2255,1828,3153,9 25,2174,1638,2721,1504,
735,2393,1857,878,3099,2708,1477,1450,2613,1396,
2451,1803,1736,2 289,1641,1423,3148,2880,1342,
1261,993,3586,2500,1628,2235,1699,2405,3206,2826,
1371,980, 3111,939,2664,2446,885,1686,3344,2351,
2284,1591,1457,3154,926,2637,2722,1267,831,764,23
94,3209,1858,507,3128,2695,1478,1689,2614,1383,
2480,1832,3101,2833,2290,1642,1452,2643, 2453,
1805,1262,994,2263,1615,2712,1481,2406,2617,1400,
967,3588,2237,886,1701,3331,3264, 2828,1373,1458,
3169,941,2638,2504,1811,1744,751,2409,3210,1649,
1431,3156,984,3115,2724, 1269,889,1690,2396,1860,
2467,1595,509,3102,2834,2753,1215,947,2672,2454,
1806,2359,2292, 1644,2699,1482,2645,2618,1387,
996,3217,2238,1702,3360,2591,1374,2457,1921,3170,
942,226 7,1840,1731,3333,2410,1650,1460,3143,971,
3592,1813,1270,890,1705,2383,3212,1623,2944,14
89,510,3 117,2849,2754,863,1692,2659,2469,1597,
1435,3160,2836,2279,2728,1273,949,2646,25
12,1864,759,2417,3218,2701,1484,3123,2620,1389,
2458,1922,2363,2296,1827,1760,3334,2649, 1447,
3172,1000,2269,1814,1733,1706,2412,1652,2707,
1490,973,3118,2850,1395,892,1679,333 7,2470,1598,
1464,3147,2823,2756,1817,1274,950,2661,2499,1627,
1437,2418,3233,2702,1247,9 79,3600,2607,1390,
2473,1713,2391,3220,2840,2283,3125,953,2650,2460,
1924,763,2365,2270,1 829,1734,3392,2175,1639,
2736,1505,974,1872,879,1708,3338,2709,1492,1451,
3176,2852,1397, 1818,1737,2662,2528,1656,1438,
3149,2881,3234,1343,1276,1008,3587,2501,1629,
2474,1714,2 420,3207,2827,2760,981,3126,954,2665,
2447,1687,3345,2366,2285,1830,3155,927,2652,
2723,1 506,765,2395,3224,1859,3129,2710,1479,
1928,2615,1398,2481,1833,1738,3340,2291,1643,145
3,3150,2882,1820,1263,995,3616,2502,1630,2713,
1496,2407,3236,2856,1401,982,3589,2666,24 76,887,
1716,3346,3265,2829,2286,1459,3184,956,2639,2505,
1745,766,2424,3211,1888,3157,98 5,3130,2725,1508,
1691,2397,1861,2482,1834,3103,2835,2768,1454,
2673,2455,1807,1740,2293, 1645,2714,1483,2884,
2619,1402,997,3590,3456,2239,1703,3361,3266,2830,
1375,1936,3171,94 3,2668,2506,1841,1746,3348,
2411,3240,1651,1461,3158,986,3593,2726,1271,891,
1720,2398,32 13,1862,2945,511,3132,2864,2755,
1693,2674,2484,1836,3161,2837,2294,1646,2729,
1512,2647, 2513,1865,998,3219,2716,1485,3362,
2621,1404,2459,1923,3648,2297,1842,1761,3335,
3268,28 88,1462,3173,1001,3594,2508,1815,1748,
1707,2413,3214,1653,2946,1491,988,3119,2851,2784,
893,1694,3352,2471,1599,1465,3162,2838,2757,2730,
1275,951,2676,2514,1866,2419,3248,270 3,1486,
3601,2622,1391,2488,1952,3221,2841,2298,1762,
3364,2651,2461,1925,3174,1002,2271, 1844,1735,
3393,2414,1654,2737,1520,975,3596,1873,894,1709,
3339,3272,2948,1493,1466,317 7,2853,2758,1819,
1752,2663,2529,1657,1439,3164,2896,3235,2732,
1277,1009,3602,2516,1868, 2475,1715,2421,3222,
2842,2761,3127,955,2680,2462,1926,2367,2300,1831,
1764,3394,2653,27 38,1507,1004,3225,1874,1710,
3368,2711,1494,1929,3178,2854,1399,1848,1739, 3341,2530,165 8,1468,3151,2883,3712,1821,1278,
1010,3617,2503,1631,2952,1497,2422,3237,2857,
2762,983,3 604,2667,2477,1717,3347,3280,2844,
2287,3185,957,2654,2520,1984,767,2425,3226,1889,
3396, 3131,2740,1509,1930,1876,2483,1835,1768,
3342,2769,1455,3180,2912,1822,1741,3618,2532,1
660,2715,1498,2885,3238,2858,1403,1012,3591,3457,
2478,1718,3376,3267,2831,2764,1937,31 86,958,
2669,2507,1747,3349,2426,3241,1890,3159,987,3608,
2727,1510,1721,2399,3228,1863,2 960,3133,2865,
2770,1932,2675,2485,1837,1742,3400,2295,1647,
2744,1513,2886,1880,999,362 0,3458,2717,1500,
3363,3296,2860,1405,1938,3649,2670,2536,1843,
1776,3350,3269,2889,3242, 1463,3188,1016,3595,
2509,1749,1722,2428,3215,1892,2947,989,3134,2866,
2785,1695,3353,24 86,1838,3163,2839,2772,2731,
1514,2677,2515,1867,3249,2718,1487,3840,2623,
1406,2489,195 3,3650,3460,2299,1763,3365,3270,
2890,1940,3175,1003,3624,2510,1845,1750,3408,
2415,3244, 1655,2976,1521,990,3597,2786,895,1724,
3354,3273,2949,1467,3192,2868,2759,1753,2678,254
4,1896,3165,2897,3250,2733,1516,3603,2517,1869,
2490,1954,3223,2843,2776,3366,2681,2463, 1927,
3652,2301,1846,1765,3395,2892,2739,1522,1005,
3598,3464,1875,1711,3369,3274,2950,1 495,1944,
3179,2855,2788,1849,1754,3356,2531,1659,1469,
3166,2898,3713,2734,1279,1011,36 32,2518,1870,
2953,2423,3252,2872,2763,3605,2682,2492,1956,
3281,2845,2302,1766,3424,265 5,2521,1985,1006,
3227,1904,3397,3370,2741,1524,1931,3656,1877,
1850,1769,3343,3276,3008, 1470,3181,2913,3714,
1823,1756,3619,2533,1661,2954,1499,2900,3239,
2859,2792,1013,3606,3 472,2479,1719,3377,3282,
2846,2765,3187,959,2684,2522,1986,2427,3256,1891,
3398,3609,274 2,1511,1960,3229,1878,2961,1770,
3372,2771,1933,3182,2914,1852,1743,3401,2534,
1662,2745, 1528,2887,3716,1881,1014,3621,3459,
2956,1501,3378,3297,2861,2766,1939,3664,2671,
2537,1 777,3351,3284,2904,3243,3189,1017,3610,
2524,1988,1723,2429,3230,1893,2962,3135,2867,28
00,1934,2487,1839,1772,3402,2773,2746,1515,2916,
1882,3622,3488,2719,1502,3841,3298,286 2,1407,
1968,3651,3461,2538,1778,3380,3271,2891,3720,
1941,3190,1018,3625,2511,1751,3409, 2430,3245,
1894,2977,991,3612,2787,1725,3355,3288,2964,3193,
2869,2774,1992,2679,2545,18 97,3404,3251,2748,
1517,3842,1884,2491,1955,3680,3462,2777,3367,
3300,2920,1942,3653,362 6,2540,1847,1780,3410,
2893,3246,2978,1523,1020,3599,3465,1726,3384,
3275,2951,1945,3194, 2870,2789,1755,3357,2546,
1898,3167,2899,3728,2735,1518,3633,2519,1871,
2968,3253,2873,2 778,3844,2683,2493,1957,3654,
3520,2303,1767,3425,2894,2000,1007,3628,3466,
1905,3412,33 71,3304,2980,1525,1946,3657,2790,
1851,1784,3358,3277,3009,1471,3196,2928,3715,
1757,363 4,2548,1900,2955,2901,3254,2874,2793,
3607,3473,2494,1958,3283,2847,2780,3426,2685,
2523, 1987,3257,1906,3399,3848,2743,1526,1961,
3658,3468,1879,1771,3373,3278,3010,1948,3183,2
915,3744,1853,1758,3416,2535,1663,2984,1529,2902,
3717,2794,1015,3636,3474,2957,3379,33 12,2876,
2767,3665,2686,2552,2016,3285,2905,3258,3428,
3611,2525,1989,1962,3231,1908,296 3,3374,2801,
1935,3660,1854,1773,3403,3012,2747,1530,2917,
3718,1883,3623,3489,2958,1503, 3856,3299,2863,
2796,1969,3666,3476,2539,1779,3381,3286,2906,
3721,3191,1019,3640,2526,1 990,2431,3260,1895, 2992,3613,2802,1964,3289,2965,1774,3432,2775,
1993,2918,1912,3405,34    90,2749,1532,3843,3776,
1885,1970,3681,3463,3016,3382,3301,2921,3722,
1943,3668,3627,254    1,1781,3411,2908,3247,2979,
1021,3614,3480,1727,3385,3290,2966,3195,2871,
2804,1994,2547,    1899,3406,3729,2750,1519,3872,
1886,2969,3682,3492,2779,3845,3302,2922,1972,
3655,3521,2    542,1782,3440,2895,3724,2001,1022,
3629,3467,3413,3386,3305,2981,1947,3672,2791,
1785,33    59,3292,3024,3197,2929,3730,1996,3635,
2549,1901,2970,3255,2875,2808,3846,2495,1959,368
4,3522,2781,3427,2924,2002,3630,3496,1907,3414,
3849,3306,2982,1527,1976,3659,3469,1786,    3388,
3279,3011,1949,3198,2930,3745,1759,3417,2550,
1902,2985,2903,3732,2795,3637,3475,2    972,3313,
2877,2782,3904,2687,2553,2017,3524,3259,3429,
3850,2004,1963,3688,3470,1909,33    75,3308,3040,
1950,3661,3746,1855,1788,3418,3013,2986,1531,
2932,3719,3638,3504,2959,385    7,3314,2878,2797,
3667,3477,2554,2018,3287,2907,3736,3430,3641,
2527,1991,3261,1910,2993,    3852,2803,1965,3662,
3528,1775,3433,3014,2008,2919,3748,1913,3420,
3491,2988,1533,3858,3    777,2798,1971,3696,3478,
3017,3383,3316,2936,3723,3669,3642,2556,2020,
2909,3262,2994,36    15,3481,1966,3291,2967,3434,
2805,1995,1914,3407,3968,2751,1534,3873,3778,
1887,3683,349    3,3018,3860,3303,2923,3752,1973,
3670,3536,2543,1783,3441,2910,3725,1023,3644,
3482,3387,    3320,2996,3673,2806,2024,3293,3025,
3436,3731,1997,3874,1916,2971,3494,2809,3847,
3780,1    974,3685,3523,3020,3442,2925,3726,2003,
3631,3497,3415,3864,3307,2983,1977,3674,3484,17
87,3389,3294,3026,3199,2931,3760,1998,2551,1903,
3000,3733,2810,3876,2973,3686,3552,278    3,3905,
2926,2032,3525,3498,3444,3851,3784,2005,1978,
3689,3471,3390,3309,3041,1951,3676,    3747,1789,
3419,3028,2987,2933,3734,3639,3505,2974,3315,
2879,2812,3906,2555,2019,3526,3    737,3431,3880,
2006,3690,3500,1911,3853,3310,3042,1980,3663,
3529,1790,3448,3015,2009,29    34,3749,3421,3506,
2989,3859,3792,2799,3697,3479,3032,3317,2937,
3738,3908,3643,2557,202    1,3263,2995,3854,1967,
3692,3530,3435,3044,2010,3750,1915,3422,3969,
2990,1535,3888,3779,    3698,3508,3019,3861,3318,
2938,3753,3671,3537,2558,2022,2911,3740,3645,
3483,3321,2997,3    912,2807,2025,3532,3437,3970,
2012,3875,3808,1917,3495,3048,3862,3781,3754,
1975,3700,35    38,3021,3443,2940,3727,3646,3512,
3865,3322,2998,3675,3485,2026,3295,3027,3438,
3761,199    9,1918,3001,3972,2811,3877,3782,3687,
3553,3022,3920,2927,3756,2033,3540,3499,3445,
3866,    3785,1979,3704,3486,3391,3324,3056,3677,
3762,2028,3029,3002,3735,3878,2975,3554,2813,3
907,2034,3527,3976,3446,3881,3786,2007,3691,3501,
3868,3311,3043,1981,3678,3544,1791,34    49,3030,
2935,3764,3507,3004,3793,2814,3936,3033,3556,
3739,3909,3882,2036,3502,3855,378    8,1982,3693,
3531,3450,3045,2011,3751,3423,3984,2991,3889,
3794,3699,3509,3034,3319,2939,    3768,3910,2559,
2023,3741,3884,3694,3560,3913,3046,2040,3533,
3452,3971,2013,3890,3809,3    510,3049,3863,3796,
3755,3701,3539,3036,2941,3742,3647,3513,3323,
2999,3914,2027,3534,34    39,4000,2014,3810,1919,
3973,3050,3892,3783,3702,3568,3023,3921,2942,
3757,3541,3514,386    7,3800,3705,3487,3325,3057,
3916,3763,2029,3003,3974,3879,3812,3555,3052,
3922,3758,2035,    3542,3977,3447,3896,3787,3706, 3516,3869,3326,3058,3679,3545,2030,3031,3765,
3005,4032,2    815,3937,3557,3978,3924,3883,3816,
2037,3503,3870,3789,1983,3708,3546,3451,3060,
3766,39    85,3006,3795,3938,3035,3558,3769,3911,
2038,3980,3885,3790,3695,3561,3928,3047,2041,354
8,3453,3986,3891,3824,3511,3064,3797,3770,3940,
3037,3743,3886,3562,3915,2042,3535,3454,    4001,
2015,3811,3988,3051,3893,3798,3703,3569,3038,
2943,3772,3515,3801,3944,3564,3917,4    002,2044,
3975,3894,3813,3570,3053,3923,3759,3543,3992,
3897,3802,3707,3517,3327,3059,39    18,2031,4004,
3814,4033,3054,3952,3572,3979,3925,3898,3817,
3518,3871,3804,3709,3547,306    1,3767,3007,4034,
3939,3559,4008,3926,3818,2039,3981,3900,3791,
3710,3576,3929,3062,3549,    3987,3825,3065,4036,
3771,3941,3982,3887,3820,3563,3930,2043,3550,
3455,4016,3826,3989,3    066,3799,3942,3039,3773,
4040,3945,3565,3932,4003,2045,3990,3895,3828,
3571,3068,3774,39    93,3803,3946,3566,3919,2046,
4005,3815,4048,3055,3953,3573,3994,3899,3832,
3519,3805,394    8,4006,4035,3954,3574,4009,3927,
3819,3996,3901,3806,3711,3577,3063,4064,4037,
4010,3956,    3983,3902,3821,3578,3931,3551,4017,
3827,3067,4038,3943,4012,3822,4041,3960,3580,
3933,4    018,3991,3829,3069,3775,4042,3947,3567,
3934,2047,4020,3830,4049,3070,3995,3833,4044,39
49,4007,4050,3955,3575,4024,3834,3997,3807,3950,
4065,4052,4011,3957,3998,3903,3836,357    9,4066,
4039,3958,4013,3823,4056,3961,3581,4019,4068,
4014,4043,3962,3582,3935,4021,3831,    3071,4072,
4045,3964,4022,4051,4025,3835,4046,3951,4080,
4053,4026,3999,3837,4067,4054,3    959,4028,3838,
4057,4069,4015,4058,3963,3583,4070,4073,4060,
3965,4023,4074,4047,3966,40    81,4027,4076,4082,
4055,4029,3839,4084,4030,4059,4071,4088,4061,
4075,4062,3967,4077,408    3,4078,4085,4031,4086,
4089,4090,4063,4092,4079,4087,4091,4093,4094,
4095,], wherein sequence Q2=[6309,5445,6419,5391,6298,6203,
5667,5287,6414,5654,6252,5425,5330,5235,6310,
6663,5446,    5657,6339,5277,3623,6258,5420,4819,
6421,5230,6313,6231,5449,3381,3721,6300,4935,
6205,5    669,5507,5004,5426,5345,4909,4814,3613,
3289,5399,5332,5291,6692,5237,5658,6435,5278,34
05,5010,5183,4915,6422,6341,6314,3681,6260,3463,
6667,5450,4821,3382,3301,4794,3722,628    7,4964,
3668,3627,6206,5670,3411,4767,6425,3247,2979,
5346,4910,3614,6235,3480,5699,5509,    4586,3385,
3290,5428,2966,5319,4939,5768,3195,5238,6321,
5673,4559,7180,5457,4478,5293,3    406,5025,6722,
3729,6532,5660,4835,6437,6342,5403,2969,5336,
5012,3682,6247,3492,6696,52    41,2779,4917,4822,
3845,6480,3302,2922,6316,4727,4593,3655,7186,
3521,6669,5452,5299,344    0,4796,2895,6426,3724,
6345,4539,3629,6264,3467,5728,5510,3413,4825,
3386,3305,5415,2981,    5348,4968,1947,3672,6237,
5701,2791,6322,5674,4588,3359,3292,6675,5458,
4941,5294,3197,5    026,2929,3730,6295,5647,5513,
3635,6438,2549,1901,5432,2970,5323,4999,6724,
3255,2875,52    42,4918,4837,3846,6467,5405,2495,
1959,4594,3684,7201,3522,6670,5215,2781,6536,
4947,577    6,3427,4783,2924,6441,6346,5681,2002,
4567,7188,5016,3630,6251,3496,1907,5301,3414,
4921,    4826,3849,6428,3306,5892,2982,1527,4731,
1976,4541,3659,6238,3469,5702,6785,5568,1786,4
351,3388,3279,6704,5473,3011,4942,1949,3198,2930,
3745,6324,5676,1759,5514,3417,6677,54    60,2550, 1902,5419,2985,5352,5028,2903,3732,6353,5705,
2795,4838,3637,6496,3475,5406,297     2,5325,5057,
7202,3313,2877,5244,2782,6299,4976,5763,6469,
2687,6442,2553,5682,2017,4596,     7175,3524,5003,
6728,3259,4949,5302,3429,4922,4841,3850,6415,
6348,5655,2004,5521,1963,4     542,3688,6253,3470,
1909,6786,5331,4895,4828,3375,3308,6691,5474,
3040,4733,1950,4571,36     61,7192,3746,6311,1855,
1788,5305,3418,6678,5447,3013,6544,5896,2986,
1531,4791,2932,644     9,3719,6354,5706,5516,3638,
6259,3504,5421,2959,5326,5058,3857,3314,2878,
5231,2797,6328,     4963,5792,3667,6470,3477,6681,
5464,2554,2018,4583,7204,3287,5032,2907,3736,
6301,4950,5     765,3430,4842,3641,6444,2527,5684,
1991,5522,7233,5005,6254,3261,1910,5427,2993,
5360,49     24,4815,3852,6473,5713,2803,4734,1965,
4600,3662,7179,3528,6788,5333,4953,1775,5306,343
3,6693,5476,3014,6531,5659,2008,4573,2919,6450,
3748,6369,1913,5279,3420,5011,6736,3491,     5422,
2988,1533,4849,3858,6423,3777,6356,5708,2798,
6315,1971,3696,6261,3478,6682,5451,3     017,5060,
3383,3316,4795,2936,3723,6302,4965,5766,3669,
3642,6207,2556,5671,2020,5537,72     34,5006,2909,
3262,5904,2994,5347,4911,4844,3615,6474,3481,
5714,5524,1966,4587,7208,329     1,5429,2967,5334,
4954,5769,3434,6694,5239,2805,6560,5688,1995,
4574,7181,6913,6370,1914,     4479,5308,3407,5040,
6723,3968,6533,5661,2751,1534,4850,3873,6452,
3778,6343,1887,6792,5     337,5013,3683,6262,3493,
6697,5480,3018,4823,3860,6481,3303,2923,3752,
6317,4966,1973,36     70,7187,3536,6684,5453,2543,
1783,5538,3441,4797,2910,6427,3725,6360,5891,
5824,1023,364     4,6265,3482,5729,5511,7236,5064,
3387,3320,5430,2996,5349,4969,5770,3673,6476,
5716,2806,     6323,5675,2024,4589,7182,3293,6914,
5459,3025,4956,5295,3436,5027,6752,3731,6534,
5662,1     997,5528,3874,6439,6372,1916,5433,2971,
5338,5014,6725,3494,6698,5243,2809,4919,4852,38
47,6482,3780,7297,6318,1974,4595,3685,7216,3523,
6671,5454,3020,6537,5777,3442,4798,292     5,6456,
3726,6347,5920,2003,7189,5017,3631,6266,3497,
5730,5540,3415,4827,3864,6429,3307,     5893,2983,
5350,4970,1977,3674,6239,3484,5703,6800,5569,
1787,4590,3389,3294,6705,5488,3     026,4943,5772,
3199,2931,3760,6325,5677,1998,5515,7240,6916,
5461,2551,1903,5434,3000,53     53,5029,6726,3733,
6592,5720,2810,4839,3876,6497,7298,5407,2973,
5340,5072,3686,7203,355     2,6700,5245,2783,6538,
4977,5778,3905,6484,2926,6443,6376,5683,2032,
4597,7190,3525,5018,     6729,3498,5303,3444,4923,
4856,3851,6430,3784,6349,5894,2005,1978,4543,
3689,6268,3471,5     732,6787,5570,4829,3390,3309,
6706,5475,3041,4972,1951,3676,7193,3747,6326,
5678,1789,55     44,3419,6679,5462,3028,6545,5897,
2987,5354,5030,2933,3734,6355,5707,5517,3639,
6498,350     5,5436,2974,5327,5059,3315,2879,5246,
2812,6329,4978,5793,3906,6471,7300,6920,5465,
2555,     2019,4598,7205,3526,5033,6730,3737,6540,
4951,5780,3431,4843,3880,6350,5685,2006,5523,7
248,5020,3690,6255,3500,1911,6816,5361,4925,4830,
3853,6488,3310,5952,3042,4735,1980,46     01,3663,
7194,3529,6789,5572,1790,5307,3448,6708,5477,
3015,6546,5898,2009,2934,3749,638     4,5736,5518,
3421,3506,5423,2989,5356,5088,3859,3792,2799,
5794,3697,6500,3479,5466,3032,     5061,3317,5034,
2937,3738,4980,3908,7425,3643,2557,2021,5552,
5007,3263,5905,2995,5362,4     926,4845,3854,7304, 1967,4602,3692,3530,5335,4955,5784,3435,3044,
2010,4575,6928,3750,19     15,5309,3422,5041,3969,
5900,2990,1535,4851,3888,3779,5576,3698,3508,
3019,5062,3318,293     8,4967,7426,3537,2558,2022,
7264,5036,2911,3740,4846,3645,3483,5744,3321,
2997,4984,3912,     2807,2025,4604,3532,6848,3437,
3970,2012,3808,1917,3048,7312,1975,3021,6016,
2940,7428,3     512,2998,2026,6944,1918,3972,3920,
3056,7681,6445,6451,6737,6357,5709,6330,6683,
7206,63     03,5767,6446,5686,7235,6732,6475,5715,
5525,7209,6790,6695,5478,6561,5689,7196,6371,673
8,6548,6453,6358,5710,6793,6263,6712,5481,3861,
3753,6332,5796,3671,6685,5468,5539,6361,     5906,
5825,6504,5526,7237,5065,7210,5431,5364,5771,
6477,5717,6562,5690,7183,6915,4957,5     310,5042,
6753,6535,5663,5529,3875,6454,6373,6794,5339,
5015,6740,3495,6699,5482,4853,38     62,6483,3781,
3754,6319,3700,7217,3538,6686,5455,6552,3443,
4799,6457,3727,6362,5921,582     6,3646,6267,5731,
5541,7238,5066,3865,3322,5908,5351,4971,5800,
3675,6478,3485,5718,6801,     5584,4591,7212,3295,
5489,3027,4958,5773,3438,6754,3761,6564,5692,
1999,5530,7241,6917,6     374,5435,3001,5368,5044,
6727,6593,5721,2811,4854,3877,6512,3782,7299,
6796,5341,5073,36     87,7218,3553,6701,5484,3022,
6539,5779,6485,2927,6458,3756,6377,5922,2033,
7191,3540,501     9,6744,3499,5542,3445,4857,3866,
6431,3785,6364,5895,5828,1979,3704,6269,3486,
5733,6802,     5571,5068,3391,3324,6707,5490,4973,
5774,3677,7432,3762,6327,5679,2028,5545,7242,
6918,5     463,3029,5912,3002,5355,5031,6756,3735,
6594,5722,5532,3878,6499,7328,5437,2975,5342,50
74,3554,6702,5247,2813,6568,4979,5808,3907,6486,
7301,6921,6378,2034,4599,7220,3527,504     8,6731,
3976,6541,5781,3446,4858,3881,6460,3786,6351,
5924,2007,7249,5021,3691,6270,3501,     5734,6817,
5600,4831,3868,6489,3311,5953,3043,4974,1981,
3678,7195,3544,6804,5573,1791,5     546,3449,6709,
5492,3030,6547,5899,5832,2935,3764,6385,5737,
5519,7244,6976,3507,5438,30     04,5357,5089,7682,
3793,6596,5724,2814,6331,5795,3936,6501,7302,
6922,5467,3033,5076,720     7,3556,5035,6760,3739,
6542,4981,5782,3909,7440,3882,6447,6380,5687,
2036,5553,7250,5022,     6733,3502,6818,5363,4927,
4860,3855,6490,3788,7305,5954,1982,4603,3693,
7224,3531,6791,5     574,5785,3450,6710,5479,3045,
6576,5928,2011,7197,6929,3751,6386,5738,5548,
3423,6739,39     84,6549,5901,2991,5358,5090,3889,
3794,6359,5711,6808,5577,3699,6502,3509,6713,
5496,303     4,5063,7684,3319,2939,3768,6333,4982,
5797,3910,7427,7360,6924,5469,2559,2023,5554,
7265,     5037,6734,3741,6600,5907,5840,4847,3884,
6505,7306,5745,5527,7252,5080,3694,7211,3560,6
820,5365,4985,5786,3913,6492,5956,3046,6563,5691,
2040,4605,7198,3533,6930,6849,5311,34     52,5043,
6768,3971,6550,5902,2013,3890,6455,3809,6388,
5740,6795,5578,6741,3510,6714,548     3,3049,5092,
3863,3796,7313,3755,6334,5798,3701,7456,3539,
6687,5470,3036,6553,6017,7266,     5038,2941,3742,
6363,5936,5827,7429,3647,6506,3513,5746,5556,
7239,5067,7688,3323,5909,2     999,5366,4986,5801,
3914,6479,7308,5719,7040,5585,2027,4606,7213,
3534,6945,6850,4959,57     88,3439,6755,4000,6565,
5693,2014,5531,7256,6932,3810,6375,1919,6824,
5369,5045,6742,397     3,6608,5960,3050,4855,3892,
6513,3783,7314,6797,5580,3702,7219,3568,6716,
5485,3023,6554,     6018,3921,2942,6459,3757,6392, 5923,5856,7430,3541,6745,3514,5543,7268,5096,
3867,3800,6    365,5910,5829,5802,3705,6508,3487,
5748,6803,5586,5069,7214,3325,6946,5491,3057,
4988,57    75,3916,7433,3763,6566,5694,2029,5560,
7243,6919,6852,5913,3003,5370,5046,6757,3974,659    5
5,5723,5533,3879,6514,3812,7329,6798,5343,5075,
7696,3555,6703,5486,3052,6569,5809,3922,    6487,
7316,6936,3758,6379,2035,7221,3542,5049,6746,
3977,6556,6020,3447,4859,3896,6461,3    787,6366,
5925,5830,7488,3706,6271,3516,5735,6832,5601,    10
5070,3869,3326,5968,3058,4975,58    04,3679,7434,
3545,6805,5588,2030,5547,7272,6948,5493,3031,
5914,5833,6758,3765,6624,575    2,5534,7245,6977,
7330,5439,3005,5372,5104,7683,4032,6597,5725,
2815,6570,5810,3937,6516,    7303,6923,6856,5077,    15
7222,3557,5050,6761,3978,6543,5783,3924,7441,
3883,6462,3816,6381,5    926,2037,7251,5023,6748,
3503,6819,5602,4861,3870,6491,3789,7320,5955,
1983,3708,7225,35    46,6806,5575,6024,3451,6711,
5494,3060,6577,5929,5834,7436,3766,6387,5739,    20
5549,7246,697    8,3985,5916,3006,5359,5091,7712,
3795,6598,5726,6809,5592,3938,6503,7332,6952,
5497,3035,    5078,7685,3558,6762,3769,6572,4983,
5812,3911,7442,7361,6925,6382,2038,5555,7280,
5052,6    735,3980,6601,5841,4862,3885,6520,3790,    25
7307,5984,7253,5081,3695,7226,3561,6821,5604,57
87,3928,6493,5957,3047,6578,5930,2041,7199,3548,
6931,6864,5550,3453,6769,3986,6551,590    3,5836,
3891,3824,6389,5741,6810,5579,6980,3511,6715,
5498,3064,5093,7686,3797,7552,3770,    6335,5799,    30
3940,7457,7362,6926,5471,3037,6032,7267,5039,
6764,3743,6602,5937,5842,7444,3    886,6507,7336,
5747,5557,7254,5082,7689,3562,6822,5367,4987,
5816,3915,6494,7309,5958,70    41,2042,4607,7228,
3535,6960,6851,5789,3454,6770,4001,6580,5932,    35
2015,7257,6933,3811,639    0,5742,6825,5608,6743,
3988,6609,5961,3051,5094,3893,3798,7315,6812,
5581,3703,7458,3569,    6717,5500,3038,6555,6019,
7744,2943,3772,6393,5938,5857,7431,7364,6984,
3515,5558,7269,5    097,7690,3801,6604,5911,5844,    40
5803,3944,6509,7310,5749,7042,5587,5084,7215,
3564,6947,68    80,4989,5790,3917,7448,4002,6567,
5695,2044,5561,7258,6934,6853,6826,5371,5047,
6772,397    5,6610,5962,3894,6515,3813,7344,6799,
5582,7697,3570,6718,5487,3053,6584,6048,3923,    45
7317,    6937,3759,6394,5858,7460,3543,6747,3992,
6557,6021,7270,5098,3897,3802,6367,5940,5831,7
489,3707,6510,3517,5750,6833,5616,5071,7692,3327,
5969,3059,4990,5805,3918,7435,7368,70    44,5589,
2031,5562,7273,6949,6854,5915,5848,6759,4004,    50
6625,5753,5535,7260,6992,3814,733    1,6828,5373,
5105,7698,4033,6612,5964,3054,6571,5811,3952,
6517,7318,6938,6857,7223,3572,    5051,6776,3979,
6558,6022,3925,3898,6463,3817,6396,5927,5860,
7490,6749,3518,6834,5603,5    100,3871,3804,7321,    55
5970,5806,3709,7464,3547,6807,5590,6025,7274,
6950,5495,3061,5944,58    35,7437,3767,6626,5754,
5564,7247,6979,7808,5917,3007,5374,5106,7713,
4034,6599,5727,704    8,5593,3939,6518,7333,6953,
6858,5079,7700,3559,6763,4008,6573,5813,3926,    60
7443,7376,6940,    3818,6383,2039,7281,5053,6750,
3981,6616,6080,4863,3900,6521,3791,7322,5985,
7492,3710,7    227,3576,6836,5605,6026,3929,5972,
3062,6579,5931,5864,7438,3549,6865,5551,7276,
7008,39    87,5918,5837,7714,3825,6628,5756,6811,    65
5594,6981,7334,6954,5499,3065,5108,7687,4036,755
3,3771,6574,5814,3941,7472,7363,6927,6860,6033, 7282,5054,6765,3982,6603,5843,7445,3887,    6522,
3820,7337,5986,7255,5083,7704,3563,6823,5606,
5817,3930,6495,7324,5959,7056,2043,7    229,3550,
6961,6866,6028,3455,6771,4016,6581,5933,5838,
7496,3826,6391,5743,6840,5609,69    82,3989,5976,
3066,5095,7716,3799,7554,6813,5596,3942,7459,
7392,6956,5501,3039,6034,774    5,6766,3773,6632,
5939,5872,7446,7365,6985,7338,5559,7284,5112,
7691,4040,6605,5845,5818,    3945,6524,7311,5988,
7043,5085,7230,3565,6962,6881,5791,3932,7449,
4003,6582,5934,2045,7    259,6935,6868,6827,5610,
6773,3990,6611,5963,3895,3828,7345,6814,5583,
7936,3571,6719,55    02,3068,6585,6049,7746,7556,
3774,6395,5859,7461,7366,6986,3993,6036,7271,
5099,7720,380    3,6606,5941,5846,7504,3946,6511,
7340,5751,7072,5617,5086,7693,3566,6882,4991,
5820,3919,    7450,7369,7045,2046,5563,7288,6964,
6855,5849,6774,4005,6640,5992,7261,6993,3815,
7346,6    829,5612,7699,4048,6613,5965,3055,6586,
6050,3953,7319,6939,6872,7462,3573,6777,3994,65
59,6023,7748,3899,3832,6397,5942,5861,7491,6988,
3519,6835,5618,5101,7694,3805,7560,597    1,5807,
3948,7465,7370,7046,5591,6040,7275,6951,6884,
5945,5850,7452,4006,6627,5755,5565,    7262,6994,
7809,6830,5375,5107,7728,4035,6614,5966,7049,
3954,6519,7348,6968,6859,7701,3    574,6778,4009,
6588,6052,3927,7377,6941,3819,6398,5862,7520,
6751,3996,6617,6081,5102,39    01,3806,7323,6000,
7493,3711,7466,3577,6837,5620,6027,7752,5973,
3063,5946,5865,7439,737    2,7104,5566,7277,7009,
7810,5919,5852,7715,4064,6629,5757,7050,5595,
6996,7335,6955,6888,    5109,7702,4037,7568,4010,
6575,5815,3956,7473,7378,6942,6861,7283,5055,
6780,3983,6618,6    082,3902,6523,3821,7352,5987,
7494,7705,3578,6838,5607,6056,3931,7325,5974,
7057,5866,74    68,3551,6867,6029,7278,7010,4017,
5948,5839,7497,3827,6630,5758,6841,5624,6983,
7812,597    7,3067,5110,7717,4038,7555,7052,5597,
3943,7474,7393,6957,6862,6035,7760,6767,4012,
6633,    5873,7447,7380,7000,3822,7339,7285,5113,
7706,4041,6620,6084,5819,3960,6525,7326,5989,7
058,7231,3580,6963,6896,6030,3933,4018,6583,5935,
5868,7498,6869,6842,5611,7012,3991,59    78,7718,
3829,7584,6815,5598,7937,7394,6958,5503,3069,
6064,7747,7557,3775,6634,5874,747    6,7367,6987,
7816,6037,7286,5114,7721,4042,6607,5847,7505,
3947,6526,7341,5990,7073,5087,    7708,3567,6883,
5821,3934,7451,7384,7060,2047,7289,6965,6870,
6088,6775,4020,6641,5993,7    500,3830,7347,6844,
5613,7938,4049,5980,3070,6587,6051,7776,7558,
6873,7463,7396,7016,39    95,6038,7749,7722,3833,
6636,5943,5876,7506,6989,7342,7074,5619,5116,
7695,4044,7561,582    2,3949,7480,7371,7047,6041,
7290,6966,6885,5851,7453,4007,6642,5994,7263,
6995,7824,6831,    5614,7729,4050,6615,5967,7064,
3955,7349,6969,6874,7940,3575,6779,4024,6589,
6053,7750,7    616,3834,6399,5863,7521,6990,3997,
6096,5103,7724,3807,7562,6001,7508,3950,7467,
7400,70    76,5621,6042,7753,6886,5947,5880,7454,
7373,7105,5567,7292,7024,7811,5853,7730,4065,664
4,5996,7051,6997,7350,6970,6889,7703,4052,7569,
4011,6590,6054,3957,7379,6943,6876,7522,    6781,
3998,6619,6083,3903,3836,7353,6002,7495,7944,
3579,6839,5622,6057,7754,7564,5975,5    867,7469,
7374,7106,6044,7279,7011,7840,5949,5854,7512,
4066,6631,5759,7080,5625,6998,78    13,6890,5111,
7732,4039,7570,7053,3958,7475,7408,6972,6863, 7761,6782,4013,6648,6112,738 1,7001,3823,7354,
7524,7707,4056,6621,6085,6058,3961,7327,6004,
7059,7470,3581,6897,6031, 7756,4019,5950,5869,
7499,7108,6843,5626,7013,7814,5979,7719,4068,
7585,7054,5599,7952,7 395,6959,6892,6065,7762,
7572,4014,6635,5875,7477,7382,7002,7817,7287,
5115,7736,4043,66 22,6086,3962,6527,7356,5991,
7088,7709,3582,6898,6060,3935,7385,7061,5870,
7528,6871,608 9,7014,4021,6008,7501,3831,7586,
6845,5628,7939,7872,5981,3071,6066,7777,7559,
7112,7478, 7397,7017,7818,6039,7764,7723,4072,
6637,5877,7507,7004,7343,7075,5117,7710,4045,
7576,5 823,3964,7481,7386,7062,7291,6967,6900,
6090,4022,6643,5995,7502,7825,6846,5615,7968,40
51,5982,7065,7778,7588,6875,7941,7398,7018,4025,
6068,7751,7617,3835,6638,5878,7536,699 1,7820,
6097,5118,7725,4046,7563,7509,3951,7482,7401,
7077,6043,7768,6887,5881,7455,7388, 7120,7293,
7025,7826,6092,7731,4080,6645,5997,7066,7351,
6971,6904,7942,4053,4026,6591,6 055,7780,7618,
6877,7523,7020,3999,6098,7726,3837,7592,6003,
7510,7945,7402,7078,5623,60 72,7755,7565,5882,
7484,7375,7107,6045,7294,7026,7841,5855,7513,
4067,6646,5998,7081,699 9,7828,6891,7733,4054,
7571,7068,3959,7409,6973,6878,8000,6783,4028,
6649,6113,7620,3838, 7355,7525,7946,4057,6100,
6059,7784,7566,6005,7471,7404,7136,6046,7757,
7842,5951,5884,7 514,7109,7082,5627,7028,7815,
7734,4069,7600,7055,7953,7410,6974,6893,7763,
7573,4015,66 50,6114,7383,7003,7832,7526,7737,
4058,6623,6087,3963,7357,6006,7089,7948,3583,
6899,606 1,7758,7624,5871,7529,7110,6104,7015,
7844,6009,7516,4070,7587,7084,5629,7954,7873,
6894, 6067,7792,7574,7113,7479,7412,7032,7819,
7765,7738,4073,6652,6116,7005,7358,7090,7711,4
060,7577,6062,3965,7387,7063,7530,6901,6091,4023,
6010,7503,8064,6847,5630,7969,7874,59 83,7779,
7589,7114,7956,7399,7019,7848,6069,7766,7632,
4074,6639,5879,7537,7006,7821,511 9,7740,4047,
7578,3966,7483,7416,7092,7769,6902,6120,7389,
7121,7532,7827,6093,7970,4081, 6012,7067,7590,
6905,7943,7876,4027,6070,7781,7619,7116,7538,
7021,7822,6099,7727,4076,7 593,7511,7960,7403,
7079,6073,7770,7580,5883,7485,7390,7122,7295,
7027,7856,6094,4082,66 47,5999,7096,7829,6906,
7972,4055,7069,7782,7648,6879,8001,7022,4029,
6128,7621,3839,759 4,7540,7947,7880,6101,6074,
7785,7567,7486,7405,7137,6047,7772,7843,5885,
7515,7124,7083, 7029,7830,7735,4084,7601,7070,
7411,6975,6908,8002,4030,6651,6115,7622,7833,
7527,7976,4 059,6102,7786,7596,6007,7949,7406,
7138,6076,7759,7625,5886,7544,7111,6105,7030,
7845,75 17,4071,7602,7085,7955,7888,6895,7793,
7575,7128,7413,7033,7834,8004,7739,4088,6653,611
7,7359,7091,7950,4061,6063,7788,7626,7531,7140,
6106,7846,6011,7518,8065,7086,5631,7984, 7875,
7794,7604,7115,7957,7414,7034,7849,7767,7633,
4075,6654,6118,7007,7836,7741,4062,7 579,3967,
7417,7093,8008,6903,6121,7628,7533,8066,6108,
7971,7904,6013,7591,7144,7958,78 77,7850,6071,
7796,7634,7117,7539,7036,7823,7742,4077,7608,
7961,7418,7094,7771,7581,612 2,7391,7123,7534,
7857,6095,4083,6014,7097,8068,6907,7973,7878,
7783,7649,7118,8016,7023, 7852,6129,7636,4078,
7595,7541,7962,7881,6075,7800,7582,7487,7420,
7152,7773,7858,6124,7 125,7098,7831,7974,4085,
7071,7650,6909,8003,4031,6130,7623,8072,7542, 7977,7882,6103,77 87,7597,7964,7407,7139,6077,
7774,7640,5887,7545,7126,7031,7860,4086,7603,
7100,7889,691 0,8032,7129,7652,7835,8005,7978,
4089,6132,7598,7951,7884,6078,7789,7627,7546,
7141,6107, 7847,7519,8080,7087,7985,7890,7795,
7605,7130,7415,7035,7864,8006,4090,6655,6119,
7837,7 980,4063,7790,7656,8009,7142,6136,7629,
7548,8067,6109,7986,7905,7606,7145,7959,7892,78
51,7797,7635,7132,7037,7838,7743,4092,7609,7419,
7095,8010,6123,7630,7535,8096,6110,790 6,6015,
8069,7146,7988,7879,7798,7664,7119,8017,7038,
7853,7637,4079,7610,7963,7896,7801, 7583,7421,
7153,8012,7859,6125,7099,8070,7975,7908,7651,
7148,8018,7854,6131,7638,8073,7 543,7992,7883,
7802,7612,7965,7422,7154,7775,7641,6126,7127,
7861,4087,7101,8128,6911,80 33,7653,8074,8020,
7979,7912,6133,7599,7966,7885,6079,7804,7642,
7547,7156,7862,8081,710 2,7891,8034,7131,7654,
7865,8007,4091,6134,8076,7981,7886,7791,7657,
8024,7143,6137,7644, 7549,8082,7987,7920,7607,
7160,7893,7866,8036,7133,7839,7982,4093,7658,
8011,6138,7631,7 550,8097,6111,7907,8084,7147,
7989,7894,7799,7665,7134,7039,7868,4094,7611,
7897,8040,76 60,8013,8098,6140,8071,7990,7909,
7666,7149,8019,7855,7639,8088,7993,7898,7803,
7613,742 3,7155,8014,6127,8100,7910,8129,7150,
8048,7668,8075,8021,7994,7913,7614,7967,7900,
7805, 7643,7157,7863,7103,8130,8035,7655,8104,
8022,7914,6135,8077,7996,7887,7806,7672,8025,7
158,7645,8083,7921,7161,8132,7867,8037,8078,7983,
7916,7659,8026,6139,7646,7551,8112,79 22,8085,
7162,7895,8038,7135,7869,4095,8136,8041,7661,
8028,8099,6141,8086,7991,7924,766 7,7164,7870,
8089,7899,8042,7662,8015,6142,8101,7911,8144,
7151,8049,7669,8090,7995,7928, 7615,7901,8044,
8102,8131,8050,7670,8105,8023,7915,8092,7997,
7902,7807,7673,7159,8160,8 133,8106,8052,8079,
7998,7917,7674,8027,7647,8113,7923,7163,8134,
8039,8108,7918,8137,80 56,7676,8029,8114,8087,
7925,7165,7871,8138,8043,7663,8030,6143,8116,
7926,8145,7166,809 1,7929,8140,8045,8103,8146,
8051,7671,8120,7930,8093,7903,8046,8161,8148,
8107,8053,8094, 7999,7932,7675,8162,8135,8054,
8109,7919,8152,8057,7677,8115,8164,8110,8139,
8058,7678,8 031,8117,7927,7167,8168,8141,8060,
8118,8147,8121,7931,8142,8047,8176,8149,8122,
8095,79 33,8163,8150,8055,8124,7934,8153,8165,
8111,8154,8059,7679,8166,8169,8156,8061,8119,817
0,8143,8062,8177,8123,8172,8178,8151,8125,7935,
8180,8126,8155,8167,8184,8157,8171,8158, 8063,
8173,8179,8174,8181,8127,8182,8185,8186,8159,
8188,8175,8183,8187,8189,8190,8191,],
wherein when the mother code length is 4096, the first
    sequence is the sequence Q1, and wherein when the
    mother code length N is 4096, a quantity K of the K bits
    is 452, 536, 904, 1048, 1808, 2072, 2712, or 3096; and
transmitting the encoded bits over a wireless network.
  2. The method according to claim 1, further comprising
    performing, by the processor, rate matching on the
    encoded bits obtained through polar code encoding to
    obtain bits after rate matching.
  3. The method according to claim 1, wherein the first
sequence is pre-stored.
  4. The method according to claim 1, wherein
when the mother code length N is 8192, a quantity K of
    the K bits is 235, 470, 940, 1880, 2820, or 3760.

5. The method according to claim 1, wherein
when the mother code length is 8192, the first sequence is
the sequence Q2.

6. The method according to claim 1, wherein the sequence
numbers of the N polar channels are 0 to (N−1) or 1 to N.

7. The method according to claim 1, wherein the K bits
comprise a cyclic redundancy check (CRC) bit.

8. The method according to claim 1, wherein K bits
comprise a parity check (PC) bit.

9. An apparatus for encoding polar code, comprising:
a processor, and
a memory coupled to the processor to store instructions,
which when executed by the processor, cause the
apparatus to:
obtain K bits to be encoded;
select K sequence numbers from a first sequence, wherein
the K bits are placed on polar channels corresponding
to the K sequence numbers;
perform polar code encoding on the K bits to obtain
encoded bits, wherein the first sequence comprises
sequence numbers of N polar channels, the first
sequence is one of Q1, Q2, a sub-sequence Q1 or a
sub-sequence Q2, K is a positive integer, N is a mother
code length of polar code, $N=2^n$, n is a positive integer,
and K≤N;
transmit a signal comprising the encoded data bits,
wherein sequence Q1=[0,1,2,4,8,16,3,32,5,6,9,64,10,17,
12,18,128,33,20,34,7,24,36,65,11,256,66,40,13,19,68,
14,129,4 8,21,72,130,35,22,25,512,132,37,80,26,38,
257,67,136,41,28,258,96,69,42,15,144,49,260,70,44,7
3,131,50,23,1024,264,74,160,513,133,52,81,27,76,
514,134,39,272,82,137,56,29,516,259,192,97, 138,84,
43,30,145,288,98,261,71,520,140,45,88,146,51,262,
100,1025,46,265,75,2048,161,528,14 8,53,320,1026,
266,104,77,162,515,135,54,273,83,152,57,1028,268,
78,544,164,517,274,193,112, 139,85,58,31,1032,518,
384,289,194,99,276,168,86,521,141,60,89,147,290,
576,263,196,101,522, 142,1040,47,280,90,2049,176,
529,149,292,102,321,1027,524,267,200,105,2050,92,
163,530,150, 55,322,1056,153,296,1029,106,269,79,
640,545,2052,165,532,275,208,113,154,324,59,1030,
270, 108,546,1033,166,519,385,304,195,114,2056,
277,169,87,536,156,61,1088,328,1034,548,386,29
1,224,577,278,197,170,116,523,143,1041,62,281,91,
2064,177,1036,768,578,388,293,198,103,55 2,336,
172,1042,525,282,201,120,2051,93,178,531,151,294,
580,323,1152,1057,526,392,297,202, 1044,107,284,
2080,94,641,560,2053,180,533,209,352,1058,155,325,
298,1031,584,271,204,109, 642,547,2054,1048,167,
534,400,305,210,115,2057,184,326,537,1060,157,300,
1089,110,329,103 5,644,549,387,2112,306,225,592,
2058,279,212,171,117,538,158,1280,63,1090,330,
1064,2065,5 50,416,1037,769,226,579,389,308,199,
648,118,553,2060,337,173,1043,540,283,216,121,
1092,2 066,332,179,1038,770,608,390,295,228,581,
554,338,1153,174,1072,527,393,312,203,1045,122,
2176,285,2081,95,656,561,2068,181,1096,772,582,
448,353,1154,1059,556,394,340,299,232,104 6,585,
286,205,2082,124,643,562,2055,1049,182,535,401,
211,354,2072,1536,185,327,1156,776, 1061,586,396,
301,206,1104,111,672,344,2084,1050,645,564,402,
2113,307,240,593,2059,213,18 6,356,539,1062,159,
1281,302,1091,588,331,1160,1065,646,2304,551,417,
2114,1052,784,227,59 4,404,2088,309,214,649,119,
568,2061,188,1282,541,1120,217,360,1093,1066,
2067,333,418,103 9,771,704,609,391,2116,310,229,
650,596,555,2062,339,1168,175,1073,542,408,313, 218,1284,1 23,1094,2177,2096,334,657,1068,800,
2069,610,420,1097,773,230,583,449,368,1155,652,
1074,5 57,395,2120,341,314,233,1047,600,2178,287,
220,2083,125,658,563,2070,1288,183,1098,774,61
2,450,355,1184,2073,1537,558,424,342,1157,777,234,
1076,587,397,316,207,2560,1105,126,673, 2180,345,
2085,1051,660,565,403,2128,241,1100,832,2074,
1538,452,187,357,1158,778,1063,61 6,398,1296,303,
236,1106,589,674,346,1161,2086,1080,647,2305,566,
432,2115,1053,785,242,21 84,595,405,2089,215,664,
358,569,2076,1540,189,1283,1216,780,1121,590,456,
361,1162,1108,1 067,676,2306,348,419,2144,1054,
786,705,624,406,2117,2090,311,244,651,597,570,
2063,1169,1 90,1312,543,409,1122,219,1285,362,
1095,2192,1544,2097,335,1164,896,1069,801,706,
2308,61 1,421,2118,1112,788,231,680,598,464,2092,
369,1170,653,1075,572,410,2121,315,248,1286,601,
1124,2179,221,2098,364,659,1070,802,2071,1289,
422,1099,775,708,613,451,3072,370,1185,65 4,2312,
1552,559,425,2122,343,1172,792,235,1077,602,412,
2208,317,222,2561,1344,127,688,21 81,2100,1290,
661,1128,804,2129,614,480,1101,833,1186,2075,
1539,453,426,372,1159,779,712, 1078,617,399,2124,
1297,318,237,2562,1107,604,675,2182,347,1176,
2087,1081,662,2320,567,4 33,2130,1292,243,1102,
2185,834,2104,1568,454,665,359,1188,808,2077,
1541,618,428,1298,12 17,781,238,1136,591,457,376,
1163,2564,1109,1082,677,2307,2240,349,434,2145,
1055,787,720, 2186,625,407,2132,2091,245,666,836,
571,2078,1542,1408,191,1313,1218,782,1123,620,
458,13 00,363,1192,1110,2193,1545,678,2336,350,
1165,897,2146,1084,816,707,2309,626,436,2119,25
68,1113,789,246,681,2188,599,465,2093,1171,668,
1314,573,411,2136,1600,249,1287,1220,840, 1125,
2194,1546,460,2099,365,1166,898,1071,803,736,
2310,1304,423,2148,1114,790,709,682,6 28,466,3073,
2094,371,1200,655,2313,1553,574,440,2123,1173,
793,250,1316,603,413,1126,220 9,223,2576,1345,366,
689,2196,1548,2101,1291,1224,900,1129,805,710,
2368,615,481,3074,111 6,848,1187,684,2314,1554,
468,427,2152,373,1174,794,713,1079,632,414,2125,
2210,319,252,25 63,1346,605,690,2183,1177,2102,
1320,663,2321,1130,806,2131,1293,482,1103,2200,
835,1664, 2105,1569,455,3076,904,374,1189,809,714,
2316,1556,619,429,2126,1299,1232,796,239,2592,1
137,606,472,2212,377,1178,2565,1348,1083,692,
2322,2241,435,2160,1294,721,1132,2187,864, 2133,
2106,1570,484,667,837,1190,810,2079,1543,1409,
430,1328,1219,783,716,1138,621,459,3 080,1301,378,
1193,2566,1111,2432,1560,679,2337,2242,351,1180,
912,2147,1085,817,722,2324, 2216,627,437,2134,
2569,1352,247,696,2189,838,2108,1572,1410,669,
1315,1248,812,2137,160 1,622,488,1302,1221,841,
1194,1140,2195,1547,461,2338,380,1167,899,2624,
1086,818,737,231 1,2244,1305,438,2149,2570,1115,
791,724,683,2190,629,467,3088,2095,1201,670,2328,
1792,57 5,441,2138,1602,1412,251,1317,1222,842,
1127,2224,1576,462,2577,1360,367,1196,928,2197,1
549,738,2340,1306,1225,901,2150,1144,820,711,
2369,630,496,3075,2572,1117,849,1202,685,2 315,
2248,1555,469,442,2153,1175,795,728,1318,633,415,
2140,1604,2211,253,2578,1347,844,6 91,2198,1550,
1416,2103,1321,1226,902,1131,807,740,2370,1308,
483,3104,1118,2201,850,1665, 686,2344,1584,470,
3077,905,2154,375,1204,824,715,2317,1557,634,444,
2127,2688,1233,797,2 54,2593,1376,607,473,2213,
1179,2580,1349,1322,693,2323,2256,1608,2161,1295, 1228,960,113 3,2202,865,1666,2372,2107,1571,485,
3078,906,852,1191,811,744,2318,1558,1424,431,
2156,13 29,1234,798,717,2594,1139,636,474,3081,
2214,379,1208,2567,1350,2433,1561,694,2352,2243,
1181,913,2162,1324,723,2325,1134,2217,866,2135,
2584,1353,486,697,2204,839,1668,2109,157 3,1411,
3136,908,1330,1249,813,718,2376,1616,623,489,
3082,1303,1236,856,1195,2596,1141,2 434,1562,476,
2339,2272,381,1182,914,2625,1087,819,752,2326,
2245,2218,439,2164,2571,1354, 725,698,2191,868,
3089,2110,1574,1440,671,2329,1793,1250,814,2139,
1603,1413,490,1332,12 23,843,1672,1142,2225,1577,
463,3084,2816,1361,382,1197,929,2626,2436,1564,
739,2341,2246, 1307,1240,916,2151,2600,1145,821,
726,2384,2220,631,497,3090,2573,1356,1203,700,
2330,22 49,1794,443,2168,1632,1414,729,1319,1252,
872,2141,1605,2226,1578,492,2579,1362,845,1198,
930,2199,1551,1417,2342,1336,1227,903,2628,1146,
822,741,2371,3200,1309,498,3105,2574,1 119,2440,
851,1680,687,2345,2250,1585,471,3092,920,2155,
1205,825,730,2332,1796,635,445,2 142,1606,2689,
1472,255,2608,1377,846,2228,1580,1418,2581,1364,
1323,1256,932,2257,1609,7 42,2400,1310,1229,961,
3106,1148,2203,880,1667,2373,2346,1586,500,3079,
907,2632,853,1206, 826,745,2319,2252,1559,1425,
446,2157,2690,1235,799,732,2595,1378,637,475,
3096,2215,120 9,2582,1351,2448,1800,695,2353,
2258,1610,1420,2163,1325,1230,962,1135,2232,867,
1696,237 4,2585,1368,487,3108,936,2205,854,1669,
746,2348,1588,1426,3137,909,2158,1331,1264,828,7
19,2377,1617,638,504,3083,2692,1237,857,1210,
2597,1380,2435,1563,477,2354,2273,1183,915, 2640,
1326,753,2327,2260,1612,2219,2165,2586,1355,964,
699,2206,869,1670,3328,2111,1575, 1441,3138,910,
1808,1251,815,748,2378,1618,1428,491,3112,1333,
1238,858,1673,2598,1143,24 64,1592,478,3085,2817,
2274,383,1212,944,2627,2437,1565,754,2356,2247,
2696,1241,917,2166, 2601,1384,727,2385,2221,870,
3091,2588,1357,1442,701,2331,2264,1795,1728,2169,
1633,1415, 3140,968,1334,1253,873,1674,2380,1620,
2227,1579,493,3086,2818,1363,860,1199,931,2656,2
438,1566,1432,2343,2276,1337,1242,918,2629,2602,
1147,823,756,2386,3201,2222,499,3120,25 75,1358,
2441,1681,702,2360,2251,1824,3093,921,2170,1634,
1444,731,2333,1797,1254,874,214 3,1607,2704,1473,
494,2609,1392,847,1676,2229,1581,1419,3144,2820,
1365,1338,1257,933,263 0,2496,1624,743,2401,3202,
1311,1244,976,3107,2604,1149,2442,881,1682,2388,
2347,2280,158 7,501,3094,922,2633,1207,827,760,
2334,2253,1798,447,2172,1636,2691,1474,733,2610,
1379,8 76,3097,2230,1582,1448,2583,1366,2449,
1801,1258,934,2259,1611,1421,2402,1340,1231,963,3
584,1150,2233,882,1697,2375,3204,2824,1369,502,
3109,937,2634,2444,855,1684,747,2349,225 4,1589,
1427,3152,924,2159,2720,1265,829,734,2392,1856,
639,505,3098,2693,1476,1211,2612, 1381,2450,1802,
2355,2288,1640,1422,2641,1327,1260,992,2261,1613,
2234,1698,2404,2587,13 70,965,3110,938,2207,884,
1671,3329,2350,1590,1456,3139,911,2636,1809,1266,
830,749,2379, 3208,1619,1429,506,3113,2694,1239,
859,1688,2599,1382,2465,1593,479,3100,2832,2275,
1213, 945,2642,2452,1804,755,2357,2262,1614,2697,
1480,2167,2616,1385,966,2236,871,1700,3330,2 589,
1372,1443,3168,940,2265,1810,1729,750,2408,1648,
1430,3141,969,3114,1335,1268,888,16 75,2381,1621,
2466,1594,508,3087,2819,2752,861,1214,946,2657,
2439,1567,1433,2358,2277,26 98,1243,919,2644, 2603,1386,757,2387,3216,2223,3121,2590,1359,2456,
1920,703,2361,2266,18 25,1730,3332,2171,1635,
1445,3142,970,1812,1255,875,1704,2382,1622,2705,
1488,495,3116,28 48,1393,862,1677,2658,2468,1596,
1434,3145,2821,2278,1339,1272,948,2631,2497,1625,
758,24 16,3203,2700,1245,977,3122,2605,1388,2443,
1683,2389,2362,2281,1826,3095,923,2648,1446,7
61,2335,2268,1799,1732,2173,1637,2706,1475,972,
2611,1394,877,1678,3336,2231,1583,1449,3 146,
2822,1367,1816,1259,935,2660,2498,1626,1436,2403,
3232,1341,1246,978,3585,2606,1151, 2472,883,1712,
2390,3205,2825,2282,503,3124,952,2635,2445,1685,
762,2364,2255,1828,3153,9 25,2174,1638,2721,1504,
735,2393,1857,878,3099,2708,1477,1450,2613,1396,
2451,1803,1736,2 289,1641,1423,3148,2880,1342,
1261,993,3586,2500,1628,2235,1699,2405,3206,2826,
1371,980, 3111,939,2664,2446,885,1686,3344,2351,
2284,1591,1457,3154,926,2637,2722,1267,831,764,23
94,3209,1858,507,3128,2695,1478,1689,2614,1383,
2480,1832,3101,2833,2290,1642,1452,2643, 2453,
1805,1262,994,2263,1615,2712,1481,2406,2617,1400,
967,3588,2237,886,1701,3331,3264, 2828,1373,1458,
3169,941,2638,2504,1811,1744,751,2409,3210,1649,
1431,3156,984,3115,2724, 1269,889,1690,2396,1860,
2467,1595,509,3102,2834,2753,1215,947,2672,2454,
1806,2359,2292, 1644,2699,1482,2645,2618,1387,
996,3217,2238,1702,3360,2591,1374,2457,1921,3170,
942,226 7,1840,1731,3333,2410,1650,1460,3143,971,
3592,1813,1270,890,1705,2383,3212,1623,2944,14
89,510,3 117,2849,2754,863,1692,2659,2469,1597,
1435,3160,2836,2279,2728,1273,949,2646,25
12,1864,759,2417,3218,2701,1484,3123,2620,1389,
2458,1922,2363,2296,1827,1760,3334,2649, 1447,
3172,1000,2269,1814,1733,1706,2412,1652,2707,
1490,973,3118,2850,1395,892,1679,333 7,2470,1598,
1464,3147,2823,2756,1817,1274,950,2661,2499,1627,
1437,2418,3233,2702,1247,9 79,3600,2607,1390,
2473,1713,2391,3220,2840,2283,3125,953,2650,2460,
1924,763,2365,2270,1 829,1734,3392,2175,1639,
2736,1505,974,1872,879,1708,3338,2709,1492,1451,
3176,2852,1397, 1818,1737,2662,2528,1656,1438,
3149,2881,3234,1343,1276,1008,3587,2501,1629,
2474,1714,2 420,3207,2827,2760,981,3126,954,2665,
2447,1687,3345,2366,2285,1830,3155,927,2652,
2723,1 506,765,2395,3224,1859,3129,2710,1479,
1928,2615,1398,2481,1833,1738,3340,2291,1643,145
3,3150,2882,1820,1263,995,3616,2502,1630,2713,
1496,2407,3236,2856,1401,982,3589,2666,24 76,887,
1716,3346,3265,2829,2286,1459,3184,956,2639,2505,
1745,766,2424,3211,1888,3157,98 5,3130,2725,1508,
1691,2397,1861,2482,1834,3103,2835,2768,1454,
2673,2455,1807,1740,2293, 1645,2714,1483,2884,
2619,1402,997,3590,3456,2239,1703,3361,3266,2830,
1375,1936,3171,94 3,2668,2506,1841,1746,3348,
2411,3240,1651,1461,3158,986,3593,2726,1271,891,
1720,2398,32 13,1862,2945,511,3132,2864,2755,
1693,2674,2484,1836,3161,2837,2294,1646,2729,
1512,2647, 2513,1865,998,3219,2716,1485,3362,
2621,1404,2459,1923,3648,2297,1842,1761,3335,
3268,28 88,1462,3173,1001,3594,2508,1815,1748,
1707,2413,3214,1653,2946,1491,988,3119,2851,2784,
893,1694,3352,2471,1599,1465,3162,2838,2757,2730,
1275,951,2676,2514,1866,2419,3248,270 3,1486,
3601,2622,1391,2488,1952,3221,2841,2298,1762,
3364,2651,2461,1925,3174,1002,2271, 1844,1735,
3393,2414,1654,2737,1520,975,3596,1873,894,1709,
3339,3272,2948,1493,1466,317 7,2853,2758,1819, 1752,2663,2529,1657,1439,3164,2896,3235,2732,
1277,1009,3602,2516,1868, 2475,1715,2421,3222,
2842,2761,3127,955,2680,2462,1926,2367,2300,1831,
1764,3394,2653,27 38,1507,1004,3225,1874,1710,
3368,2711,1494,1929,3178,2854,1399,1848,1739,
3341,2530,165 8,1468,3151,2883,3712,1821,1278,
1010,3617,2503,1631,2952,1497,2422,3237,2857,
2762,983,3 604,2667,2477,1717,3347,3280,2844,
2287,3185,957,2654,2520,1984,767,2425,3226,1889,
3396, 3131,2740,1509,1930,1876,2483,1835,1768,
3342,2769,1455,3180,2912,1822,1741,3618,2532,1
660,2715,1498,2885,3238,2858,1403,1012,3591,3457,
2478,1718,3376,3267,2831,2764,1937,31 86,958,
2669,2507,1747,3349,2426,3241,1890,3159,987,3608,
2727,1510,1721,2399,3228,1863,2 960,3133,2865,
2770,1932,2675,2485,1837,1742,3400,2295,1647,
2744,1513,2886,1880,999,362 0,3458,2717,1500,
3363,3296,2860,1405,1938,3649,2670,2536,1843,
1776,3350,3269,2889,3242, 1463,3188,1016,3595,
2509,1749,1722,2428,3215,1892,2947,989,3134,2866,
2785,1695,3353,24 86,1838,3163,2839,2772,2731,
1514,2677,2515,1867,3249,2718,1487,3840,2623,
1406,2489,195 3,3650,3460,2299,1763,3365,3270,
2890,1940,3175,1003,3624,2510,1845,1750,3408,
2415,3244, 1655,2976,1521,990,3597,2786,895,1724,
3354,3273,2949,1467,3192,2868,2759,1753,2678,254
4,1896,3165,2897,3250,2733,1516,3603,2517,1869,
2490,1954,3223,2843,2776,3366,2681,2463, 1927,
3652,2301,1846,1765,3395,2892,2739,1522,1005,
3598,3464,1875,1711,3369,3274,2950,1 495,1944,
3179,2855,2788,1849,1754,3356,2531,1659,1469,
3166,2898,3713,2734,1279,1011,36 32,2518,1870,
2953,2423,3252,2872,2763,3605,2682,2492,1956,
3281,2845,2302,1766,3424,265 5,2521,1985,1006,
3227,1904,3397,3370,2741,1524,1931,3656,1877,
1850,1769,3343,3276,3008, 1470,3181,2913,3714,
1823,1756,3619,2533,1661,2954,1499,2900,3239,
2859,2792,1013,3606,3 472,2479,1719,3377,3282,
2846,2765,3187,959,2684,2522,1986,2427,3256,1891,
3398,3609,274 2,1511,1960,3229,1878,2961,1770,
3372,2771,1933,3182,2914,1852,1743,3401,2534,
1662,2745, 1528,2887,3716,1881,1014,3621,3459,
2956,1501,3378,3297,2861,2766,1939,3664,2671,
2537,1 777,3351,3284,2904,3243,3189,1017,3610,
2524,1988,1723,2429,3230,1893,2962,3135,2867,28
00,1934,2487,1839,1772,3402,2773,2746,1515,2916,
1882,3622,3488,2719,1502,3841,3298,286 2,1407,
1968,3651,3461,2538,1778,3380,3271,2891,3720,
1941,3190,1018,3625,2511,1751,3409, 2430,3245,
1894,2977,991,3612,2787,1725,3355,3288,2964,3193,
2869,2774,1992,2679,2545,18 97,3404,3251,2748,
1517,3842,1884,2491,1955,3680,3462,2777,3367,
3300,2920,1942,3653,362 6,2540,1847,1780,3410,
2893,3246,2978,1523,1020,3599,3465,1726,3384,
3275,2951,1945,3194, 2870,2789,1755,3357,2546,
1898,3167,2899,3728,2735,1518,3633,2519,1871,
2968,3253,2873,2 778,3844,2683,2493,1957,3654,
3520,2303,1767,3425,2894,2000,1007,3628,3466,
1905,3412,33 71,3304,2980,1525,1946,3657,2790,
1851,1784,3358,3277,3009,1471,3196,2928,3715,
1757,363 4,2548,1900,2955,2901,3254,2874,2793,
3607,3473,2494,1958,3283,2847,2780,3426,2685,
2523, 1987,3257,1906,3399,3848,2743,1526,1961,
3658,3468,1879,1771,3373,3278,3010,1948,3183,2
915,3744,1853,1758,3416,2535,1663,2984,1529,2902,
3717,2794,1015,3636,3474,2957,3379,33 12,2876,
2767,3665,2686,2552,2016,3285,2905,3258,3428, 3611,2525,1989,1962,3231,1908,296 3,3374,2801,
1935,3660,1854,1773,3403,3012,2747,1530,2917,
3718,1883,3623,3489,2958,1503, 3856,3299,2863,
2796,1969,3666,3476,2539,1779,3381,3286,2906,
3721,3191,1019,3640,2526,1 990,2431,3260,1895,
2992,3613,2802,1964,3289,2965,1774,3432,2775,
1993,2918,1912,3405,34 90,2749,1532,3843,3776,
1885,1970,3681,3463,3016,3382,3301,2921,3722,
1943,3668,3627,254 1,1781,3411,2908,3247,2979,
1021,3614,3480,1727,3385,3290,2966,3195,2871,
2804,1994,2547, 1899,3406,3729,2750,1519,3872,
1886,2969,3682,3492,2779,3845,3302,2922,1972,
3655,3521,2 542,1782,3440,2895,3724,2001,1022,
3629,3467,3413,3386,3305,2981,1947,3672,2791,
1785,33 59,3292,3024,3197,2929,3730,1996,3635,
2549,1901,2970,3255,2875,2808,3846,2495,1959,368
4,3522,2781,3427,2924,2002,3630,3496,1907,3414,
3849,3306,2982,1527,1976,3659,3469,1786, 3388,
3279,3011,1949,3198,2930,3745,1759,3417,2550,
1902,2985,2903,3732,2795,3637,3475,2 972,3313,
2877,2782,3904,2687,2553,2017,3524,3259,3429,
3850,2004,1963,3688,3470,1909,33 75,3308,3040,
1950,3661,3746,1855,1788,3418,3013,2986,1531,
2932,3719,3638,3504,2959,385 7,3314,2878,2797,
3667,3477,2554,2018,3287,2907,3736,3430,3641,
2527,1991,3261,1910,2993, 3852,2803,1965,3662,
3528,1775,3433,3014,2008,2919,3748,1913,3420,
3491,2988,1533,3858,3 777,2798,1971,3696,3478,
3017,3383,3316,2936,3723,3669,3642,2556,2020,
2909,3262,2994,36 15,3481,1966,3291,2967,3434,
2805,1995,1914,3407,3968,2751,1534,3873,3778,
1887,3683,349 3,3018,3860,3303,2923,3752,1973,
3670,3536,2543,1783,3441,2910,3725,1023,3644,
3482,3387, 3320,2996,3673,2806,2024,3293,3025,
3436,3731,1997,3874,1916,2971,3494,2809,3847,
3780,1 974,3685,3523,3020,3442,2925,3726,2003,
3631,3497,3415,3864,3307,2983,1977,3674,3484,17
87,3389,3294,3026,3199,2931,3760,1998,2551,1903,
3000,3733,2810,3876,2973,3686,3552,278 3,3905,
2926,2032,3525,3498,3444,3851,3784,2005,1978,
3689,3471,3390,3309,3041,1951,3676, 3747,1789,
3419,3028,2987,2933,3734,3639,3505,2974,3315,
2879,2812,3906,2555,2019,3526,3 737,3431,3880,
2006,3690,3500,1911,3853,3310,3042,1980,3663,
3529,1790,3448,3015,2009,29 34,3749,3421,3506,
2989,3859,3792,2799,3697,3479,3032,3317,2937,
3738,3908,3643,2557,202 1,3263,2995,3854,1967,
3692,3530,3435,3044,2010,3750,1915,3422,3969,
2990,1535,3888,3779, 3698,3508,3019,3861,3318,
2938,3753,3671,3537,2558,2022,2911,3740,3645,
3483,3321,2997,3 912,2807,2025,3532,3437,3970,
2012,3875,3808,1917,3495,3048,3862,3781,3754,
1975,3700,35 38,3021,3443,2940,3727,3646,3512,
3865,3322,2998,3675,3485,2026,3295,3027,3438,
3761,199 9,1918,3001,3972,2811,3877,3782,3687,
3553,3022,3920,2927,3756,2033,3540,3499,3445,
3866, 3785,1979,3704,3486,3391,3324,3056,3677,
3762,2028,3029,3002,3735,3878,2975,3554,2813,3
907,2034,3527,3976,3446,3881,3786,2007,3691,3501,
3868,3311,3043,1981,3678,3544,1791,34 49,3030,
2935,3764,3507,3004,3793,2814,3936,3033,3556,
3739,3909,3882,2036,3502,3855,378 8,1982,3693,
3531,3450,3045,2011,3751,3423,3984,2991,3889,
3794,3699,3509,3034,3319,2939, 3768,3910,2559,
2023,3741,3884,3694,3560,3913,3046,2040,3533,
3452,3971,2013,3890,3809,3 510,3049,3863,3796,
3755,3701,3539,3036,2941,3742,3647,3513,3323, 2999,3914,2027,3534,34　39,4000,2014,3810,1919,
3973,3050,3892,3783,3702,3568,3023,3921,2942,
3757,3541,3514,386　7,3800,3705,3487,3325,3057,
3916,3763,2029,3003,3974,3879,3812,3555,3052,
3922,3758,2035,　3542,3977,3447,3896,3787,3706,
3516,3869,3326,3058,3679,3545,2030,3031,3765,
3005,4032,2　815,3937,3557,3978,3924,3883,3816,
2037,3503,3870,3789,1983,3708,3546,3451,3060,
3766,39　85,3006,3795,3938,3035,3558,3769,3911,
2038,3980,3885,3790,3695,3561,3928,3047,2041,354
8,3453,3986,3891,3824,3511,3064,3797,3770,3940,
3037,3743,3886,3562,3915,2042,3535,3454,　4001,
2015,3811,3988,3051,3893,3798,3703,3569,3038,
2943,3772,3515,3801,3944,3564,3917,4　002,2044,
3975,3894,3813,3570,3053,3923,3759,3543,3992,
3897,3802,3707,3517,3327,3059,39　18,2031,4004,
3814,4033,3054,3952,3572,3979,3925,3898,3817,
3518,3871,3804,3709,3547,306　1,3767,3007,4034,
3939,3559,4008,3926,3818,2039,3981,3900,3791,
3710,3576,3929,3062,3549,　3987,3825,3065,4036,
3771,3941,3982,3887,3820,3563,3930,2043,3550,
3455,4016,3826,3989,3　066,3799,3942,3039,3773,
4040,3945,3565,3932,4003,2045,3990,3895,3828,
3571,3068,3774,39　93,3803,3946,3566,3919,2046,
4005,3815,4048,3055,3953,3573,3994,3899,3832,
3519,3805,394　8,4006,4035,3954,3574,4009,3927,
3819,3996,3901,3806,3711,3577,3063,4064,4037,
4010,3956,　3983,3902,3821,3578,3931,3551,4017,
3827,3067,4038,3943,4012,3822,4041,3960,3580,
3933,4　018,3991,3829,3069,3775,4042,3947,3567,
3934,2047,4020,3830,4049,3070,3995,3833,4044,39
49,4007,4050,3955,3575,4024,3834,3997,3807,3950,
4065,4052,4011,3957,3998,3903,3836,357　9,4066,
4039,3958,4013,3823,4056,3961,3581,4019,4068,
4014,4043,3962,3582,3935,4021,3831,　3071,4072,
4045,3964,4022,4051,4025,3835,4046,3951,4080,
4053,4026,3999,3837,4067,4054,3　959,4028,3838,
4057,4069,4015,4058,3963,3583,4070,4073,4060,
3965,4023,4074,4047,3966,40　81,4027,4076,4082,
4055,4029,3839,4084,4030,4059,4071,4088,4061,
4075,4062,3967,4077,408　3,4078,4085,4031,4086,
4089,4090,4063,4092,4079,4087,4091,4093,4094,
4095,],
wherein sequence Q2=[6309,5445,6419,5391,6298,6203,
5667,5287,6414,5654,6252,5425,5330,5235,6310,
6663,5446,　5657,6339,5277,3623,6258,5420,4819,
6421,5230,6313,6231,5449,3381,3721,6300,4935,
6205,5　669,5507,5004,5426,5345,4909,4814,3613,
3289,5399,5332,5291,6692,5237,5658,6435,5278,34
05,5010,5183,4915,6422,6341,6314,3681,6260,3463,
6667,5450,4821,3382,3301,4794,3722,628　7,4964,
3668,3627,6206,5670,3411,4767,6425,3247,2979,
5346,4910,3614,6235,3480,5699,5509,　4586,3385,
3290,5428,2966,5319,4939,5768,3195,5238,6321,
5673,4559,7180,5457,4478,5293,3　406,5025,6722,
3729,6532,5660,4835,6437,6342,5403,2969,5336,
5012,3682,6247,3492,6696,52　41,2779,4917,4822,
3845,6480,3302,2922,6316,4727,4593,3655,7186,
3521,6669,5452,5299,344　0,4796,2895,6426,3724,
6345,4539,3629,6264,3467,5728,5510,3413,4825,
3386,3305,5415,2981,　5348,4968,1947,3672,6237,
5701,2791,6322,5674,4588,3359,3292,6675,5458,
4941,5294,3197,5　026,2929,3730,6295,5647,5513,
3635,6438,2549,1901,5432,2970,5323,4999,6724,
3255,2875,52　42,4918,4837,3846,6467,5405,2495,
1959,4594,3684,7201,3522,6670,5215,2781,6536,
4947,577　6,3427,4783,2924,6441,6346,5681,2002, 4567,7188,5016,3630,6251,3496,1907,5301,3414,
4921,　4826,3849,6428,3306,5892,2982,1527,4731,
1976,4541,3659,6238,3469,5702,6785,5568,1786,4
351,3388,3279,6704,5473,3011,4942,1949,3198,2930,
3745,6324,5676,1759,5514,3417,6677,54　60,2550,
1902,5419,2985,5352,5028,2903,3732,6353,5705,
2795,4838,3637,6496,3475,5406,297　2,5325,5057,
7202,3313,2877,5244,2782,6299,4976,5763,6469,
2687,6442,2553,5682,2017,4596,　7175,3524,5003,
6728,3259,4949,5302,3429,4922,4841,3850,6415,
6348,5655,2004,5521,1963,4　542,3688,6253,3470,
1909,6786,5331,4895,4828,3375,3308,6691,5474,
3040,4733,1950,4571,36　61,7192,3746,6311,1855,
1788,5305,3418,6678,5447,3013,6544,5896,2986,
1531,4791,2932,644　9,3719,6354,5706,5516,3638,
6259,3504,5421,2959,5326,5058,3857,3314,2878,
5231,2797,6328,　4963,5792,3667,6470,3477,6681,
5464,2554,2018,4583,7204,3287,5032,2907,3736,
6301,4950,5　765,3430,4842,3641,6444,2527,5684,
1991,5522,7233,5005,6254,3261,1910,5427,2993,
5360,49　24,4815,3852,6473,5713,2803,4734,1965,
4600,3662,7179,3528,6788,5333,4953,1775,5306,343
3,6693,5476,3014,6531,5659,2008,4573,2919,6450,
3748,6369,1913,5279,3420,5011,6736,3491,　5422,
2988,1533,4849,3858,6423,3777,6356,5708,2798,
6315,1971,3696,6261,3478,6682,5451,3　017,5060,
3383,3316,4795,2936,3723,6302,4965,5766,3669,
3642,6207,2556,5671,2020,5537,72　34,5006,2909,
3262,5904,2994,5347,4911,4844,3615,6474,3481,
5714,5524,1966,4587,7208,329　1,5429,2967,5334,
4954,5769,3434,6694,5239,2805,6560,5688,1995,
4574,7181,6913,6370,1914,　4479,5308,3407,5040,
6723,3968,6533,5661,2751,1534,4850,3873,6452,
3778,6343,1887,6792,5　337,5013,3683,6262,3493,
6697,5480,3018,4823,3860,6481,3303,2923,3752,
6317,4966,1973,36　70,7187,3536,6684,5453,2543,
1783,5538,3441,4797,2910,6427,3725,6360,5891,
5824,1023,364　4,6265,3482,5729,5511,7236,5064,
3387,3320,5430,2996,5349,4969,5770,3673,6476,
5716,2806,　6323,5675,2024,4589,7182,3293,6914,
5459,3025,4956,5295,3436,5027,6752,3731,6534,
5662,1　997,5528,3874,6439,6372,1916,5433,2971,
5338,5014,6725,3494,6698,5243,2809,4919,4852,38
47,6482,3780,7297,6318,1974,4595,3685,7216,3523,
6671,5454,3020,6537,5777,3442,4798,292　5,6456,
3726,6347,5920,2003,7189,5017,3631,6266,3497,
5730,5540,3415,4827,3864,6429,3307,　5893,2983,
5350,4970,1977,3674,6239,3484,5703,6800,5569,
1787,4590,3389,3294,6705,5488,3　026,4943,5772,
3199,2931,3760,6325,5677,1998,5515,7240,6916,
5461,2551,1903,5434,3000,53　53,5029,6726,3733,
6592,5720,2810,4839,3876,6497,7298,5407,2973,
5340,5072,3686,7203,355　2,6700,5245,2783,6538,
4977,5778,3905,6484,2926,6443,6376,5683,2032,
4597,7190,3525,5018,　6729,3498,5303,3444,4923,
4856,3851,6430,3784,6349,5894,2005,1978,4543,
3689,6268,3471,5　732,6787,5570,4829,3390,3309,
6706,5475,3041,4972,1951,3676,7193,3747,6326,
5678,1789,55　44,3419,6679,5462,3028,6545,5897,
2987,5354,5030,2933,3734,6355,5707,5517,3639,
6498,350　5,5436,2974,5327,5059,3315,2879,5246,
2812,6329,4978,5793,3906,6471,7300,6920,5465,
2555,　2019,4598,7205,3526,5033,6730,3737,6540,
4951,5780,3431,4843,3880,6350,5685,2006,5523,7
248,5020,3690,6255,3500,1911,6816,5361,4925,4830,
3853,6488,3310,5952,3042,4735,1980,46　01,3663,
7194,3529,6789,5572,1790,5307,3448,6708,5477, 3015,6546,5898,2009,2934,3749,638 4,5736,5518,
3421,3506,5423,2989,5356,5088,3859,3792,2799,
5794,3697,6500,3479,5466,3032, 5061,3317,5034,
2937,3738,4980,3908,7425,3643,2557,2021,5552,
5007,3263,5905,2995,5362,4 926,4845,3854,7304, 5
1967,4602,3692,3530,5335,4955,5784,3435,3044,
2010,4575,6928,3750,19 15,5309,3422,5041,3969,
5900,2990,1535,4851,3888,3779,5576,3698,3508,
3019,5062,3318,293 8,4967,7426,3537,2558,2022,
7264,5036,2911,3740,4846,3645,3483,5744,3321, 10
2997,4984,3912, 2807,2025,4604,3532,6848,3437,
3970,2012,3808,1917,3048,7312,1975,3021,6016,
2940,7428,3 512,2998,2026,6944,1918,3972,3920,
3056,7681,6445,6451,6737,6357,5709,6330,6683,
7206,63 03,5767,6446,5686,7235,6732,6475,5715, 15
5525,7209,6790,6695,5478,6561,5689,7196,6371,673
8,6548,6453,6358,5710,6793,6263,6712,5481,3861,
3753,6332,5796,3671,6685,5468,5539,6361, 5906,
5825,6504,5526,7237,5065,7210,5431,5364,5771,
6477,5717,6562,5690,7183,6915,4957,5 310,5042, 20
6753,6535,5663,5529,3875,6454,6373,6794,5339,
5015,6740,3495,6699,5482,4853,38 62,6483,3781,
3754,6319,3700,7217,3538,6686,5455,6552,3443,
4799,6457,3727,6362,5921,582 6,3646,6267,5731,
5541,7238,5066,3865,3322,5908,5351,4971,5800, 25
3675,6478,3485,5718,6801, 5584,4591,7212,3295,
5489,3027,4958,5773,3438,6754,3761,6564,5692,
1999,5530,7241,6917,6 374,5435,3001,5368,5044,
6727,6593,5721,2811,4854,3877,6512,3782,7299,
6796,5341,5073,36 87,7218,3553,6701,5484,3022, 30
6539,5779,6485,2927,6458,3756,6377,5922,2033,
7191,3540,501 9,6744,3499,5542,3445,4857,3866,
6431,3785,6364,5895,5828,1979,3704,6269,3486,
5733,6802, 5571,5068,3391,3324,6707,5490,4973,
5774,3677,7432,3762,6327,5679,2028,5545,7242, 35
6918,5 463,3029,5912,3002,5355,5031,6756,3735,
6594,5722,5532,3878,6499,7328,5437,2975,5342,50
74,3554,6702,5247,2813,6568,4979,5808,3907,6486,
7301,6921,6378,2034,4599,7220,3527,504 8,6731,
3976,6541,5781,3446,4858,3881,6460,3786,6351, 40
5924,2007,7249,5021,3691,6270,3501, 5734,6817,
5600,4831,3868,6489,3311,5953,3043,4974,1981,
3678,7195,3544,6804,5573,1791,5 546,3449,6709,
5492,3030,6547,5899,5832,2935,3764,6385,5737,
5519,7244,6976,3507,5438,30 04,5357,5089,7682, 45
3793,6596,5724,2814,6331,5795,3936,6501,7302,
6922,5467,3033,5076,720 7,3556,5035,6760,3739,
6542,4981,5782,3909,7440,3882,6447,6380,5687,
2036,5553,7250,5022, 6733,3502,6818,5363,4927,
4860,3855,6490,3788,7305,5954,1982,4603,3693, 50
7224,3531,6791,5 574,5785,3450,6710,5479,3045,
6576,5928,2011,7197,6929,3751,6386,5738,5548,
3423,6739,39 84,6549,5901,2991,5358,5090,3889,
3794,6359,5711,6808,5577,3699,6502,3509,6713,
5496,303 4,5063,7684,3319,2939,3768,6333,4982, 55
5797,3910,7427,7360,6924,5469,2559,2023,5554,
7265, 5037,6734,3741,6600,5907,5840,4847,3884,
6505,7306,5745,5527,7252,5080,3694,7211,3560,6
820,5365,4985,5786,3913,6492,5956,3046,6563,5691,
2040,4605,7198,3533,6930,6849,5311,34 52,5043, 60
6768,3971,6550,5902,2013,3890,6455,3809,6388,
5740,6795,5578,6741,3510,6714,548 3,3049,5092,
3863,3796,7313,3755,6334,5798,3701,7456,3539,
6687,5470,3036,6553,6017,7266, 5038,2941,3742,
6363,5936,5827,7429,3647,6506,3513,5746,5556, 65
7239,5067,7688,3323,5909,2 999,5366,4986,5801,
3914,6479,7308,5719,7040,5585,2027,4606,7213, 3534,6945,6850,4959,57 88,3439,6755,4000,6565,
5693,2014,5531,7256,6932,3810,6375,1919,6824,
5369,5045,6742,397 3,6608,5960,3050,4855,3892,
6513,3783,7314,6797,5580,3702,7219,3568,6716,
5485,3023,6554, 6018,3921,2942,6459,3757,6392,
5923,5856,7430,3541,6745,3514,5543,7268,5096,
3867,3800,6 365,5910,5829,5802,3705,6508,3487,
5748,6803,5586,5069,7214,3325,6946,5491,3057,
4988,57 75,3916,7433,3763,6566,5694,2029,5560,
7243,6919,6852,5913,3003,5370,5046,6757,3974,659
5,5723,5533,3879,6514,3812,7329,6798,5343,5075,
7696,3555,6703,5486,3052,6569,5809,3922, 6487,
7316,6936,3758,6379,2035,7221,3542,5049,6746,
3977,6556,6020,3447,4859,3896,6461,3 787,6366,
5925,5830,7488,3706,6271,3516,5735,6832,5601,
5070,3869,3326,5968,3058,4975,58 04,3679,7434,
3545,6805,5588,2030,5547,7272,6948,5493,3031,
5914,5833,6758,3765,6624,575 2,5534,7245,6977,
7330,5439,3005,5372,5104,7683,4032,6597,5725,
2815,6570,5810,3937,6516, 7303,6923,6856,5077,
7222,3557,5050,6761,3978,6543,5783,3924,7441,
3883,6462,3816,6381,5 926,2037,7251,5023,6748,
3503,6819,5602,4861,3870,6491,3789,7320,5955,
1983,3708,7225,35 46,6806,5575,6024,3451,6711,
5494,3060,6577,5929,5834,7436,3766,6387,5739,
5549,7246,697 8,3985,5916,3006,5359,5091,7712,
3795,6598,5726,6809,5592,3938,6503,7332,6952,
5497,3035, 5078,7685,3558,6762,3769,6572,4983,
5812,3911,7442,7361,6925,6382,2038,5555,7280,
5052,6 735,3980,6601,5841,4862,3885,6520,3790,
7307,5984,7253,5081,3695,7226,3561,6821,5604,57
87,3928,6493,5957,3047,6578,5930,2041,7199,3548,
6931,6864,5550,3453,6769,3986,6551,590 3,5836,
3891,3824,6389,5741,6810,5579,6980,3511,6715,
5498,3064,5093,7686,3797,7552,3770, 6335,5799,
3940,7457,7362,6926,5471,3037,6032,7267,5039,
6764,3743,6602,5937,5842,7444,3 886,6507,7336,
5747,5557,7254,5082,7689,3562,6822,5367,4987,
5816,3915,6494,7309,5958,70 41,2042,4607,7228,
3535,6960,6851,5789,3454,6770,4001,6580,5932,
2015,7257,6933,3811,639 0,5742,6825,5608,6743,
3988,6609,5961,3051,5094,3893,3798,7315,6812,
5581,3703,7458,3569, 6717,5500,3038,6555,6019,
7744,2943,3772,6393,5938,5857,7431,7364,6984,
3515,5558,7269,5 097,7690,3801,6604,5911,5844,
5803,3944,6509,7310,5749,7042,5587,5084,7215,
3564,6947,68 80,4989,5790,3917,7448,4002,6567,
5695,2044,5561,7258,6934,6853,6826,5371,5047,
6772,397 5,6610,5962,3894,6515,3813,7344,6799,
5582,7697,3570,6718,5487,3053,6584,6048,3923,
7317, 6937,3759,6394,5858,7460,3543,6747,3992,
6557,6021,7270,5098,3897,3802,6367,5940,5831,7
489,3707,6510,3517,5750,6833,5616,5071,7692,3327,
5969,3059,4990,5805,3918,7435,7368,70 44,5589,
2031,5562,7273,6949,6854,5915,5848,6759,4004,
6625,5753,5535,7260,6992,3814,733 1,6828,5373,
5105,7698,4033,6612,5964,3054,6571,5811,3952,
6517,7318,6938,6857,7223,3572, 5051,6776,3979,
6558,6022,3925,3898,6463,3817,6396,5927,5860,
7490,6749,3518,6834,5603,5 100,3871,3804,7321,
5970,5806,3709,7464,3547,6807,5590,6025,7274,
6950,5495,3061,5944,58 35,7437,3767,6626,5754,
5564,7247,6979,7808,5917,3007,5374,5106,7713,
4034,6599,5727,704 8,5593,3939,6518,7333,6953,
6858,5079,7700,3559,6763,4008,6573,5813,3926,
7443,7376,6940, 3818,6383,2039,7281,5053,6750,
3981,6616,6080,4863,3900,6521,3791,7322,5985,

55

7492,3710,7 227,3576,6836,5605,6026,3929,5972,
3062,6579,5931,5864,7438,3549,6865,5551,7276,
7008,39 87,5918,5837,7714,3825,6628,5756,6811,
5594,6981,7334,6954,5499,3065,5108,7687,4036,755
3,3771,6574,5814,3941,7472,7363,6927,6860,6033,
7282,5054,6765,3982,6603,5843,7445,3887, 6522,
3820,7337,5986,7255,5083,7704,3563,6823,5606,
5817,3930,6495,7324,5959,7056,2043,7 229,3550,
6961,6866,6028,3455,6771,4016,6581,5933,5838,
7496,3826,6391,5743,6840,5609,69 82,3989,5976,
3066,5095,7716,3799,7554,6813,5596,3942,7459,
7392,6956,5501,3039,6034,774 5,6766,3773,6632,
5939,5872,7446,7365,6985,7338,5559,7284,5112,
7691,4040,6605,5845,5818, 3945,6524,7311,5988,
7043,5085,7230,3565,6962,6881,5791,3932,7449,
4003,6582,5934,2045,7 259,6935,6868,6827,5610,
6773,3990,6611,5963,3895,3828,7345,6814,5583,
7936,3571,6719,55 02,3068,6585,6049,7746,7556,
3774,6395,5859,7461,7366,6986,3993,6036,7271,
5099,7720,380 3,6606,5941,5846,7504,3946,6511,
7340,5751,7072,5617,5086,7693,3566,6882,4991,
5820,3919, 7450,7369,7045,2046,5563,7288,6964,
6855,5849,6774,4005,6640,5992,7261,6993,3815,
7346,6 829,5612,7699,4048,6613,5965,3055,6586,
6050,3953,7319,6939,6872,7462,3573,6777,3994,65
59,6023,7748,3899,3832,6397,5942,5861,7491,6988,
3519,6835,5618,5101,7694,3805,7560,597 1,5807,
3948,7465,7370,7046,5591,6040,7275,6951,6884,
5945,5850,7452,4006,6627,5755,5565, 7262,6994,
7809,6830,5375,5107,7728,4035,6614,5966,7049,
3954,6519,7348,6968,6859,7701,3 574,6778,4009,
6588,6052,3927,7377,6941,3819,6398,5862,7520,
6751,3996,6617,6081,5102,39 01,3806,7323,6000,
7493,3711,7466,3577,6837,5620,6027,7752,5973,
3063,5946,5865,7439,737 2,7104,5566,7277,7009,
7810,5919,5852,7715,4064,6629,5757,7050,5595,
6996,7335,6955,6888, 5109,7702,4037,7568,4010,
6575,5815,3956,7473,7378,6942,6861,7283,5055,
6780,3983,6618,6 082,3902,6523,3821,7352,5987,
7494,7705,3578,6838,5607,6056,3931,7325,5974,
7057,5866,74 68,3551,6867,6029,7278,7010,4017,
5948,5839,7497,3827,6630,5758,6841,5624,6983,
7812,597 7,3067,5110,7717,4038,7555,7052,5597,
3943,7474,7393,6957,6862,6035,7760,6767,4012,
6633, 5873,7447,7380,7000,3822,7339,7285,5113,
7706,4041,6620,6084,5819,3960,6525,7326,5989,7
058,7231,3580,6963,6896,6030,3933,4018,6583,5935,
5868,7498,6869,6842,5611,7012,3991,59 78,7718,
3829,7584,6815,5598,7937,7394,6958,5503,3069,
6064,7747,7557,3775,6634,5874,747 6,7367,6987,
7816,6037,7286,5114,7721,4042,6607,5847,7505,
3947,6526,7341,5990,7073,5087, 7708,3567,6883,
5821,3934,7451,7384,7060,2047,7289,6965,6870,
6088,6775,4020,6641,5993,7 500,3830,7347,6844,
5613,7938,4049,5980,3070,6587,6051,7776,7558,
6873,7463,7396,7016,39 95,6038,7749,7722,3833,
6636,5943,5876,7506,6989,7342,7074,5619,5116,
7695,4044,7561,582 2,3949,7480,7371,7047,6041,
7290,6966,6885,5851,7453,4007,6642,5994,7263,
6995,7824,6831, 5614,7729,4050,6615,5967,7064,
3955,7349,6969,6874,7940,3575,6779,4024,6589,
6053,7750,7 616,3834,6399,5863,7521,6990,3997,
6096,5103,7724,3807,7562,6001,7508,3950,7467,
7400,70 76,5621,6042,7753,6886,5947,5880,7454,
7373,7105,5567,7292,7024,7811,5853,7730,4065,664
4,5996,7051,6997,7350,6970,6889,7703,4052,7569,
4011,6590,6054,3957,7379,6943,6876,7522, 6781,

56

3998,6619,6083,3903,3836,7353,6002,7495,7944,
3579,6839,5622,6057,7754,7564,5975,5 867,7469,
7374,7106,6044,7279,7011,7840,5949,5854,7512,
4066,6631,5759,7080,5625,6998,78 13,6890,5111,
7732,4039,7570,7053,3958,7475,7408,6972,6863,
7761,6782,4013,6648,6112,738 1,7001,3823,7354,
7524,7707,4056,6621,6085,6058,3961,7327,6004,
7059,7470,3581,6897,6031, 7756,4019,5950,5869,
7499,7108,6843,5626,7013,7814,5979,7719,4068,
7585,7054,5599,7952,7 395,6959,6892,6065,7762,
7572,4014,6635,5875,7477,7382,7002,7817,7287,
5115,7736,4043,66 22,6086,3962,6527,7356,5991,
7088,7709,3582,6898,6060,3935,7385,7061,5870,
7528,6871,608 9,7014,4021,6008,7501,3831,7586,
6845,5628,7939,7872,5981,3071,6066,7777,7559,
7112,7478, 7397,7017,7818,6039,7764,7723,4072,
6637,5877,7507,7004,7343,7075,5117,7710,4045,
7576,5 823,3964,7481,7386,7062,7291,6967,6900,
6090,4022,6643,5995,7502,7825,6846,5615,7968,40
51,5982,7065,7778,7588,6875,7941,7398,7018,4025,
6068,7751,7617,3835,6638,5878,7536,699 1,7820,
6097,5118,7725,4046,7563,7509,3951,7482,7401,
7077,6043,7768,6887,5881,7455,7388, 7120,7293,
7025,7826,6092,7731,4080,6645,5997,7066,7351,
6971,6904,7942,4053,4026,6591,6 055,7780,7618,
6877,7523,7020,3999,6098,7726,3837,7592,6003,
7510,7945,7402,7078,5623,60 72,7755,7565,5882,
7484,7375,7107,6045,7294,7026,7841,5855,7513,
4067,6646,5998,7081,699 9,7828,6891,7733,4054,
7571,7068,3959,7409,6973,6878,8000,6783,4028,
6649,6113,7620,3838, 7355,7525,7946,4057,6100,
6059,7784,7566,6005,7471,7404,7136,6046,7757,
7842,5951,5884,7 514,7109,7082,5627,7028,7815,
7734,4069,7600,7055,7953,7410,6974,6893,7763,
7573,4015,66 50,6114,7383,7003,7832,7526,7737,
4058,6623,6087,3963,7357,6006,7089,7948,3583,
6899,606 1,7758,7624,5871,7529,7110,6104,7015,
7844,6009,7516,4070,7587,7084,5629,7954,7873,
6894, 6067,7792,7574,7113,7479,7412,7032,7819,
7765,7738,4073,6652,6116,7005,7358,7090,7711,4
060,7577,6062,3965,7387,7063,7530,6901,6091,4023,
6010,7503,8064,6847,5630,7969,7874,59 83,7779,
7589,7114,7956,7399,7019,7848,6069,7766,7632,
4074,6659,5879,7537,7006,7821,511 9,7740,4047,
7578,3966,7483,7416,7092,7769,6902,6120,7389,
7121,7532,7827,6093,7970,4081, 6012,7067,7590,
6905,7943,7876,4027,6070,7781,7619,7116,7538,
7021,7822,6099,7727,4076,7 593,7511,7960,7403,
7079,6073,7770,7580,5883,7485,7390,7122,7295,
7027,7856,6094,4082,66 47,5999,7096,7829,6906,
7972,4055,7069,7782,7648,6879,8001,7022,4029,
6128,7621,3839,759 4,7540,7947,7880,6101,6074,
7785,7567,7486,7405,7137,6047,7772,7843,5885,
7515,7124,7083, 7029,7830,7735,4084,7601,7070,
7411,6975,6908,8002,4030,6651,6115,7622,7833,
7527,7976,4 059,6102,7786,7596,6007,7949,7406,
7138,6076,7759,7625,5886,7544,7111,6105,7030,
7845,75 17,4071,7602,7085,7955,7888,6895,7793,
7575,7128,7413,7033,7834,8004,7739,4088,6653,611
7,7359,7091,7950,4061,6063,7788,7626,7531,7140,
6106,7846,6011,7518,8065,7086,5631,7984, 7875,
7794,7604,7115,7957,7414,7034,7849,7767,7633,
4075,6654,6118,7007,7836,7741,4062,7 579,3967,
7417,7093,8008,6903,6121,7628,7533,8066,6108,
7971,7904,6013,7591,7144,7958,78 77,7850,6071,
7796,7634,7117,7539,7036,7823,7742,4077,7608,
7961,7418,7094,7771,7581,612 2,7391,7123,7534,

57

7857,6095,4083,6014,7097,8068,6907,7973,7878,
7783,7649,7118,8016,7023, 7852,6129,7636,4078,
7595,7541,7962,7881,6075,7800,7582,7487,7420,
7152,7773,7858,6124,7 125,7098,7831,7974,4085,
7071,7650,6909,8003,4031,6130,7623,8072,7542,
7977,7882,6103,77 87,7597,7964,7407,7139,6077,
7774,7640,5887,7545,7126,7031,7860,4086,7603,
7100,7889,691 0,8032,7129,7652,7835,8005,7978,
4089,6132,7598,7951,7884,6078,7789,7627,7546,
7141,6107, 7847,7519,8080,7087,7985,7890,7795,
7605,7130,7415,7035,7864,8006,4090,6655,6119,
7837,7 980,4063,7790,7656,8009,7142,6136,7629,
7548,8067,6109,7986,7905,7606,7145,7959,7892,78
51,7797,7635,7132,7037,7838,7743,4092,7609,7419,
7095,8010,6123,7630,7535,8096,6110,790 6,6015,
8069,7146,7988,7879,7798,7664,7119,8017,7038,
7853,7637,4079,7610,7963,7896,7801, 7583,7421,
7153,8012,7859,6125,7099,8070,7975,7908,7651,
7148,8018,7854,6131,7638,8073,7 543,7992,7883,
7802,7612,7965,7422,7154,7775,7641,6126,7127,
7861,4087,7101,8128,6911,80 33,7653,8074,8020,
7979,7912,6133,7599,7966,7885,6079,7804,7642,
7547,7156,7862,8081,710 2,7891,8034,7131,7654,
7865,8007,4091,6134,8076,7981,7886,7791,7657,
8024,7143,6137,7644, 7549,8082,7987,7920,7607,
7160,7893,7866,8036,7133,7839,7982,4093,7658,
8011,6138,7631,7 550,8097,6111,7907,8084,7147,
7989,7894,7799,7665,7134,7039,7868,4094,7611,
7897,8040,76 60,8013,8098,6140,8071,7990,7909,
7666,7149,8019,7855,7639,8088,7993,7898,7803,
7613,742 3,7155,8014,6127,8100,7910,8129,7150,
8048,7668,8075,8021,7994,7913,7614,7967,7900,
7805, 7643,7157,7863,7103,8130,8035,7655,8104,
8022,7914,6135,8077,7996,7887,7806,7672,8025,7
158,7645,8083,7921,7161,8132,7867,8037,8078,7983,
7916,7659,8026,6139,7646,7551,8112,79 22,8085,
7162,7895,8038,7135,7869,4095,8136,8041,7661,
8028,8099,6141,8086,7991,7924,766 7,7164,7870,
8089,7899,8042,7662,8015,6142,8101,7911,8144,
7151,8049,7669,8090,7995,7928, 7615,7901,8044,
8102,8131,8050,7670,8105,8023,7915,8092,7997,
7902,7807,7673,7159,8160,8 133,8106,8052,8079,
7998,7917,7674,8027,7647,8113,7923,7163,8134,
8039,8108,7918,8137,80 56,7676,8029,8114,8087,
7925,7165,7871,8138,8043,7663,8030,6143,8116,
7926,8145,7166,809 1,7929,8140,8045,8103,8146,
8051,7671,8120,7930,8093,7903,8046,8161,8148,
8107,8053,8094, 7999,7932,7675,8162,8135,8054,
8109,7919,8152,8057,7677,8115,8164,8110,8139,
8058,7678,8 031,8117,7927,7167,8168,8141,8060,
8118,8147,8121,7931,8142,8047,8176,8149,8122,
8095,79 33,8163,8150,8055,8124,7934,8153,8165,
8111,8154,8059,7679,8166,8169,8156,8061,8119,817
0,8143,8062,8177,8123,8172,8178,8151,8125,7935,
8180,8126,8155,8167,8184,8157,8171,8158, 8063,
8173,8179,8174,8181,8127,8182,8185,8186,8159,
8188,8175,8183,8187,8189,8190,8191,],
wherein when the mother code length is 4096, the first
sequence is the sequence Q1, and wherein when the
mother code length N is 4096, a quantity K of the K bits
is 452, 536, 904, 1048, 1808, 2072, 2712, or 3096; and
transmit the encoded bits over a wireless network.

10. The apparatus according to claim 9, wherein the
instructions further cause the apparatus to:
perform rate matching on the encoded bits obtained
through polar code encoding to obtain bits after rate
matching.

58

11. The apparatus according to claim 9, wherein the first
sequence is pre-stored.

12. The apparatus according to claim 9, wherein
when the mother code length N is 8192, a quantity K of
the K bits is 235, 470, 940, 1880, 2820, or 3760.

13. A non-transitory machine-readable storage medium
having instructions stored therein, which when executed by
a processor, cause the processor to:
obtain K bits to be encoded;
select K sequence numbers from a first sequence, wherein
the K bits are placed on polar channels corresponding
to the K sequence numbers;
perform polar code encoding on the K bits to obtain
encoded bits, wherein the first sequence comprises
sequence numbers of N polar channels, the first
sequence is one of Q1, Q2, a sub-sequence Q1 or a
sub-sequence Q2, K is a positive integer, N is a mother
code length of polar code, $N=2^n$, n is a positive integer,
and K≤N, wherein the encoded polar code is utilized to
improve performance and to reduce complexity;
transmit a signal comprising the encoded data bits,
wherein sequence Q1=[0,1,2,4,8,16,3,32,5,6,9,64,10,17,
12,18,128,33,20,34,7,24,36,65,11,256,66,40,13,19,68,
14,129,4 8,21,72,130,35,22,25,512,132,37,80,26,38,
257,67,136,41,28,258,96,69,42,15,144,49,260,70,44,7
3,131,50,23,1024,264,74,160,513,133,52,81,27,76,
514,134,39,272,82,137,56,29,516,259,192,97, 138,84,
43,30,145,288,98,261,71,520,140,45,88,146,51,262,
100,1025,46,265,75,2048,161,528,14 8,53,320,1026,
266,104,77,162,515,135,54,273,83,152,57,1028,268,
78,544,164,517,274,193,112, 139,85,58,31,1032,518,
384,289,194,99,276,168,86,521,141,60,89,147,290,
576,263,196,101,522, 142,1040,47,280,90,2049,176,
529,149,292,102,321,1027,524,267,200,105,2050,92,
163,530,150, 55,322,1056,153,296,1029,106,269,79,
640,545,2052,165,532,275,208,113,154,324,59,1030,
270, 108,546,1033,166,519,385,304,195,114,2056,
277,169,87,536,156,61,1088,328,1034,548,386,29
1,224,577,278,197,170,116,523,143,1041,62,281,91,
2064,177,1036,768,578,388,293,198,103,55 2,336,
172,1042,525,282,201,120,2051,93,178,531,151,294,
580,323,1152,1057,526,392,297,202, 1044,107,284,
2080,94,641,560,2053,180,533,209,352,1058,155,325,
298,1031,584,271,204,109, 642,547,2054,1048,167,
534,400,305,210,115,2057,184,326,537,1060,157,300,
1089,110,329,103 5,644,549,387,2112,306,225,592,
2058,279,212,171,117,538,158,1280,63,1090,330,
1064,2065,5 50,416,1037,769,226,579,389,308,199,
648,118,553,2060,337,173,1043,540,283,216,121,
1092,2 066,332,179,1038,770,608,390,295,228,581,
554,338,1153,174,1072,527,393,312,203,1045,122,
2176,285,2081,95,656,561,2068,181,1096,772,582,
448,353,1154,1059,556,394,340,299,232,104 6,585,
286,205,2082,124,643,562,2055,1049,182,535,401,
211,354,2072,1536,185,327,1156,776, 1061,586,396,
301,206,1104,111,672,344,2084,1050,645,564,402,
2113,307,240,593,2059,213,18 6,356,539,1062,159,
1281,302,1091,588,331,1160,1065,646,2304,551,417,
2114,1052,784,227,59 4,404,2088,309,214,649,119,
568,2061,188,1282,541,1120,217,360,1093,1066,
2067,333,418,103 9,771,704,609,391,2116,310,229,
650,596,555,2062,339,1168,175,1073,542,408,313,
218,1284,1 23,1094,2177,2096,334,657,1068,800,
2069,610,420,1097,773,230,583,449,368,1155,652,
1074,5 57,395,2120,341,314,233,1047,600,2178,287,
220,2083,125,658,563,2070,1288,183,1098,774,61
2,450,355,1184,2073,1537,558,424,342,1157,777,234, 1076,587,397,316,207,2560,1105,126,673, 2180,345,
2085,1051,660,565,403,2128,241,1100,832,2074,
1538,452,187,357,1158,778,1063,61 6,398,1296,303,
236,1106,589,674,346,1161,2086,1080,647,2305,566,
432,2115,1053,785,242,21 84,595,405,2089,215,664, 5
358,569,2076,1540,189,1283,1216,780,1121,590,456,
361,1162,1108,1 067,676,2306,348,419,2144,1054,
786,705,624,406,2117,2090,311,244,651,597,570,
2063,1169,1 90,1312,543,409,1122,219,1285,362,
1095,2192,1544,2097,335,1164,896,1069,801,706, 10
2308,61 1,421,2118,1112,788,231,680,598,464,2092,
369,1170,653,1075,572,410,2121,315,248,1286,601,
1124,2179,221,2098,364,659,1070,802,2071,1289,
422,1099,775,708,613,451,3072,370,1185,65 4,2312,
1552,559,425,2122,343,1172,792,235,1077,602,412, 15
2208,317,222,2561,1344,127,688,21 81,2100,1290,
661,1128,804,2129,614,480,1101,833,1186,2075,
1539,453,426,372,1159,779,712, 1078,617,399,2124,
1297,318,237,2562,1107,604,675,2182,347,1176,
2087,1081,662,2320,567,4 33,2130,1292,243,1102, 20
2185,834,2104,1568,454,665,359,1188,808,2077,
1541,618,428,1298,12 17,781,238,1136,591,457,376,
1163,2564,1109,1082,677,2307,2240,349,434,2145,
1055,787,720, 2186,625,407,2132,2091,245,666,836,
571,2078,1542,1408,191,1313,1218,782,1123,620, 25
458,13 00,363,1192,1110,2193,1545,678,2336,350,
1165,897,2146,1084,816,707,2309,626,436,2119,25
68,1113,789,246,681,2188,599,465,2093,1171,668,
1314,573,411,2136,1600,249,1287,1220,840, 1125,
2194,1546,460,2099,365,1166,898,1071,803,736, 30
2310,1304,423,2148,1114,790,709,682,6 28,466,3073,
2094,371,1200,655,2313,1553,574,440,2123,1173,
793,250,1316,603,413,1126,220 9,223,2576,1345,366,
689,2196,1548,2101,1291,1224,900,1129,805,710,
2368,615,481,3074,111 6,848,1187,684,2314,1554, 35
468,427,2152,373,1174,794,713,1079,632,414,2125,
2210,319,252,25 63,1346,605,690,2183,1177,2102,
1320,663,2321,1130,806,2131,1293,482,1103,2200,
835,1664, 2105,1569,455,3076,904,374,1189,809,714,
2316,1556,619,429,2126,1299,1232,796,239,2592,1 40
137,606,472,2212,377,1178,2565,1348,1083,692,
2322,2241,435,2160,1294,721,1132,2187,864, 2133,
2106,1570,484,667,837,1190,810,2079,1543,1409,
430,1328,1219,783,716,1138,621,459,3 080,1301,378,
1193,2566,1111,2432,1560,679,2337,2242,351,1180, 45
912,2147,1085,817,722,2324, 2216,627,437,2134,
2569,1352,247,696,2189,838,2108,1572,1410,669,
1315,1248,812,2137,160 1,622,488,1302,1221,841,
1194,1140,2195,1547,461,2338,380,1167,899,2624,
1086,818,737,231 1,2244,1305,438,2149,2570,1115, 50
791,724,683,2190,629,467,3088,2095,1201,670,2328,
1792,57 5,441,2138,1602,1412,251,1317,1222,842,
1127,2224,1576,462,2577,1360,367,1196,928,2197,1
549,738,2340,1306,1225,901,2150,1144,820,711,
2369,630,496,3075,2572,1117,849,1202,685,2 315, 55
2248,1555,469,442,2153,1175,795,728,1318,633,415,
2140,1604,2211,253,2578,1347,844,6 91,2198,1550,
1416,2103,1321,1226,902,1131,807,740,2370,1308,
483,3104,1118,2201,850,1665, 686,2344,1584,470,
3077,905,2154,375,1204,824,715,2317,1557,634,444, 60
2127,2688,1233,797,2 54,2593,1376,607,473,2213,
1179,2580,1349,1322,693,2323,2256,1608,2161,1295,
1228,960,113 3,2202,865,1666,2372,2107,1571,485,
3078,906,852,1191,811,744,2318,1558,1424,431,
2156,13 29,1234,798,717,2594,1139,636,474,3081, 65
2214,379,1208,2567,1350,2433,1561,694,2352,2243,
1181,913,2162,1324,723,2325,1134,2217,866,2135, 2584,1353,486,697,2204,839,1668,2109,157 3,1411,
3136,908,1330,1249,813,718,2376,1616,623,489,
3082,1303,1236,856,1195,2596,1141,2 434,1562,476,
2339,2272,381,1182,914,2625,1087,819,752,2326,
2245,2218,439,2164,2571,1354, 725,698,2191,868,
3089,2110,1574,1440,671,2329,1793,1250,814,2139,
1603,1413,490,1332,12 23,843,1672,1142,2225,1577,
463,3084,2816,1361,382,1197,929,2626,2436,1564,
739,2341,2246, 1307,1240,916,2151,2600,1145,821,
726,2384,2220,631,497,3090,2573,1356,1203,700,
2330,22 49,1794,443,2168,1632,1414,729,1319,1252,
872,2141,1605,2226,1578,492,2579,1362,845,1198,
930,2199,1551,1417,2342,1336,1227,903,2628,1146,
822,741,2371,3200,1309,498,3105,2574,1 119,2440,
851,1680,687,2345,2250,1585,471,3092,920,2155,
1205,825,730,2332,1796,635,445,2 142,1606,2689,
1472,255,2608,1377,846,2228,1580,1418,2581,1364,
1323,1256,932,2257,1609,7 42,2400,1310,1229,961,
3106,1148,2203,880,1667,2373,2346,1586,500,3079,
907,2632,853,1206, 826,745,2319,2252,1559,1425,
446,2157,2690,1235,799,732,2595,1378,637,475,
3096,2215,120 9,2582,1351,2448,1800,695,2353,
2258,1610,1420,2163,1325,1230,962,1135,2232,867,
1696,237 4,2585,1368,487,3108,936,2205,854,1669,
746,2348,1588,1426,3137,909,2158,1331,1264,828,7
19,2377,1617,638,504,3083,2692,1237,857,1210,
2597,1380,2435,1563,477,2354,2273,1183,915, 2640,
1326,753,2327,2260,1612,2219,2165,2586,1355,964,
699,2206,869,1670,3328,2111,1575, 1441,3138,910,
1808,1251,815,748,2378,1618,1428,491,3112,1333,
1238,858,1673,2598,1143,24 64,1592,478,3085,2817,
2274,383,1212,944,2627,2437,1565,754,2356,2247,
2696,1241,917,2166, 2601,1384,727,2385,2221,870,
3091,2588,1357,1442,701,2331,2264,1795,1728,2169,
1633,1415, 3140,968,1334,1253,873,1674,2380,1620,
2227,1579,493,3086,2818,1363,860,1199,931,2656,2
438,1566,1432,2343,2276,1337,1242,918,2629,2602,
1147,823,756,2386,3201,2222,499,3120,25 75,1358,
2441,1681,702,2360,2251,1824,3093,921,2170,1634,
1444,731,2333,1797,1254,874,214 3,1607,2704,1473,
494,2609,1392,847,1676,2229,1581,1419,3144,2820,
1365,1338,1257,933,263 0,2496,1624,743,2401,3202,
1311,1244,976,3107,2604,1149,2442,881,1682,2388,
2347,2280,158 7,501,3094,922,2633,1207,827,760,
2334,2253,1798,447,2172,1636,2691,1474,733,2610,
1379,8 76,3097,2230,1582,1448,2583,1366,2449,
1801,1258,934,2259,1611,1421,2402,1340,1231,963,3
584,1150,2233,882,1697,2375,3204,2824,1369,502,
3109,937,2634,2444,855,1684,747,2349,225 4,1589,
1427,3152,924,2159,2720,1265,829,734,2392,1856,
639,505,3098,2693,1476,1211,2612, 1381,2450,1802,
2355,2288,1640,1422,2641,1327,1260,992,2261,1613,
2234,1698,2404,2587,13 70,965,3110,938,2207,884,
1671,3329,2350,1590,1456,3139,911,2636,1809,1266,
830,749,2379, 3208,1619,1429,506,3113,2694,1239,
859,1688,2599,1382,2465,1593,479,3100,2832,2275,
1213, 945,2642,2452,1804,755,2357,2262,1614,2697,
1480,2167,2616,1385,966,2236,871,1700,3330,2 589,
1372,1443,3168,940,2265,1810,1729,750,2408,1648,
1430,3141,969,3114,1335,1268,888,16 75,2381,1621,
2466,1594,508,3087,2819,2752,861,1214,946,2657,
2439,1567,1433,2358,2277,26 98,1243,919,2644,
2603,1386,757,2387,3216,2223,3121,2590,1359,2456,
1920,703,2361,2266,18 25,1730,3332,2171,1635,
1445,3142,970,1812,1255,875,1704,2382,1622,2705,
1488,495,3116,28 48,1393,862,1677,2658,2468,1596,
1434,3145,2821,2278,1339,1272,948,2631,2497,1625, 758,24 16,3203,2700,1245,977,3122,2605,1388,2443,
1683,2389,2362,2281,1826,3095,923,2648,1446,7
61,2335,2268,1799,1732,2173,1637,2706,1475,972,
2611,1394,877,1678,3336,2231,1583,1449,3    146,
2822,1367,1816,1259,935,2660,2498,1626,1436,2403, 5
3232,1341,1246,978,3585,2606,1151, 2472,883,1712,
2390,3205,2825,2282,503,3124,952,2635,2445,1685,
762,2364,2255,1828,3153,9 25,2174,1638,2721,1504,
735,2393,1857,878,3099,2708,1477,1450,2613,1396,
2451,1803,1736,2    289,1641,1423,3148,2880,1342, 10
1261,993,3586,2500,1628,2235,1699,2405,3206,2826,
1371,980,  3111,939,2664,2446,885,1686,3344,2351,
2284,1591,1457,3154,926,2637,2722,1267,831,764,23
94,3209,1858,507,3128,2695,1478,1689,2614,1383,
2480,1832,3101,2833,2290,1642,1452,2643,    2453, 15
1805,1262,994,2263,1615,2712,1481,2406,2617,1400,
967,3588,2237,886,1701,3331,3264, 2828,1373,1458,
3169,941,2638,2504,1811,1744,751,2409,3210,1649,
1431,3156,984,3115,2724, 1269,889,1690,2396,1860,
2467,1595,509,3102,2834,2753,1215,947,2672,2454, 20
1806,2359,2292,   1644,2699,1482,2645,2618,1387,
996,3217,2238,1702,3360,2591,1374,2457,1921,3170,
942,226 7,1840,1731,3333,2410,1650,1460,3143,971,
3592,1813,1270,890,1705,2383,3212,1623,2944,14
89,510,3   117,2849,2754,863,1692,2659,2469,1597, 25
1435,3160,2836,2279,2728,1273,949,2646,25
12,1864,759,2417,3218,2701,1484,3123,2620,1389,
2458,1922,2363,2296,1827,1760,3334,2649,    1447,
3172,1000,2269,1814,1733,1706,2412,1652,2707,
1490,973,3118,2850,1395,892,1679,333 7,2470,1598, 30
1464,3147,2823,2756,1817,1274,950,2661,2499,1627,
1437,2418,3233,2702,1247,9    79,3600,2607,1390,
2473,1713,2391,3220,2840,2283,3125,953,2650,2460,
1924,763,2365,2270,1    829,1734,3392,2175,1639,
2736,1505,974,1872,879,1708,3338,2709,1492,1451, 35
3176,2852,1397,   1818,1737,2662,2528,1656,1438,
3149,2881,3234,1343,1276,1008,3587,2501,1629,
2474,1714,2 420,3207,2827,2760,981,3126,954,2665,
2447,1687,3345,2366,2285,1830,3155,927,2652,
2723,1    506,765,2395,3224,1859,3129,2710,1479, 40
1928,2615,1398,2481,1833,1738,3340,2291,1643,145
3,3150,2882,1820,1263,995,3616,2502,1630,2713,
1496,2407,3236,2856,1401,982,3589,2666,24 76,887,
1716,3346,3265,2829,2286,1459,3184,956,2639,2505,
1745,766,2424,3211,1888,3157,98 5,3130,2725,1508, 45
1691,2397,1861,2482,1834,3103,2835,2768,1454,
2673,2455,1807,1740,2293,   1645,2714,1483,2884,
2619,1402,997,3590,3456,2239,1703,3361,3266,2830,
1375,1936,3171,94   3,2668,2506,1841,1746,3348,
2411,3240,1651,1461,3158,986,3593,2726,1271,891, 50
1720,2398,32    13,1862,2945,511,3132,2864,2755,
1693,2674,2484,1836,3161,2837,2294,1646,2729,
1512,2647,   2513,1865,998,3219,2716,1485,3362,
2621,1404,2459,1923,3648,2297,1842,1761,3335,
3268,28    88,1462,3173,1001,3594,2508,1815,1748, 55
1707,2413,3214,1653,2946,1491,988,3119,2851,2784,
893,1694,3352,2471,1599,1465,3162,2838,2757,2730,
1275,951,2676,2514,1866,2419,3248,270    3,1486,
3601,2622,1391,2488,1952,3221,2841,2298,1762,
3364,2651,2461,1925,3174,1002,2271,    1844,1735, 60
3393,2414,1654,2737,1520,975,3596,1873,894,1709,
3339,3272,2948,1493,1466,317    7,2853,2758,1819,
1752,2663,2529,1657,1439,3164,2896,3235,2732,
1277,1009,3602,2516,1868,    2475,1715,2421,3222,
2842,2761,3127,955,2680,2462,1926,2367,2300,1831, 65
1764,3394,2653,27    38,1507,1004,3225,1874,1710,
3368,2711,1494,1929,3178,2854,1399,1848,1739, 3341,2530,165    8,1468,3151,2883,3712,1821,1278,
1010,3617,2503,1631,2952,1497,2422,3237,2857,
2762,983,3    604,2667,2477,1717,3347,3280,2844,
2287,3185,957,2654,2520,1984,767,2425,3226,1889,
3396,   3131,2740,1509,1930,1876,2483,1835,1768,
3342,2769,1455,3180,2912,1822,1741,3618,2532,1
660,2715,1498,2885,3238,2858,1403,1012,3591,3457,
2478,1718,3376,3267,2831,2764,1937,31    86,958,
2669,2507,1747,3349,2426,3241,1890,3159,987,3608,
2727,1510,1721,2399,3228,1863,2    960,3133,2865,
2770,1932,2675,2485,1837,1742,3400,2295,1647,
2744,1513,2886,1880,999,362    0,3458,2717,1500,
3363,3296,2860,1405,1938,3649,2670,2536,1843,
1776,3350,3269,2889,3242,    1463,3188,1016,3595,
2509,1749,1722,2428,3215,1892,2947,989,3134,2866,
2785,1695,3353,24    86,1838,3163,2839,2772,2731,
1514,2677,2515,1867,3249,2718,1487,3840,2623,
1406,2489,195    3,3650,3460,2299,1763,3365,3270,
2890,1940,3175,1003,3624,2510,1845,1750,3408,
2415,3244, 1655,2976,1521,990,3597,2786,895,1724,
3354,3273,2949,1467,3192,2868,2759,1753,2678,254
4,1896,3165,2897,3250,2733,1516,3603,2517,1869,
2490,1954,3223,2843,2776,3366,2681,2463,    1927,
3652,2301,1846,1765,3395,2892,2739,1522,1005,
3598,3464,1875,1711,3369,3274,2950,1    495,1944,
3179,2855,2788,1849,1754,3356,2531,1659,1469,
3166,2898,3713,2734,1279,1011,36    32,2518,1870,
2953,2423,3252,2872,2763,3605,2682,2492,1956,
3281,2845,2302,1766,3424,265    5,2521,1985,1006,
3227,1904,3397,3370,2741,1524,1931,3656,1877,
1850,1769,3343,3276,3008,    1470,3181,2913,3714,
1823,1756,3619,2533,1661,2954,1499,2900,3239,
2859,2792,1013,3606,3    472,2479,1719,3377,3282,
2846,2765,3187,959,2684,2522,1986,2427,3256,1891,
3398,3609,274    2,1511,1960,3229,1878,2961,1770,
3372,2771,1933,3182,2914,1852,1743,3401,2534,
1662,2745,   1528,2887,3716,1881,1014,3621,3459,
2956,1501,3378,3297,2861,2766,1939,3664,2671,
2537,1    777,3351,3284,2904,3243,3189,1017,3610,
2524,1988,1723,2429,3230,1893,2962,3135,2867,28
00,1934,2487,1839,1772,3402,2773,2746,1515,2916,
1882,3622,3488,2719,1502,3841,3298,286    2,1407,
1968,3651,3461,2538,1778,3380,3271,2891,3720,
1941,3190,1018,3625,2511,1751,3409,    2430,3245,
1894,2977,991,3612,2787,1725,3355,3288,2964,3193,
2869,2774,1992,2679,2545,18    97,3404,3251,2748,
1517,3842,1884,2491,1955,3680,3462,2777,3367,
3300,2920,1942,3653,362    6,2540,1847,1780,3410,
2893,3246,2978,1523,1020,3599,3465,1726,3384,
3275,2951,1945,3194,    2870,2789,1755,3357,2546,
1898,3167,2899,3728,2735,1518,3633,2519,1871,
2968,3253,2873,2    778,3844,2683,2493,1957,3654,
3520,2303,1767,3425,2894,2000,1007,3628,3466,
1905,3412,33    71,3304,2980,1525,1946,3657,2790,
1851,1784,3358,3277,3009,1471,3196,2928,3715,
1757,363    4,2548,1900,2955,2901,3254,2874,2793,
3607,3473,2494,1958,3283,2847,2780,3426,2685,
2523,   1987,3257,1906,3399,3848,2743,1526,1961,
3658,3468,1879,1771,3373,3278,3010,1948,3183,2
915,3744,1853,1758,3416,2535,1663,2984,1529,2902,
3717,2794,1015,3636,3474,2957,3379,33    12,2876,
2767,3665,2686,2552,2016,3285,2905,3258,3428,
3611,2525,1989,1962,3231,1908,296    3,3374,2801,
1935,3660,1854,1773,3403,3012,2747,1530,2917,
3718,1883,3623,3489,2958,1503,    3856,3299,2863,
2796,1969,3666,3476,2539,1779,3381,3286,2906,
3721,3191,1019,3640,2526,1    990,2431,3260,1895, 2992,3613,2802,1964,3289,2965,1774,3432,2775,
1993,2918,1912,3405,34 90,2749,1532,3843,3776,
1885,1970,3681,3463,3016,3382,3301,2921,3722,
1943,3668,3627,254 1,1781,3411,2908,3247,2979,
1021,3614,3480,1727,3385,3290,2966,3195,2871,
2804,1994,2547, 1899,3406,3729,2750,1519,3872,
1886,2969,3682,3492,2779,3845,3302,2922,1972,
3655,3521,2 542,1782,3440,2895,3724,2001,1022,
3629,3467,3413,3386,3305,2981,1947,3672,2791,
1785,33 59,3292,3024,3197,2929,3730,1996,3635,
2549,1901,2970,3255,2875,2808,3846,2495,1959,368
4,3522,2781,3427,2924,2002,3630,3496,1907,3414,
3849,3306,2982,1527,1976,3659,3469,1786, 3388,
3279,3011,1949,3198,2930,3745,1759,3417,2550,
1902,2985,2903,3732,2795,3637,3475,2 972,3313,
2877,2782,3904,2687,2553,2017,3524,3259,3429,
3850,2004,1963,3688,3470,1909,33 75,3308,3040,
1950,3661,3746,1855,1788,3418,3013,2986,1531,
2932,3719,3638,3504,2959,385 7,3314,2878,2797,
3667,3477,2554,2018,3287,2907,3736,3430,3641,
2527,1991,3261,1910,2993, 3852,2803,1965,3662,
3528,1775,3433,3014,2008,2919,3748,1913,3420,
3491,2988,1533,3858,3 777,2798,1971,3696,3478,
3017,3383,3316,2936,3723,3669,3642,2556,2020,
2909,3262,2994,36 15,3481,1966,3291,2967,3434,
2805,1995,1914,3407,3968,2751,1534,3873,3778,
1887,3683,349 3,3018,3860,3303,2923,3752,1973,
3670,3536,2543,1783,3441,2910,3725,1023,3644,
3482,3387, 3320,2996,3673,2806,2024,3293,3025,
3436,3731,1997,3874,1916,2971,3494,2809,3847,
3780,1 974,3685,3523,3020,3442,2925,3726,2003,
3631,3497,3415,3864,3307,2983,1977,3674,3484,17
87,3389,3294,3026,3199,2931,3760,1998,2551,1903,
3000,3733,2810,3876,2973,3686,3552,278 3,3905,
2926,2032,3525,3498,3444,3851,3784,2005,1978,
3689,3471,3390,3309,3041,1951,3676, 3747,1789,
3419,3028,2987,2933,3734,3639,3505,2974,3315,
2879,2812,3906,2555,2019,3526,3 737,3431,3880,
2006,3690,3500,1911,3853,3310,3042,1980,3663,
3529,1790,3448,3015,2009,29 34,3749,3421,3506,
2989,3859,3792,2799,3697,3479,3032,3317,2937,
3738,3908,3643,2557,202 1,3263,2995,3854,1967,
3692,3530,3435,3044,2010,3750,1915,3422,3969,
2990,1535,3888,3779, 3698,3508,3019,3861,3318,
2938,3753,3671,3537,2558,2022,2911,3740,3645,
3483,3321,2997,3 912,2807,2025,3532,3437,3970,
2012,3875,3808,1917,3495,3048,3862,3781,3754,
1975,3700,35 38,3021,3443,2940,3727,3646,3512,
3865,3322,2998,3675,3485,2026,3295,3027,3438,
3761,199 9,1918,3001,3972,2811,3877,3782,3687,
3553,3022,3920,2927,3756,2033,3540,3499,3445,
3866, 3785,1979,3704,3486,3391,3324,3056,3677,
3762,2028,3029,3002,3735,3878,2975,3554,2813,3
907,2034,3527,3976,3446,3881,3786,2007,3691,3501,
3868,3311,3043,1981,3678,3544,1791,34 49,3030,
2935,3764,3507,3004,3793,2814,3936,3033,3556,
3739,3909,3882,2036,3502,3855,378 8,1982,3693,
3531,3450,3045,2011,3751,3423,3984,2991,3889,
3794,3699,3509,3034,3319,2939, 3768,3910,2559,
2023,3741,3884,3694,3560,3913,3046,2040,3533,
3452,3971,2013,3890,3809,3 510,3049,3863,3796,
3755,3701,3539,3036,2941,3742,3647,3513,3323,
2999,3914,2027,3534,34 39,4000,2014,3810,1919,
3973,3050,3892,3783,3702,3568,3023,3921,2942,
3757,3541,3514,386 7,3800,3705,3487,3325,3057,
3916,3763,2029,3003,3974,3879,3812,3555,3052,
3922,3758,2035, 3542,3977,3447,3896,3787,3706, 3516,3869,3326,3058,3679,3545,2030,3031,3765,
3005,4032,2 815,3937,3557,3978,3924,3883,3816,
2037,3503,3870,3789,1983,3708,3546,3451,3060,
3766,39 85,3006,3795,3938,3035,3558,3769,3911,
2038,3980,3885,3790,3695,3561,3928,3047,2041,354
8,3453,3986,3891,3824,3511,3064,3797,3770,3940,
3037,3743,3886,3562,3915,2042,3535,3454, 4001,
2015,3811,3988,3051,3893,3798,3703,3569,3038,
2943,3772,3515,3801,3944,3564,3917,4 002,2044,
3975,3894,3813,3570,3053,3923,3759,3543,3992,
3897,3802,3707,3517,3327,3059,39 18,2031,4004,
3814,4033,3054,3952,3572,3979,3925,3898,3817,
3518,3871,3804,3709,3547,306 1,3767,3007,4034,
3939,3559,4008,3926,3818,2039,3981,3900,3791,
3710,3576,3929,3062,3549, 3987,3825,3065,4036,
3771,3941,3982,3887,3820,3563,3930,2043,3550,
3455,4016,3826,3989,3 066,3799,3942,3039,3773,
4040,3945,3565,3932,4003,2045,3990,3895,3828,
3571,3068,3774,39 93,3803,3946,3566,3919,2046,
4005,3815,4048,3055,3953,3573,3994,3899,3832,
3519,3805,394 8,4006,4035,3954,3574,4009,3927,
3819,3996,3901,3806,3711,3577,3063,4064,4037,
4010,3956, 3983,3902,3821,3578,3931,3551,4017,
3827,3067,4038,3943,4012,3822,4041,3960,3580,
3933,4 018,3991,3829,3069,3775,4042,3947,3567,
3934,2047,4020,3830,4049,3070,3995,3833,4044,39
49,4007,4050,3955,3575,4024,3834,3997,3807,3950,
4065,4052,4011,3957,3998,3903,3836,357 9,4066,
4039,3958,4013,3823,4056,3961,3581,4019,4068,
4014,4043,3962,3582,3935,4021,3831, 3071,4072,
4045,3964,4022,4051,4025,3835,4046,3951,4080,
4053,4026,3999,3837,4067,4054,3 959,4028,3838,
4057,4069,4015,4058,3963,3583,4070,4073,4060,
3965,4023,4074,4047,3966,40 81,4027,4076,4082,
4055,4029,3839,4084,4030,4059,4071,4088,4061,
4075,4062,3967,4077,408 3,4078,4085,4031,4086,
4089,4090,4063,4092,4079,4087,4091,4093,4094,
4095,], wherein sequence Q2=[6309,5445,6419,5391,6298,6203,
5667,5287,6414,5654,6252,5425,5330,5235,6310,
6663,5446, 5657,6339,5277,3623,6258,5420,4819,
6421,5230,6313,6231,5449,3381,3721,6300,4935,
6205,5 669,5507,5004,5426,5345,4909,4814,3613,
3289,5399,5332,5291,6692,5237,5658,6435,5278,34
05,5010,5183,4915,6422,6341,6314,3681,6260,3463,
6667,5450,4821,3382,3301,4794,3722,628 7,4964,
3668,3627,6206,5670,3411,4767,6425,3247,2979,
5346,4910,3614,6235,3480,5699,5509, 4586,3385,
3290,5428,2966,5319,4939,5768,3195,5238,6321,
5673,4559,7180,5457,4478,5293,3 406,5025,6722,
3729,6532,5660,4835,6437,6342,5403,2969,5336,
5012,3682,6247,3492,6696,52 41,2779,4917,4822,
3845,6480,3302,2922,6316,4727,4593,3655,7186,
3521,6669,5452,5299,344 0,4796,2895,6426,3724,
6345,4539,3629,6264,3467,5728,5510,3413,4825,
3386,3305,5415,2981, 5348,4968,1947,3672,6237,
5701,2791,6322,5674,4588,3359,3292,6675,5458,
4941,5294,3197,5 026,2929,3730,6295,5647,5513,
3635,6438,2549,1901,5432,2970,5323,4999,6724,
3255,2875,52 42,4918,4837,3846,6467,5405,2495,
1959,4594,3684,7201,3522,6670,5215,2781,6536,
4947,577 6,3427,4783,2924,6441,6346,5681,2002,
4567,7188,5016,3630,6251,3496,1907,5301,3414,
4921, 4826,3849,6428,3306,5892,2982,1527,4731,
1976,4541,3659,6238,3469,5702,6785,5568,1786,4
351,3388,3279,6704,5473,3011,4942,1949,3198,2930,
3745,6324,5676,1759,5514,3417,6677,54 60,2550, 1902,5419,2985,5352,5028,2903,3732,6353,5705,
2795,4838,3637,6496,3475,5406,297    2,5325,5057,
7202,3313,2877,5244,2782,6299,4976,5763,6469,
2687,6442,2553,5682,2017,4596,    7175,3524,5003,
6728,3259,4949,5302,3429,4922,4841,3850,6415,
6348,5655,2004,5521,1963,4    542,3688,6253,3470,
1909,6786,5331,4895,4828,3375,3308,6691,5474,
3040,4733,1950,4571,36    61,7192,3746,6311,1855,
1788,5305,3418,6678,5447,3013,6544,5896,2986,
1531,4791,2932,644    9,3719,6354,5706,5516,3638,
6259,3504,5421,2959,5326,5058,3857,3314,2878,
5231,2797,6328,    4963,5792,3667,6470,3477,6681,
5464,2554,2018,4583,7204,3287,5032,2907,3736,
6301,4950,5    765,3430,4842,3641,6444,2527,5684,
1991,5522,7233,5005,6254,3261,1910,5427,2993,
5360,49    24,4815,3852,6473,5713,2803,4734,1965,
4600,3662,7179,3528,6788,5333,4953,1775,5306,343
3,6693,5476,3014,6531,5659,2008,4573,2919,6450,
3748,6369,1913,5279,3420,5011,6736,3491,    5422,
2988,1533,4849,3858,6423,3777,6356,5708,2798,
6315,1971,3696,6261,3478,6682,5451,3    017,5060,
3383,3316,4795,2936,3723,6302,4965,5766,3669,
3642,6207,2556,5671,2020,5537,72    34,5006,2909,
3262,5904,2994,5347,4911,4844,3615,6474,3481,
5714,5524,1966,4587,7208,329    1,5429,2967,5334,
4954,5769,3434,6694,5239,2805,6560,5688,1995,
4574,7181,6913,6370,1914,    4479,5308,3407,5040,
6723,3968,6533,5661,2751,1534,4850,3873,6452,
3778,6343,1887,6792,5    337,5013,3683,6262,3493,
6697,5480,3018,4823,3860,6481,3303,2923,3752,
6317,4966,1973,36    70,7187,3536,6684,5453,2543,
1783,5538,3441,4797,2910,6427,3725,6360,5891,
5824,1023,364    4,6265,3482,5729,5511,7236,5064,
3387,3320,5430,2996,5349,4969,5770,3673,6476,
5716,2806,    6323,5675,2024,4589,7182,3293,6914,
5459,3025,4956,5295,3436,5027,6752,3731,6534,
5662,1    997,5528,3874,6439,6372,1916,5433,2971,
5338,5014,6725,3494,6698,5243,2809,4919,4852,38
47,6482,3780,7297,6318,1974,4595,3685,7216,3523,
6671,5454,3020,6537,5777,3442,4798,292    5,6456,
3726,6347,5920,2003,7189,5017,3631,6266,3497,
5730,5540,3415,4827,3864,6429,3307,    5893,2983,
5350,4970,1977,3674,6239,3484,5703,6800,5569,
1787,4590,3389,3294,6705,5488,3    026,4943,5772,
3199,2931,3760,6325,5677,1998,5515,7240,6916,
5461,2551,1903,5434,3000,53    53,5029,6726,3733,
6592,5720,2810,4839,3876,6497,7298,5407,2973,
5340,5072,3686,7203,355    2,6700,5245,2783,6538,
4977,5778,3905,6484,2926,6443,6376,5683,2032,
4597,7190,3525,5018,    6729,3498,5303,3444,4923,
4856,3851,6430,3784,6349,5894,2005,1978,4543,
3689,6268,3471,5    732,6787,5570,4829,3390,3309,
6706,5475,3041,4972,1951,3676,7193,3747,6326,
5678,1789,55    44,3419,6679,5462,3028,6545,5897,
2987,5354,5030,2933,3734,6355,5707,5517,3639,
6498,350    5,5436,2974,5327,5059,3315,2879,5246,
2812,6329,4978,5793,3906,6471,7300,6920,5465,
2555,    2019,4598,7205,3526,5033,6730,3737,6540,
4951,5780,3431,4843,3880,6350,5685,2006,5523,7
248,5020,3690,6255,3500,1911,6816,5361,4925,4830,
3853,6488,3310,5952,3042,4735,1980,46    01,3663,
7194,3529,6789,5572,1790,5307,3448,6708,5477,
3015,6546,5898,2009,2934,3749,638    4,5736,5518,
3421,3506,5423,2989,5356,5088,3859,3792,2799,
5794,3697,6500,3479,5466,3032,    5061,3317,5034,
2937,3738,4980,3908,7425,3643,2557,2021,5552,
5007,3263,5905,2995,5362,4    926,4845,3854,7304, 1967,4602,3692,3530,5335,4955,5784,3435,3044,
2010,4575,6928,3750,19    15,5309,3422,5041,3969,
5900,2990,1535,4851,3888,3779,5576,3698,3508,
3019,5062,3318,293    8,4967,7426,3537,2558,2022,
7264,5036,2911,3740,4846,3645,3483,5744,3321,
2997,4984,3912,    2807,2025,4604,3532,6848,3437,
3970,2012,3808,1917,3048,7312,1975,3021,6016,
2940,7428,3    512,2998,2026,6944,1918,3972,3920,
3056,7681,6445,6451,6737,6357,5709,6330,6683,
7206,63    03,5767,6446,5686,7235,6732,6475,5715,
5525,7209,6790,6695,5478,6561,5689,7196,6371,673
8,6548,6453,6358,5710,6793,6263,6712,5481,3861,
3753,6332,5796,3671,6685,5468,5539,6361,    5906,
5825,6504,5526,7237,5065,7210,5431,5364,5771,
6477,5717,6562,5690,7183,6915,4957,5    310,5042,
6753,6535,5663,5529,3875,6454,6373,6794,5339,
5015,6740,3495,6699,5482,4853,38    62,6483,3781,
3754,6319,3700,7217,3538,6686,5455,6552,3443,
4799,6457,3727,6362,5921,582    6,3646,6267,5731,
5541,7238,5066,3865,3322,5908,5351,4971,5800,
3675,6478,3485,5718,6801,    5584,4591,7212,3295,
5489,3027,4958,5773,3438,6754,3761,6564,5692,
1999,5530,7241,6917,6    374,5435,3001,5368,5044,
6727,6593,5721,2811,4854,3877,6512,3782,7299,
6796,5341,5073,36    87,7218,3553,6701,5484,3022,
6539,5779,6485,2927,6458,3756,6377,5922,2033,
7191,3540,501    9,6744,3499,5542,3445,4857,3866,
6431,3785,6364,5895,5828,1979,3704,6269,3486,
5733,6802,    5571,5068,3391,3324,6707,5490,4973,
5774,3677,7432,3762,6327,5679,2028,5545,7242,
6918,5    463,3029,5912,3002,5355,5031,6756,3735,
6594,5722,5532,3878,6499,7328,5437,2975,5342,50
74,3554,6702,5247,2813,6568,4979,5808,3907,6486,
7301,6921,6378,2034,4599,7220,3527,504    8,6731,
3976,6541,5781,3446,4858,3881,6460,3786,6351,
5924,2007,7249,5021,3691,6270,3501,    5734,6817,
5600,4831,3868,6489,3311,5953,3043,4974,1981,
3678,7195,3544,6804,5573,1791,5    546,3449,6709,
5492,3030,6547,5899,5832,2935,3764,6385,5737,
5519,7244,6976,3507,5438,30    04,5357,5089,7682,
3793,6596,5724,2814,6331,5795,3936,6501,7302,
6922,5467,3033,5076,720    7,3556,5035,6760,3739,
6542,4981,5782,3909,7440,3882,6447,6380,5687,
2036,5553,7250,5022,    6733,3502,6818,5363,4927,
4860,3855,6490,3788,7305,5954,1982,4603,3693,
7224,3531,6791,5    574,5785,3450,6710,5479,3045,
6576,5928,2011,7197,6929,3751,6386,5738,5548,
3423,6739,39    84,6549,5901,2991,5358,5090,3889,
3794,6359,5711,6808,5577,3699,6502,3509,6713,
5496,303    4,5063,7684,3319,2939,3768,6333,4982,
5797,3910,7427,7360,6924,5469,2559,2023,5554,
7265,    5037,6734,3741,6600,5907,5840,4847,3884,
6505,7306,5745,5527,7252,5080,3694,7211,3560,6
820,5365,4985,5786,3913,6492,5956,3046,6563,5691,
2040,4605,7198,3533,6930,6849,5311,34    52,5043,
6768,3971,6550,5902,2013,3890,6455,3809,6388,
5740,6795,5578,6741,3510,6714,548    3,3049,5092,
3863,3796,7313,3755,6334,5798,3701,7456,3539,
6687,5470,3036,6553,6017,7266,    5038,2941,3742,
6363,5936,5827,7429,3647,6506,3513,5746,5556,
7239,5067,7688,3323,5909,2    999,5366,4986,5801,
3914,6479,7308,5719,7040,5585,2027,4606,7213,
3534,6945,6850,4959,57    88,3439,6755,4000,6565,
5693,2014,5531,7256,6932,3810,6375,1919,6824,
5369,5045,6742,397    3,6608,5960,3050,4855,3892,
6513,3783,7314,6797,5580,3702,7219,3568,6716,
5485,3023,6554,    6018,3921,2942,6459,3757,6392, 5923,5856,7430,3541,6745,3514,5543,7268,5096,
3867,3800,6 365,5910,5829,5802,3705,6508,3487,
5748,6803,5586,5069,7214,3325,6946,5491,3057,
4988,57 75,3916,7433,3763,6566,5694,2029,5560,
7243,6919,6852,5913,3003,5370,5046,6757,3974,659
5,5723,5533,3879,6514,3812,7329,6798,5343,5075,
7696,3555,6703,5486,3052,6569,5809,3922, 6487,
7316,6936,3758,6379,2035,7221,3542,5049,6746,
3977,6556,6020,3447,4859,3896,6461,3 787,6366,
5925,5830,7488,3706,6271,3516,5735,6832,5601,
5070,3869,3326,5968,3058,4975,58 04,3679,7434,
3545,6805,5588,2030,5547,7272,6948,5493,3031,
5914,5833,6758,3765,6624,575 2,5534,7245,6977,
7330,5439,3005,5372,5104,7683,4032,6597,5725,
2815,6570,5810,3937,6516, 7303,6923,6856,5077,
7222,3557,5050,6761,3978,6543,5783,3924,7441,
3883,6462,3816,6381,5 926,2037,7251,5023,6748,
3503,6819,5602,4861,3870,6491,3789,7320,5955,
1983,3708,7225,35 46,6806,5575,6024,3451,6711,
5494,3060,6577,5929,5834,7436,3766,6387,5739,
5549,7246,697 8,3985,5916,3006,5359,5091,7712,
3795,6598,5726,6809,5592,3938,6503,7332,6952,
5497,3035, 5078,7685,3558,6762,3769,6572,4983,
5812,3911,7442,7361,6925,6382,2038,5555,7280,
5052,6 735,3980,6601,5841,4862,3885,6520,3790,
7307,5984,7253,5081,3695,7226,3561,6821,5604,57
87,3928,6493,5957,3047,6578,5930,2041,7199,3548,
6931,6864,5550,3453,6769,3986,6551,590 3,5836,
3891,3824,6389,5741,6810,5579,6980,3511,6715,
5498,3064,5093,7686,3797,7552,3770, 6335,5799,
3940,7457,7362,6926,5471,3037,6032,7267,5039,
6764,3743,6602,5937,5842,7444,3 886,6507,7336,
5747,5557,7254,5082,7689,3562,6822,5367,4987,
5816,3915,6494,7309,5958,70 41,2042,4607,7228,
3535,6960,6851,5789,3454,6770,4001,6580,5932,
2015,7257,6933,3811,639 0,5742,6825,5608,6743,
3988,6609,5961,3051,5094,3893,3798,7315,6812,
5581,3703,7458,3569, 6717,5500,3038,6555,6019,
7744,2943,3772,6393,5938,5857,7431,7364,6984,
3515,5558,7269,5 097,7690,3801,6604,5911,5844,
5803,3944,6509,7310,5749,7042,5587,5084,7215,
3564,6947,68 80,4989,5790,3917,7448,4002,6567,
5695,2044,5561,7258,6934,6853,6826,5371,5047,
6772,397 5,6610,5962,3894,6515,3813,7344,6799,
5582,7697,3570,6718,5487,3053,6584,6048,3923,
7317, 6937,3759,6394,5858,7460,3543,6747,3992,
6557,6021,7270,5098,3897,3802,6367,5940,5831,7
489,3707,6510,3517,5750,6833,5616,5071,7692,3327,
5969,3059,4990,5805,3918,7435,7368,70 44,5589,
2031,5562,7273,6949,6854,5915,5848,6759,4004,
6625,5753,5535,7260,6992,3814,733 1,6828,5373,
5105,7698,4033,6612,5964,3054,6571,5811,3952,
6517,7318,6938,6857,7223,3572, 5051,6776,3979,
6558,6022,3925,3898,6463,3817,6396,5927,5860,
7490,6749,3518,6834,5603,5 100,3871,3804,7321,
5970,5806,3709,7464,3547,6807,5590,6025,7274,
6950,5495,3061,5944,58 35,7437,3767,6626,5754,
5564,7247,6979,7808,5917,3007,5374,5106,7713,
4034,6599,5727,704 8,5593,3939,6518,7333,6953,
6858,5079,7700,3559,6763,4008,6573,5813,3926,
7443,7376,6940, 3818,6383,2039,7281,5053,6750,
3981,6616,6080,4863,3900,6521,3791,7322,5985,
7492,3710,7 227,3576,6836,5605,6026,3929,5972,
3062,6579,5931,5864,7438,3549,6865,5551,7276,
7008,39 87,5918,5837,7714,3825,6628,5756,6811,
5594,6981,7334,6954,5499,3065,5108,7687,4036,755
3,3771,6574,5814,3941,7472,7363,6927,6860,6033, 7282,5054,6765,3982,6603,5843,7445,3887, 6522,
3820,7337,5986,7255,5083,7704,3563,6823,5606,
5817,3930,6495,7324,5959,7056,2043,7 229,3550,
6961,6866,6028,3455,6771,4016,6581,5933,5838,
7496,3826,6391,5743,6840,5609,69 82,3989,5976,
3066,5095,7716,3799,7554,6813,5596,3942,7459,
7392,6956,5501,3039,6034,774 5,6766,3773,6632,
5939,5872,7446,7365,6985,7338,5559,7284,5112,
7691,4040,6605,5845,5818, 3945,6524,7311,5988,
7043,5085,7230,3565,6962,6881,5791,3932,7449,
4003,6582,5934,2045,7 259,6935,6868,6827,5610,
6773,3990,6611,5963,3895,3828,7345,6814,5583,
7936,3571,6719,55 02,3068,6585,6049,7746,7556,
3774,6395,5859,7461,7366,6986,3993,6036,7271,
5099,7720,380 3,6606,5941,5846,7504,3946,6511,
7340,5751,7072,5617,5086,7693,3566,6882,4991,
5820,3919, 7450,7369,7045,2046,5563,7288,6964,
6855,5849,6774,4005,6640,5992,7261,6993,3815,
7346,6 829,5612,7699,4048,6613,5965,3055,6586,
6050,3953,7319,6939,6872,7462,3573,6777,3994,65
59,6023,7748,3899,3832,6397,5942,5861,7491,6988,
3519,6835,5618,5101,7694,3805,7560,597 1,5807,
3948,7465,7370,7046,5591,6040,7275,6951,6884,
5945,5850,7452,4006,6627,5755,5565, 7262,6994,
7809,6830,5375,5107,7728,4035,6614,5966,7049,
3954,6519,7348,6968,6859,7701,3 574,6778,4009,
6588,6052,3927,7377,6941,3819,6398,5862,7520,
6751,3996,6617,6081,5102,39 01,3806,7323,6000,
7493,3711,7466,3577,6837,5620,6027,7752,5973,
3063,5946,5865,7439,737 2,7104,5566,7277,7009,
7810,5919,5852,7715,4064,6629,5757,7050,5595,
6996,7335,6955,6888, 5109,7702,4037,7568,4010,
6575,5815,3956,7473,7378,6942,6861,7283,5055,
6780,3983,6618,6 082,3902,6523,3821,7352,5987,
7494,7705,3578,6838,5607,6056,3931,7325,5974,
7057,5866,74 68,3551,6867,6029,7278,7010,4017,
5948,5839,7497,3827,6630,5758,6841,5624,6983,
7812,597 3,3067,5110,7717,4038,7555,7052,5597,
3943,7474,7393,6957,6862,6035,7760,6767,4012,
6633, 5873,7447,7380,7000,3822,7339,7285,5113,
7706,4041,6620,6084,5819,3960,6525,7326,5989,7
058,7231,3580,6963,6896,6030,3933,4018,6583,5935,
5868,7498,6869,6842,5611,7012,3991,59 78,7718,
3829,7584,6815,5598,7937,7394,6958,5503,3069,
6064,7747,7557,3775,6634,5874,747 6,7367,6987,
7816,6037,7286,5114,7721,4042,6607,5847,7505,
3947,6526,7341,5990,7073,5087, 7708,3567,6883,
5821,3934,7451,7384,7060,2047,7289,6965,6870,
6088,6775,4020,6641,5993,7 500,3830,7347,6844,
5613,7938,4049,5980,3070,6587,6051,7776,7558,
6873,7463,7396,7016,39 95,6038,7749,7722,3833,
6636,5943,5876,7506,6989,7342,7074,5619,5116,
7695,4044,7561,582 2,3949,7480,7371,7047,6041,
7290,6966,6885,5851,7453,4007,6642,5994,7263,
6995,7824,6831, 5614,7729,4050,6615,5967,7064,
3955,7349,6969,6874,7940,3575,6779,4024,6589,
6053,7750,7 616,3834,6399,5863,7521,6990,3997,
6096,5103,7724,3807,7562,6001,7508,3950,7467,
7400,70 76,5621,6042,7753,6886,5947,5880,7454,
7373,7105,5567,7292,7024,7811,5853,7730,4065,664
4,5996,7051,6997,7350,6970,6889,7703,4052,7569,
4011,6590,6054,3957,7379,6943,6876,7522, 6781,
3998,6619,6083,3903,3836,7353,6002,7495,7944,
3579,6839,5622,6057,7754,7564,5975,5 867,7469,
7374,7106,6044,7279,7011,7840,5949,5854,7512,
4066,6631,5759,7080,5625,6998,78 13,6890,5111,
7732,4039,7570,7053,3958,7475,7408,6972,6863, 7761,6782,4013,6648,6112,738 1,7001,3823,7354,
7524,7707,4056,6621,6085,6058,3961,7327,6004,
7059,7470,3581,6897,6031, 7756,4019,5950,5869,
7499,7108,6843,5626,7013,7814,5979,7719,4068,
7585,7054,5599,7952,7 395,6959,6892,6065,7762,
7572,4014,6635,5875,7477,7382,7002,7817,7287,
5115,7736,4043,66 22,6086,3962,6527,7356,5991,
7088,7709,3582,6898,6060,3935,7385,7061,5870,
7528,6871,608 9,7014,4021,6008,7501,3831,7586,
6845,5628,7939,7872,5981,3071,6066,7777,7559,
7112,7478, 7397,7017,7818,6039,7764,7723,4072,
6637,5877,7507,7004,7343,7075,5117,7710,4045,
7576,5 823,3964,7481,7386,7062,7291,6967,6900,
6090,4022,6643,5995,7502,7825,6846,5615,7968,40
51,5982,7065,7778,7588,6875,7941,7398,7018,4025,
6068,7751,7617,3835,6638,5878,7536,699 1,7820,
6097,5118,7725,4046,7563,7509,3951,7482,7401,
7077,6043,7768,6887,5881,7455,7388, 7120,7293,
7025,7826,6092,7731,4080,6645,5997,7066,7351,
6971,6904,7942,4053,4026,6591,6 055,7780,7618,
6877,7523,7020,3999,6098,7726,3837,7592,6003,
7510,7945,7402,7078,5623,60 72,7755,7565,5882,
7484,7375,7107,6045,7294,7026,7841,5855,7513,
4067,6646,5998,7081,699 9,7828,6891,7733,4054,
7571,7068,3959,7409,6973,6878,8000,6783,4028,
6649,6113,7620,3838, 7355,7525,7946,4057,6100,
6059,7784,7566,6005,7471,7404,7136,6046,7757,
7842,5951,5884,7 514,7109,7082,5627,7028,7815,
7734,4069,7600,7055,7953,7410,6974,6893,7763,
7573,4015,66 50,6114,7383,7003,7832,7526,7737,
4058,6623,6087,3963,7357,6006,7089,7948,3583,
6899,606 1,7758,7624,5871,7529,7110,6104,7015,
7844,6009,7516,4070,7587,7084,5629,7954,7873,
6894, 6067,7792,7574,7113,7479,7412,7032,7819,
7765,7738,4073,6652,6116,7005,7358,7090,7711,4
060,7577,6062,3965,7387,7063,7530,6901,6091,4023,
6010,7503,8064,6847,5630,7969,7874,59 83,7779,
7589,7114,7956,7399,7019,7848,6069,7766,7632,
4074,6639,5879,7537,7006,7821,511 9,7740,4047,
7578,3966,7483,7416,7092,7769,6902,6120,7389,
7121,7532,7827,6093,7970,4081, 6012,7067,7590,
6905,7943,7876,4027,6070,7781,7619,7116,7538,
7021,7822,6099,7727,4076,7 593,7511,7960,7403,
7079,6073,7770,7580,5883,7485,7390,7122,7295,
7027,7856,6094,4082,66 47,5999,7096,7829,6906,
7972,4055,7069,7782,7648,6879,8001,7022,4029,
6128,7621,3839,759 4,7540,7947,7880,6101,6074,
7785,7567,7486,7405,7137,6047,7772,7843,5885,
7515,7124,7083, 7029,7830,7735,4084,7601,7070,
7411,6975,6908,8002,4030,6651,6115,7622,7833,
7527,7976,4 059,6102,7786,7596,6007,7949,7406,
7138,6076,7759,7625,5886,7544,7111,6105,7030,
7845,75 17,4071,7602,7085,7955,7888,6895,7793,
7575,7128,7413,7033,7834,8004,7739,4088,6653,611
7,7359,7091,7950,4061,6063,7788,7626,7531,7140,
6106,7846,6011,7518,8065,7086,5631,7984, 7875,
7794,7604,7115,7957,7414,7034,7849,7767,7633,
4075,6654,6118,7007,7836,7741,4062,7 579,3967,
7417,7093,8008,6903,6121,7628,7533,8066,6108,
7971,7904,6013,7591,7144,7958,78 77,7850,6071,
7796,7634,7117,7539,7036,7823,7742,4077,7608,
7961,7418,7094,7771,7581,612 2,7391,7123,7534,
7857,6095,4083,6014,7097,8068,6907,7973,7878,
7783,7649,7118,8016,7023, 7852,6129,7636,4078,
7595,7541,7962,7881,6075,7800,7582,7487,7420,
7152,7773,7858,6124,7 125,7098,7831,7974,4085,
7071,7650,6909,8003,4031,6130,7623,8072,7542, 7977,7882,6103,77 87,7597,7964,7407,7139,6077,
7774,7640,5887,7545,7126,7031,7860,4086,7603,
7100,7889,691 0,8032,7129,7652,7835,8005,7978,
4089,6132,7598,7951,7884,6078,7789,7627,7546,
7141,6107, 7847,7519,8080,7087,7985,7890,7795,
7605,7130,7415,7035,7864,8006,4090,6655,6119,
7837,7 980,4063,7790,7656,8009,7142,6136,7629,
7548,8067,6109,7986,7905,7606,7145,7959,7892,78
51,7797,7635,7132,7037,7838,7743,4092,7609,7419,
7095,8010,6123,7630,7535,8096,6110,790 6,6015,
8069,7146,7988,7879,7798,7664,7119,8017,7038,
7853,7637,4079,7610,7963,7896,7801, 7583,7421,
7153,8012,7859,6125,7099,8070,7975,7908,7651,
7148,8018,7854,6131,7638,8073,7 543,7992,7883,
7802,7612,7965,7422,7154,7775,7641,6126,7127,
7861,4087,7101,8128,6911,80 33,7653,8074,8020,
7979,7912,6133,7599,7966,7885,6079,7804,7642,
7547,7156,7862,8081,710 2,7891,8034,7131,7654,
7865,8007,4091,6134,8076,7981,7886,7791,7657,
8024,7143,6137,7644, 7549,8082,7987,7920,7607,
7160,7893,7866,8036,7133,7839,7982,4093,7658,
8011,6138,7631,7 550,8097,6111,7907,8084,7147,
7989,7894,7799,7665,7134,7039,7868,4094,7611,
7897,8040,76 60,8013,8098,6140,8071,7990,7909,
7666,7149,8019,7855,7639,8088,7993,7898,7803,
7613,742 3,7155,8014,6127,8100,7910,8129,7150,
8048,7668,8075,8021,7994,7913,7614,7967,7900,
7805, 7643,7157,7863,7103,8130,8035,7655,8104,
8022,7914,6135,8077,7996,7887,7806,7672,8025,7
158,7645,8083,7921,7161,8132,7867,8037,8078,7983,
7916,7659,8026,6139,7646,7551,8112,79 22,8085,
7162,7895,8038,7135,7869,4095,8136,8041,7661,
8028,8099,6141,8086,7991,7924,766 7,7164,7870,
8089,7899,8042,7662,8015,6142,8101,7911,8144,
7151,8049,7669,8090,7995,7928, 7615,7901,8044,
8102,8131,8050,7670,8105,8023,7915,8092,7997,
7902,7807,7673,7159,8160,8 133,8106,8052,8079,
7998,7917,7674,8027,7647,8113,7923,7163,8134,
8039,8108,7918,8137,80 56,7676,8029,8114,8087,
7925,7165,7871,8138,8043,7663,8030,6143,8116,
7926,8145,7166,809 1,7929,8140,8045,8103,8146,
8051,7671,8120,7930,8093,7903,8046,8161,8148,
8107,8053,8094, 7999,7932,7675,8162,8135,8054,
8109,7919,8152,8057,7677,8115,8164,8110,8139,
8058,7678,8 031,8117,7927,7167,8168,8141,8060,
8118,8147,8121,7931,8142,8047,8176,8149,8122,
8095,79 33,8163,8150,8055,8124,7934,8153,8165,
8111,8154,8059,7679,8166,8169,8156,8061,8119,817
0,8143,8062,8177,8123,8172,8178,8151,8125,7935,
8180,8126,8155,8167,8184,8157,8171,8158, 8063,
8173,8179,8174,8181,8127,8182,8185,8186,8159,
8188,8175,8183,8187,8189,8190,8191,],
wherein when the mother code length is 4096, the first
sequence is the sequence Q1, and wherein when the
mother code length N is 4096, a quantity K of the K bits
is 452, 536, 904, 1048, 1808, 2072, 2712, or 3096; and
transmit the encoded bits over a wireless network.

14. The non-transitory machine-readable storage medium
according to claim 13, wherein the instructions further cause
the processor to:
perform rate matching on the encoded bits obtained
through polar code encoding to obtain bits after rate
matching.

15. The non-transitory machine-readable storage medium
according to claim 13, wherein the first sequence is pre-
stored.

16. The non-transitory machine-readable storage medium according to claim 13, wherein when the mother code length N is 8192, a quantity K of the K bits is 235, 470, 940, 1880, 2820, or 3760.

17. The non-transitory machine-readable storage medium according to claim 13, wherein when the mother code length is 8192, the first sequence is the sequence Q2.

18. The non-transitory machine-readable storage medium according to claim 13, wherein the sequence numbers of the N polar channels are 0 to (N−1) or 1 to N.

19. The non-transitory machine-readable storage medium according to claim 13, wherein the K bits comprise a cyclic redundancy check (CRC) bit.

20. The non-transitory machine-readable storage medium according to claim 13, wherein K bits comprise a parity check (PC) bit.

\*  \*  \*  \*  \*